(12) United States Patent
 Siedel

(10) Patent No.: US 12,104,633 B2
(45) Date of Patent: Oct. 1, 2024

(54) DEVICE AND METHOD FOR ANDROGYNOUS COUPLING AS WELL AS USE

(71) Applicant: Space Applications Services NV/SA, Sint-Stevens Woluwe (BE)

(72) Inventor: Michael Torsten Siedel, Bad Münstereifel (DE)

(73) Assignee: Space Applications Services NV/SA, Sint-Stevens (BE)

( * ) Notice: Subject to any disclaimer, the term of this patent is extended or adjusted under 35 U.S.C. 154(b) by 424 days.

(21) Appl. No.: 17/437,224

(22) PCT Filed: Mar. 6, 2020

(86) PCT No.: PCT/EP2020/056089
§ 371 (c)(1),
(2) Date: Sep. 8, 2021

(87) PCT Pub. No.: WO2020/182682
PCT Pub. Date: Sep. 17, 2020

(65) Prior Publication Data
US 2022/0170498 A1    Jun. 2, 2022

(30) Foreign Application Priority Data
Mar. 8, 2019 (EP) ...................................... 19161610

(51) Int. Cl.
*F16B 21/04* (2006.01)
*H01R 13/627* (2006.01)
*H01R 24/84* (2011.01)

(52) U.S. Cl.
CPC ......... *F16B 21/04* (2013.01); *H01R 13/6276* (2013.01); *H01R 24/84* (2013.01)

(58) Field of Classification Search
CPC .......... F16B 7/04; F16B 7/0406; F16B 7/042; F16B 7/0413; F16B 2/16; F16B 21/16;
(Continued)

(56) References Cited

U.S. PATENT DOCUMENTS 2,553,220 A * 5/1951 Troeger ................. F16B 21/16
                                                        403/374.1
3,342,510 A   9/1967 Walters
(Continued)

FOREIGN PATENT DOCUMENTS

CN      108275289          7/2018
DE   102010005895 A1 *    7/2011   ............... F16B 2/16
(Continued)

*Primary Examiner* — Jonathan P Masinick
(74) *Attorney, Agent, or Firm* — Miller Canfield

(57) ABSTRACT

A coupling system comprising a first androgynous coupler and a second androgynous coupler. The first androgynous coupler comprises a first male coupling section having a first recess extending radially and a first female coupling section comprising a first blocking element and a first positioning element. The second androgynous coupler comprises a second male coupling section having a second recess extending radially, where the second male coupling section is configured to form-fit with the first female coupling section. When the second male coupling section is form-fit with the first female coupling section, axial movement of the first positioning element causes the first blocking element to move radially into the second recess to couple the first androgynous coupler to the second androgynous coupler.

9 Claims, 33 Drawing Sheets

(58) Field of Classification Search
CPC ... F16B 21/165; H01R 13/62; H01R 13/6276; H01R 13/22; H01R 13/28; H01R 24/84
See application file for complete search history.

(56) References Cited

U.S. PATENT DOCUMENTS

| | | | | |
|---|---|---|---|---|
| 3,964,771 | A * | 6/1976 | Baudouin | F16B 21/165 |
| | | | | 439/348 |
| 5,301,985 | A | 4/1994 | Terzini | |
| 5,658,159 | A | 8/1997 | Gardner et al. | |
| 6,843,630 | B2 * | 1/2005 | Sbongk | F16B 21/16 |
| | | | | 24/453 |
| 7,021,615 | B2 * | 4/2006 | Kuroda | F16B 21/165 |
| | | | | 269/309 |
| 7,543,779 | B1 | 6/2009 | Lewis | |
| 8,857,647 | B2 * | 10/2014 | Nakamura | B65D 41/04 |
| | | | | 220/301 |
| 9,853,386 | B1 | 12/2017 | Lee et al. | |
| 10,309,122 | B2 * | 6/2019 | Jin | E04H 15/48 |
| 10,702,819 | B2 * | 7/2020 | Chu | B01D 46/0013 |
| 2007/0178732 | A1 | 8/2007 | Khalifa et al. | |
| 2014/0096467 | A1 * | 4/2014 | Norton | E04F 13/0833 |
| | | | | 52/582.2 |

FOREIGN PATENT DOCUMENTS

| | | | | |
|---|---|---|---|---|
| DE | 102014104695 | | 10/2015 | |
| DE | 202016102290 U1 * | | 6/2016 | |
| EP | 1024323 | | 8/2000 | |
| EP | 3441628 | | 2/2019 | |
| EP | 3825237 A1 * | | 5/2021 | B25J 15/04 |
| WO | WO-2017095218 A1 * | | 6/2017 | E04B 1/585 |
| WO | 2017/203449 | | 11/2017 | |

* cited by examiner

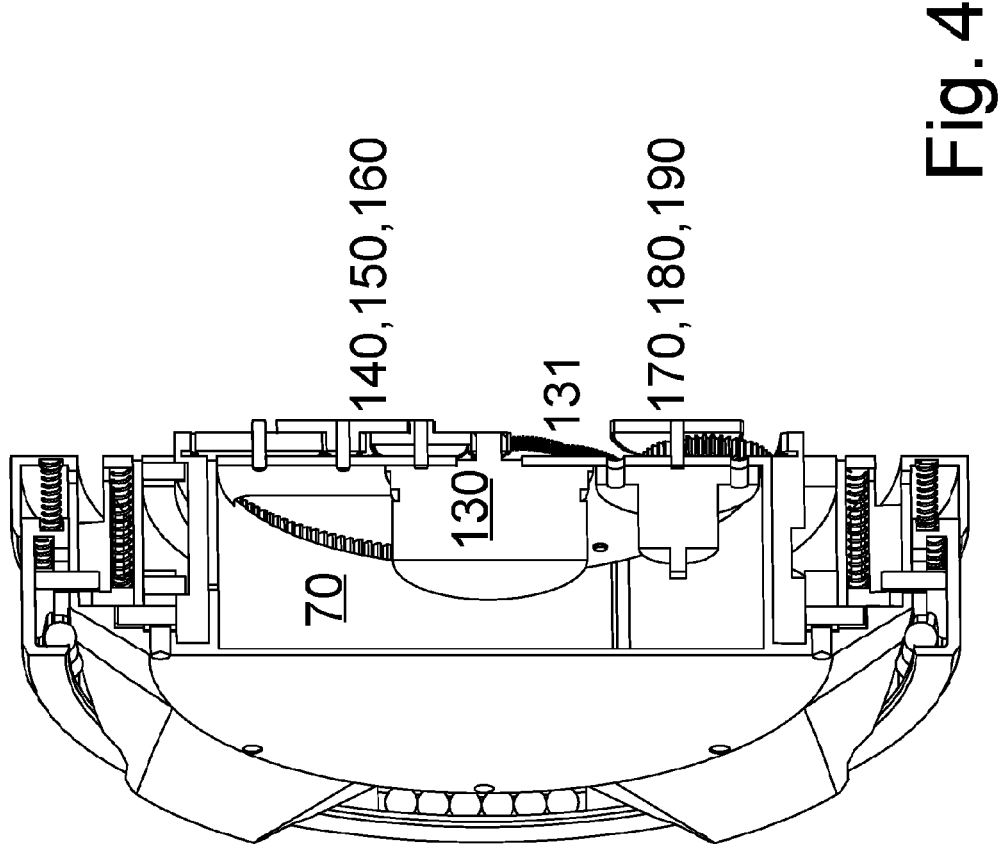

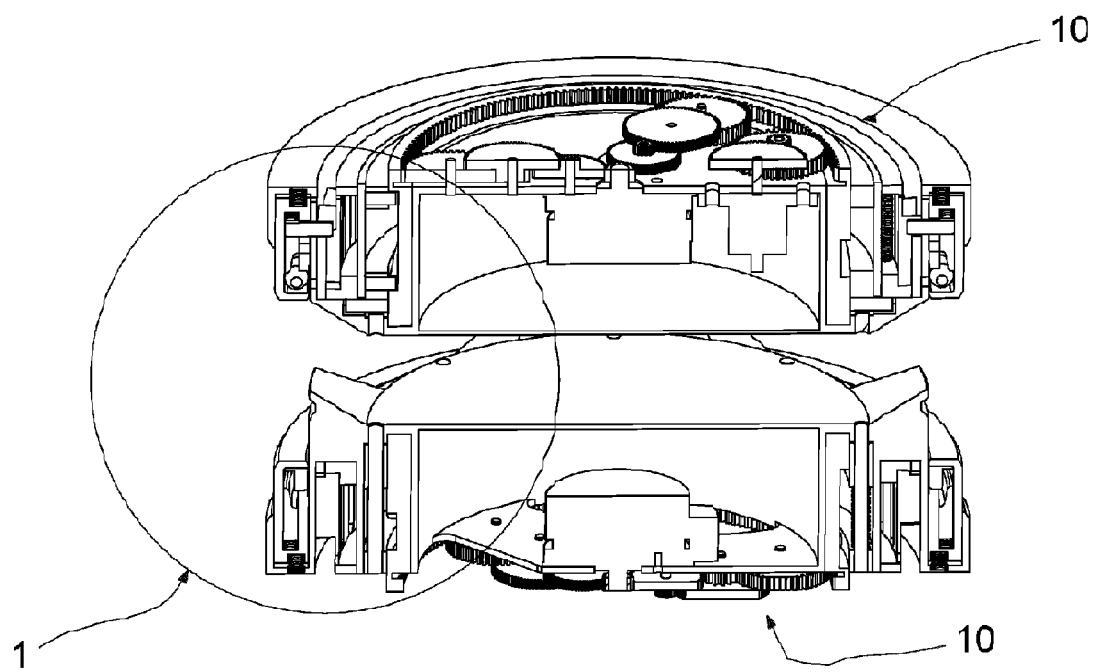
Fig.5E
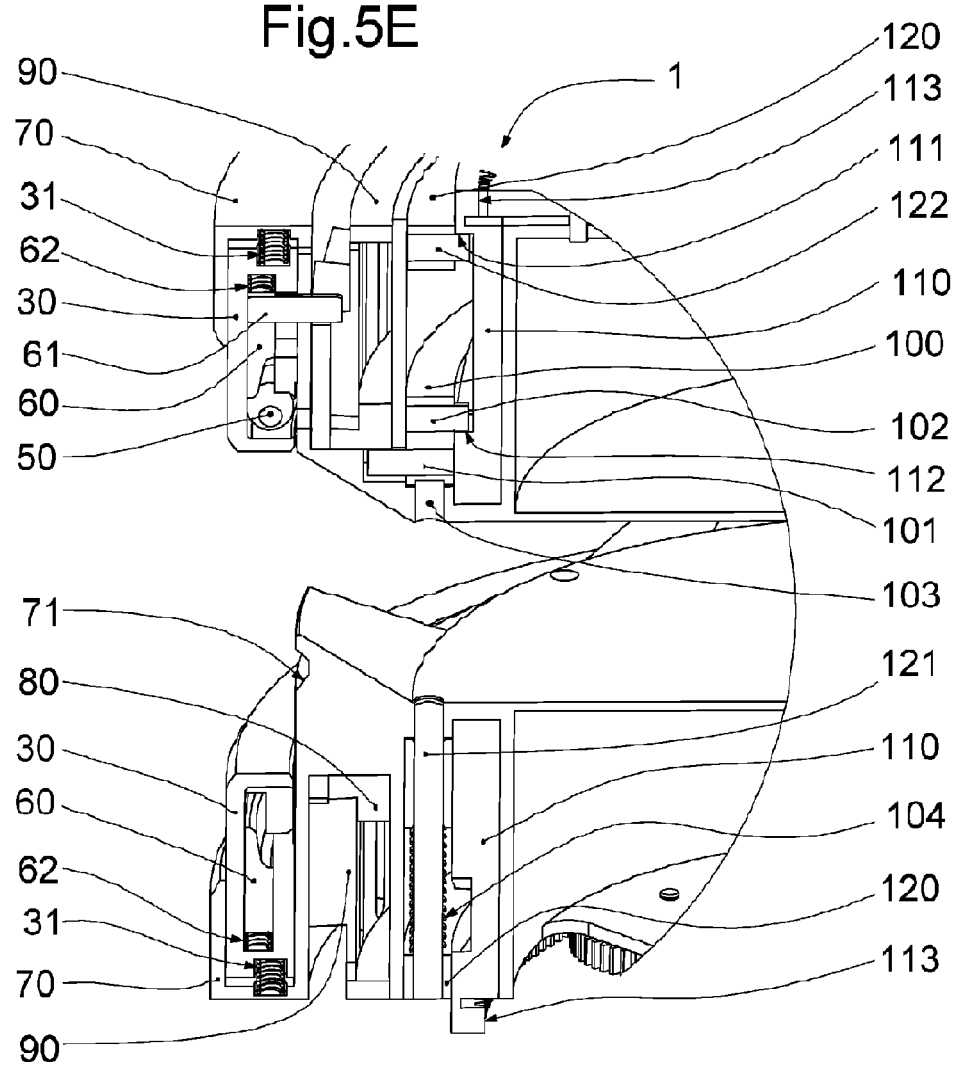

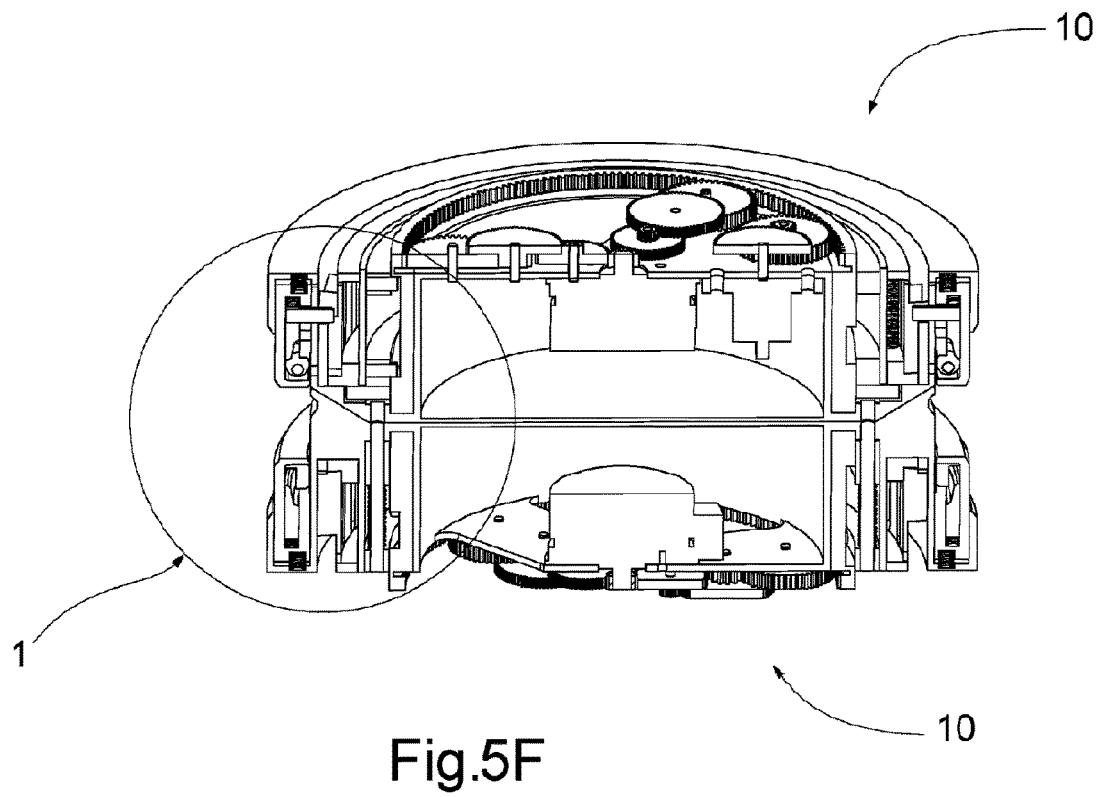
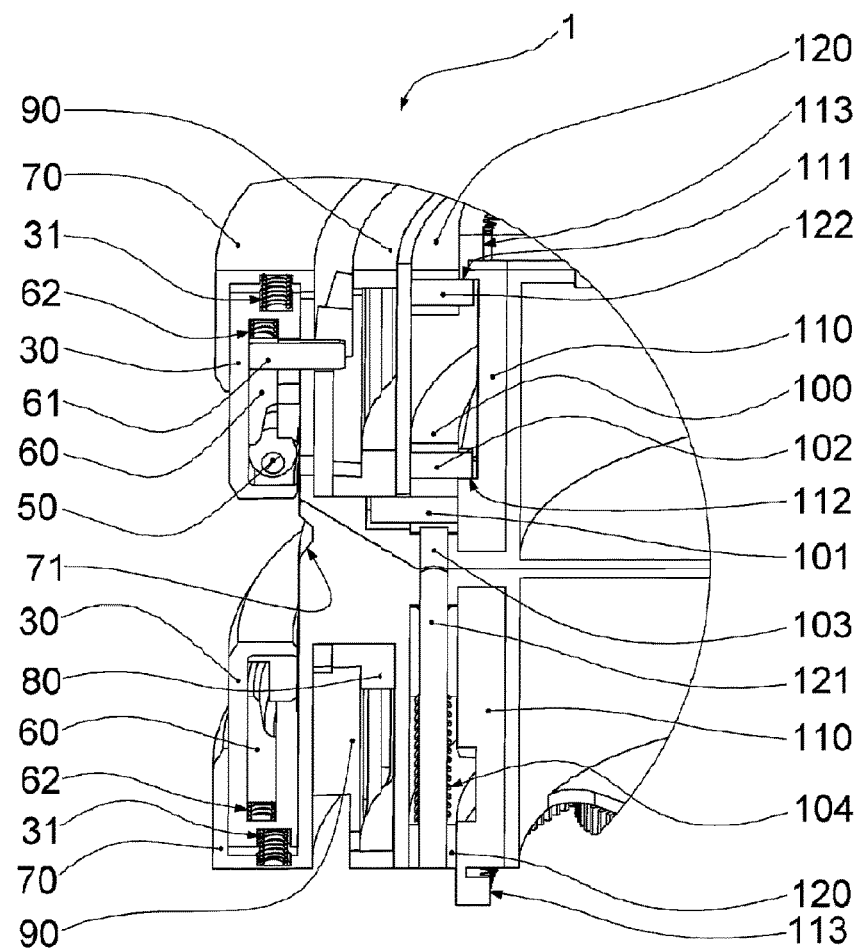
Fig.5F

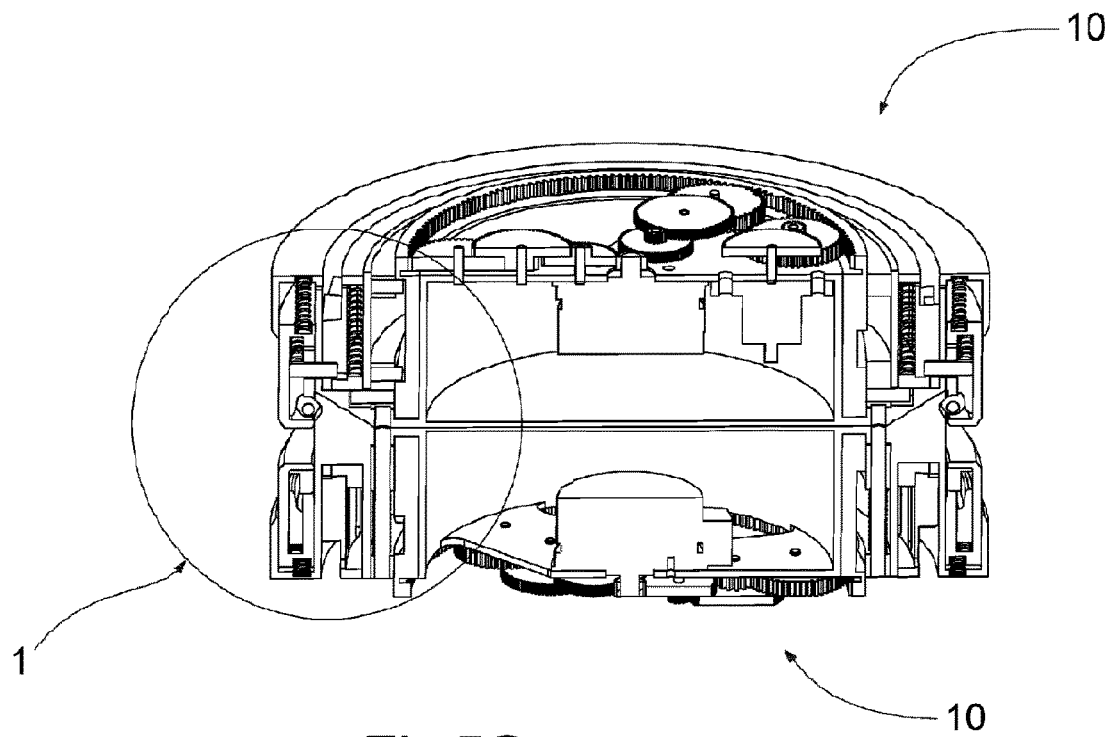
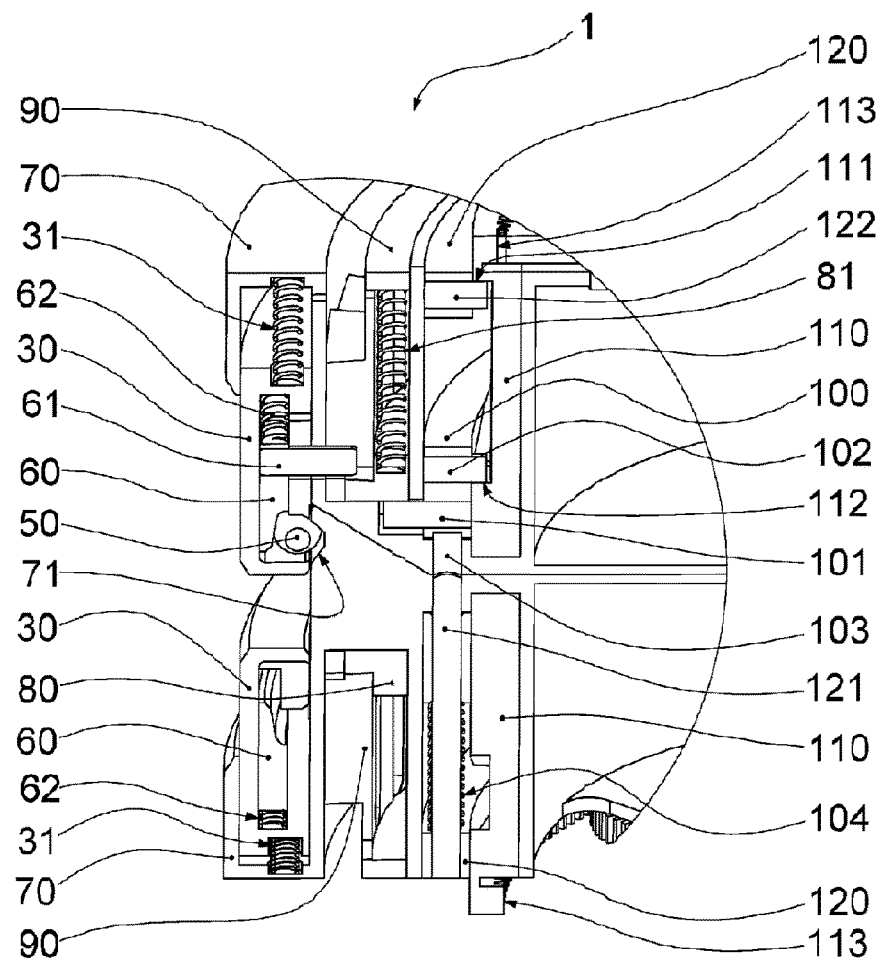
Fig.5G

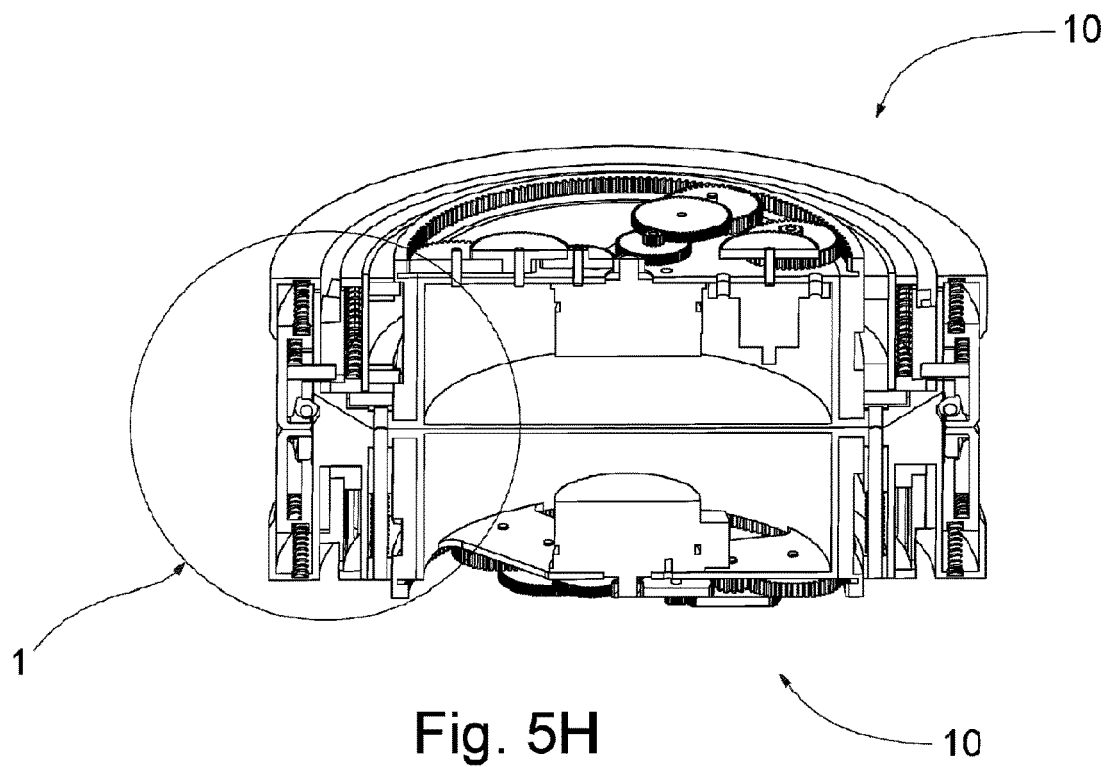
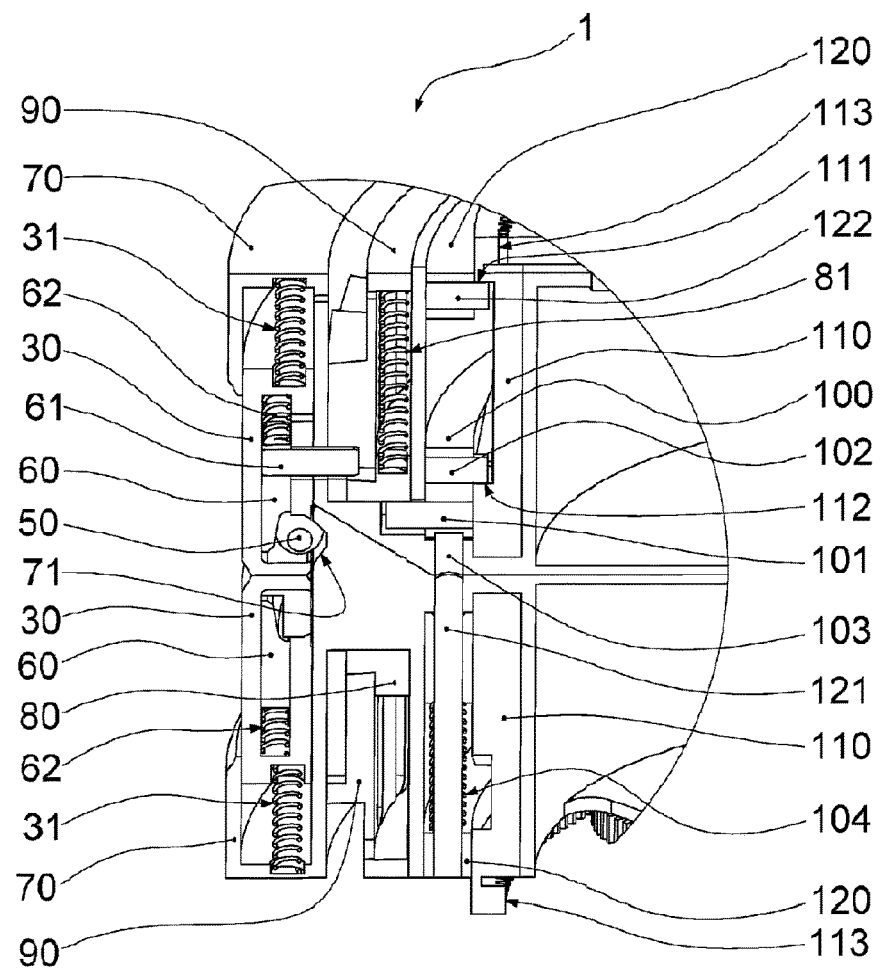
Fig. 5H

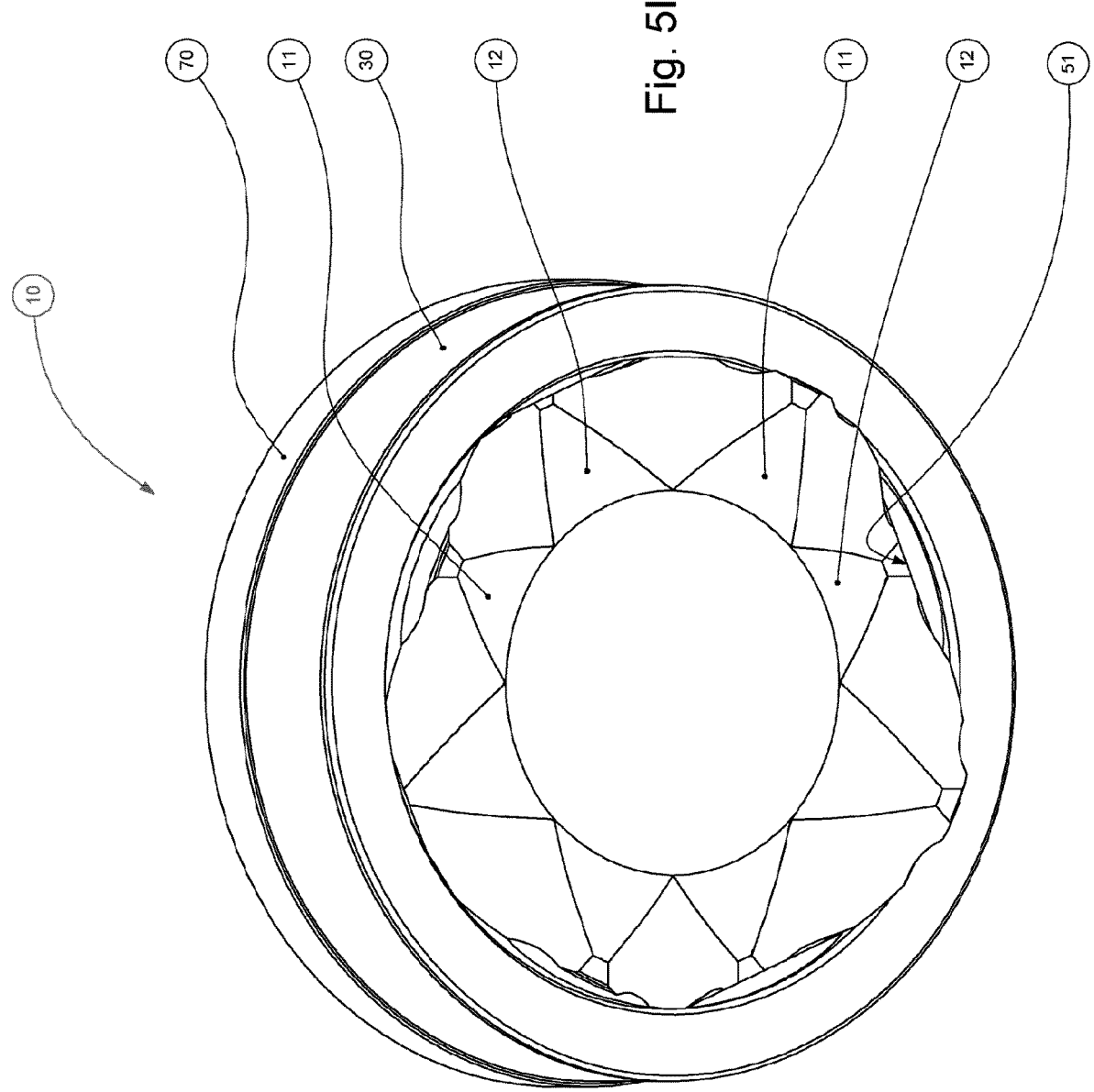

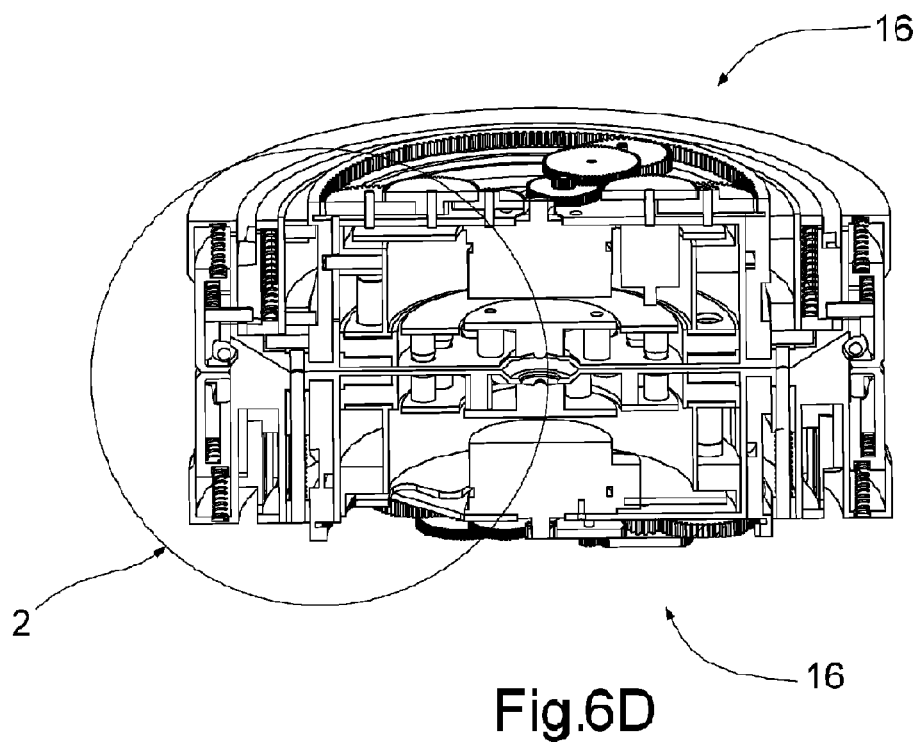
Fig.6D
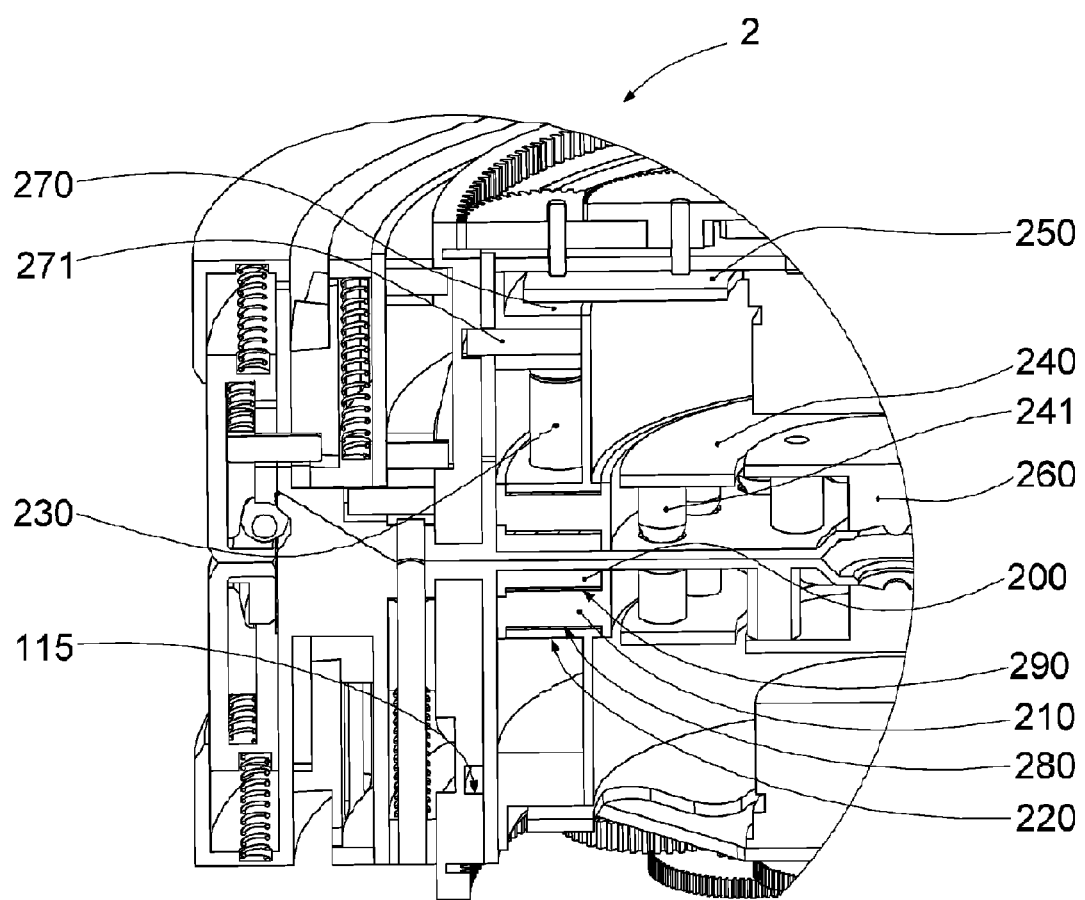

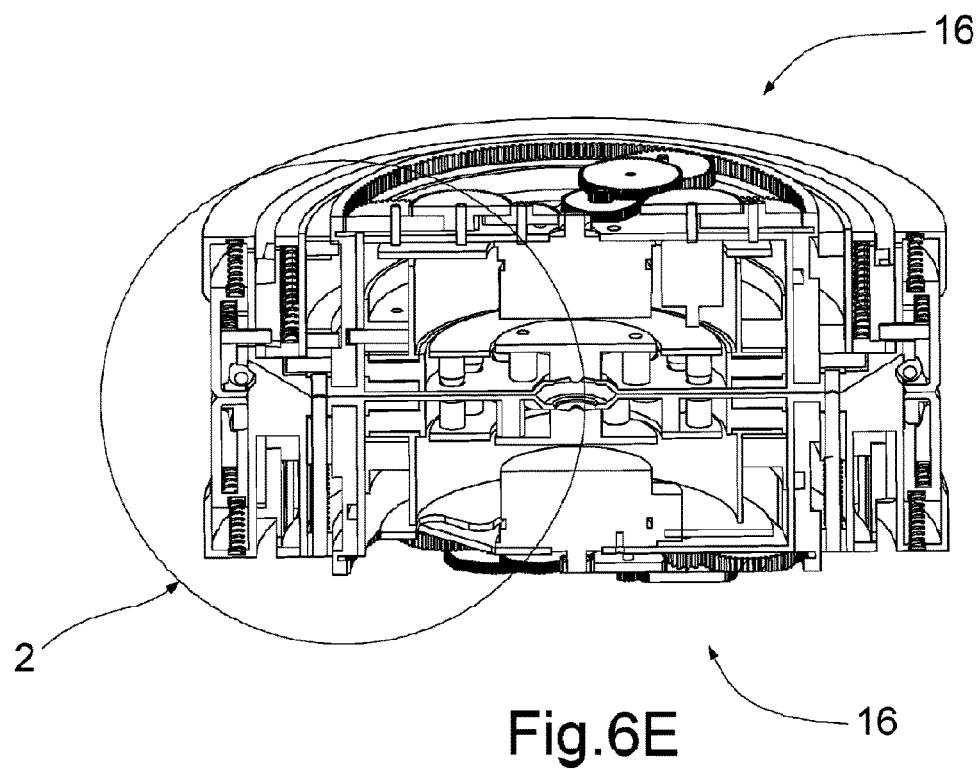
Fig.6E
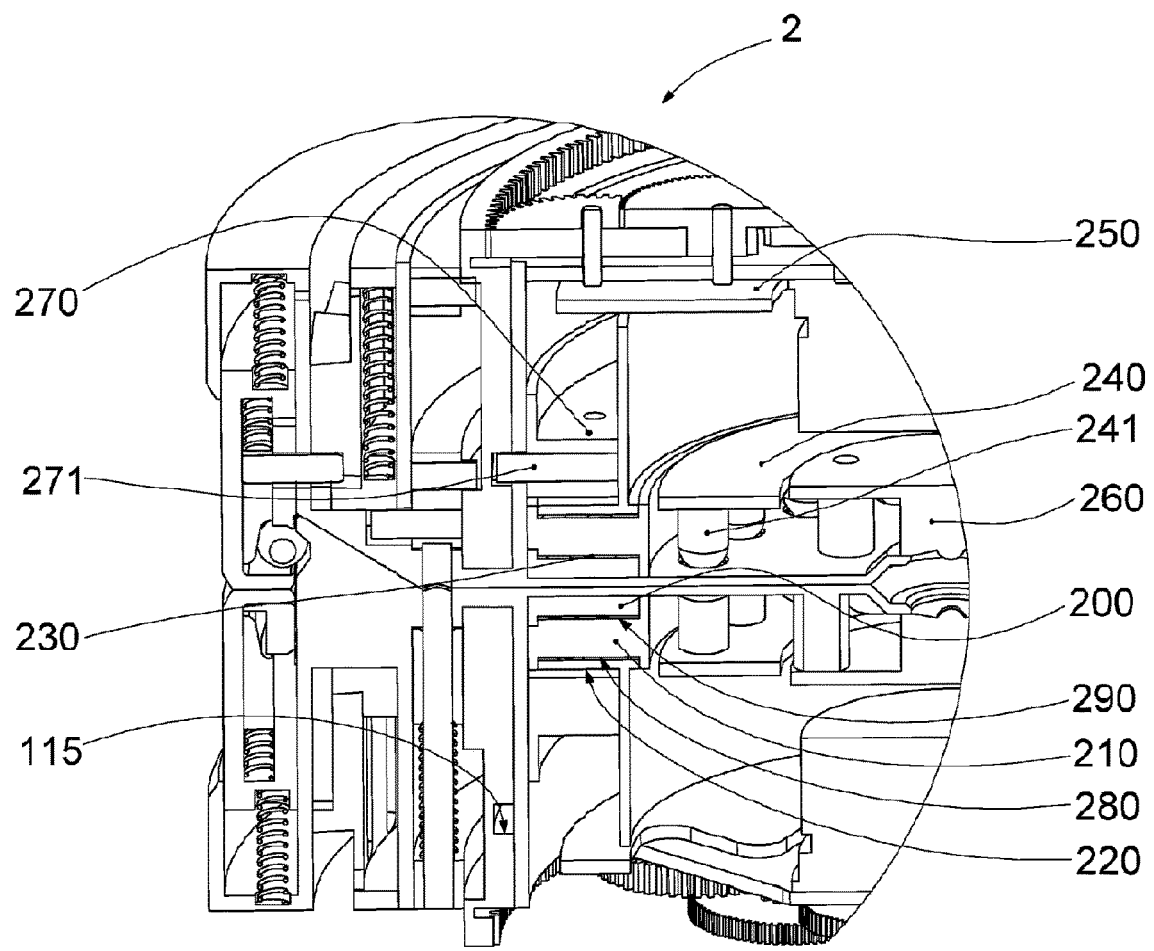

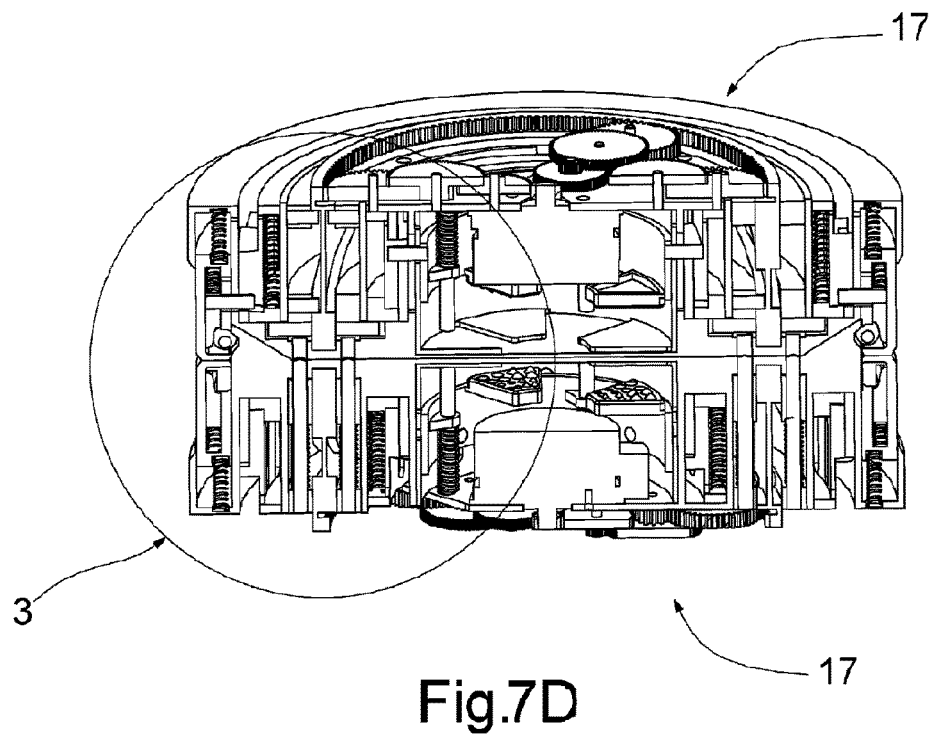
Fig.7D
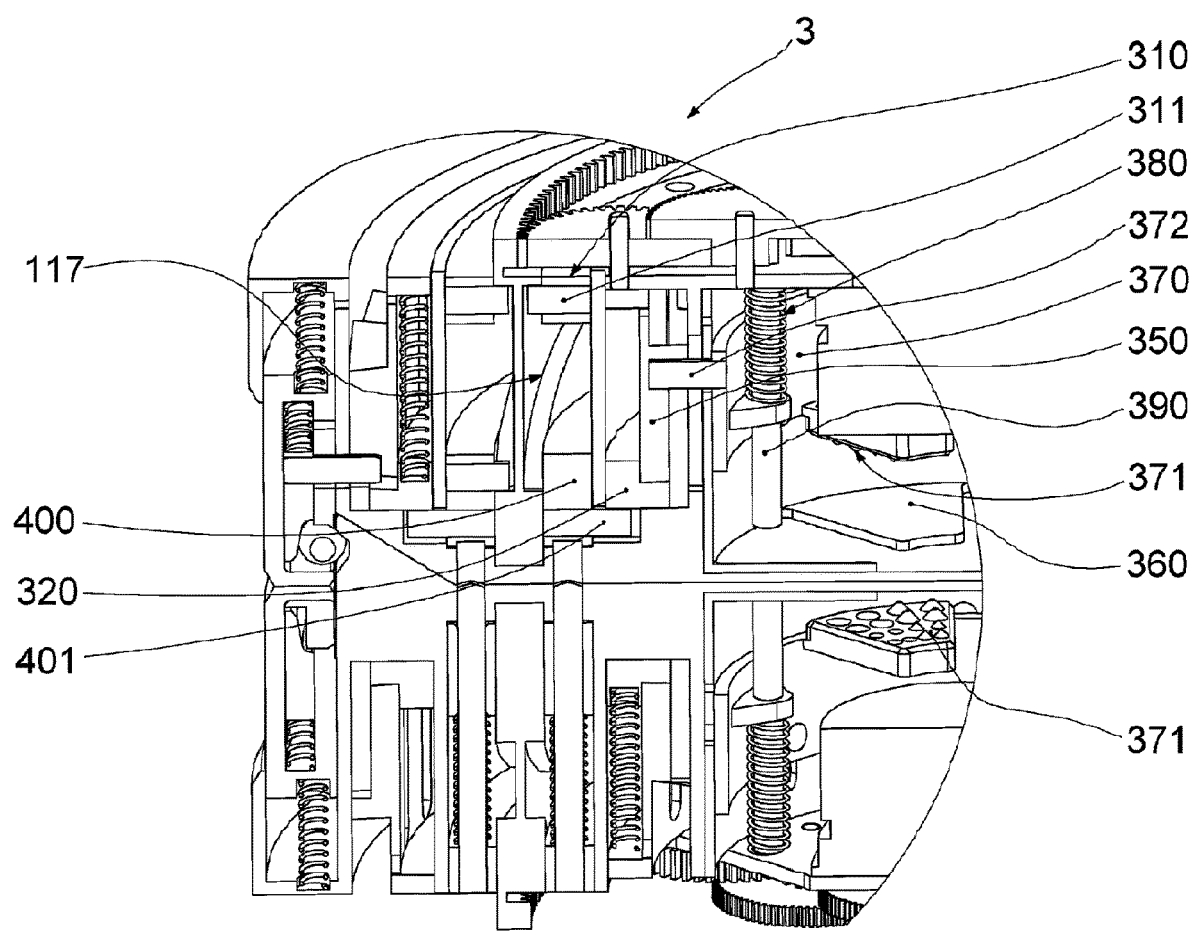

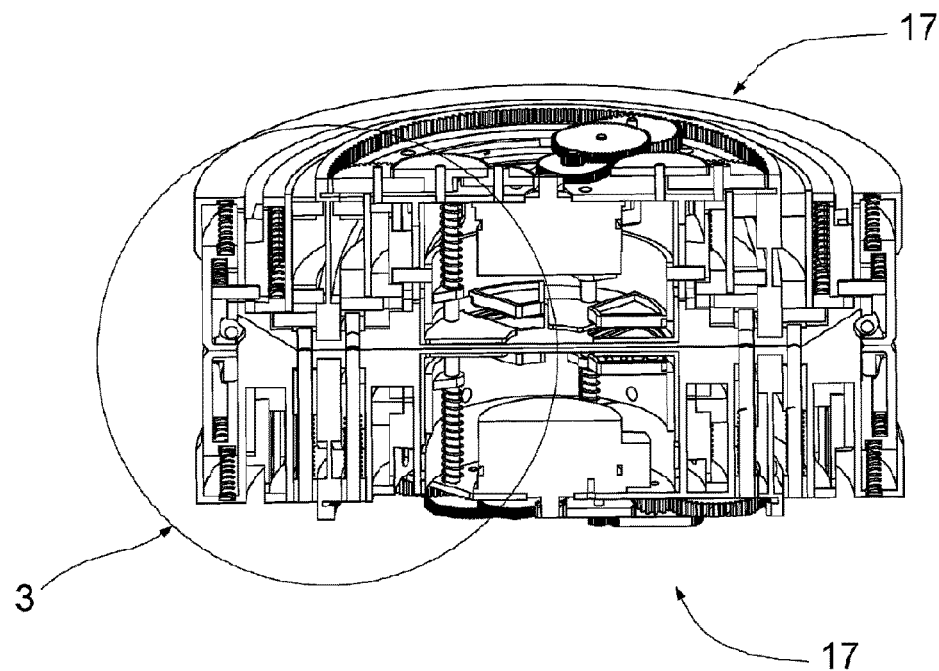
Fig.7E
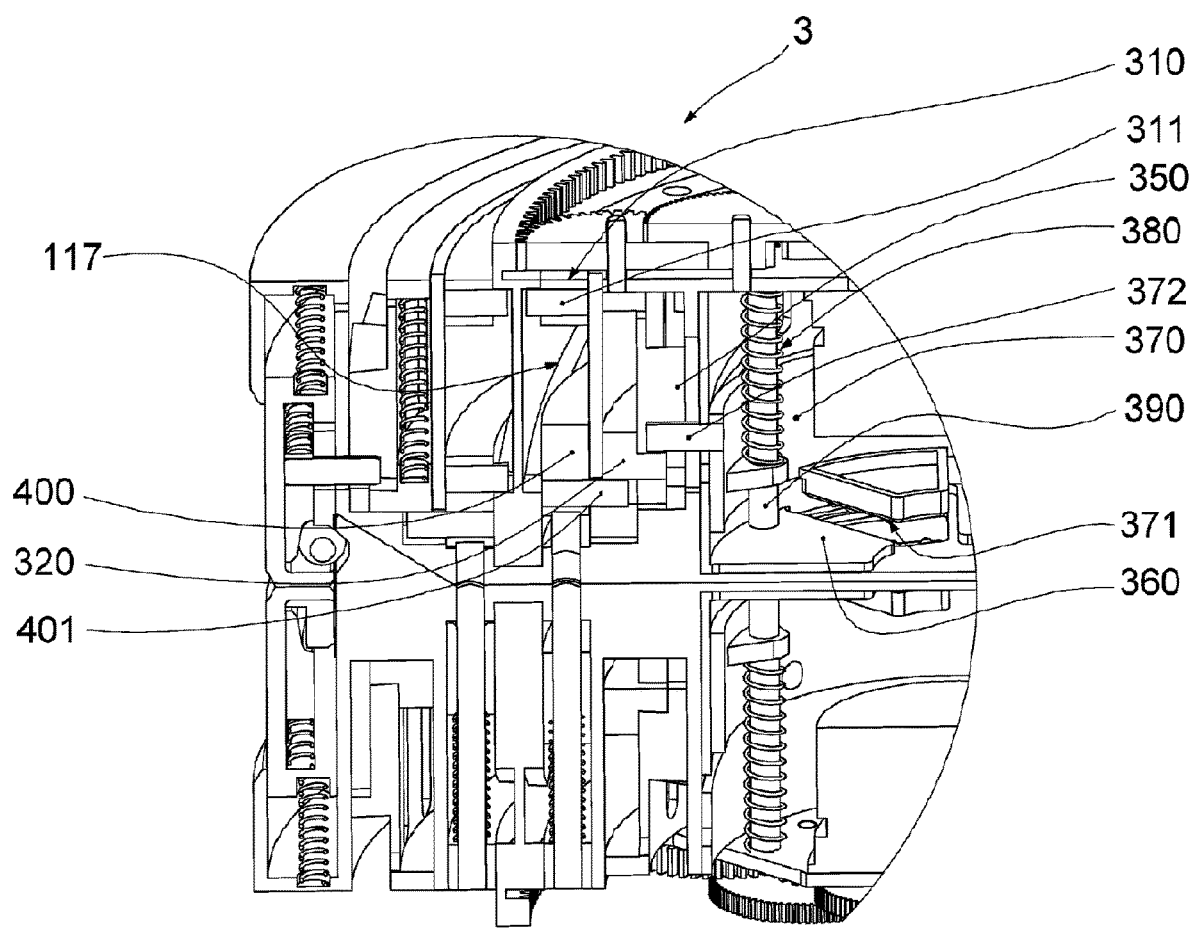

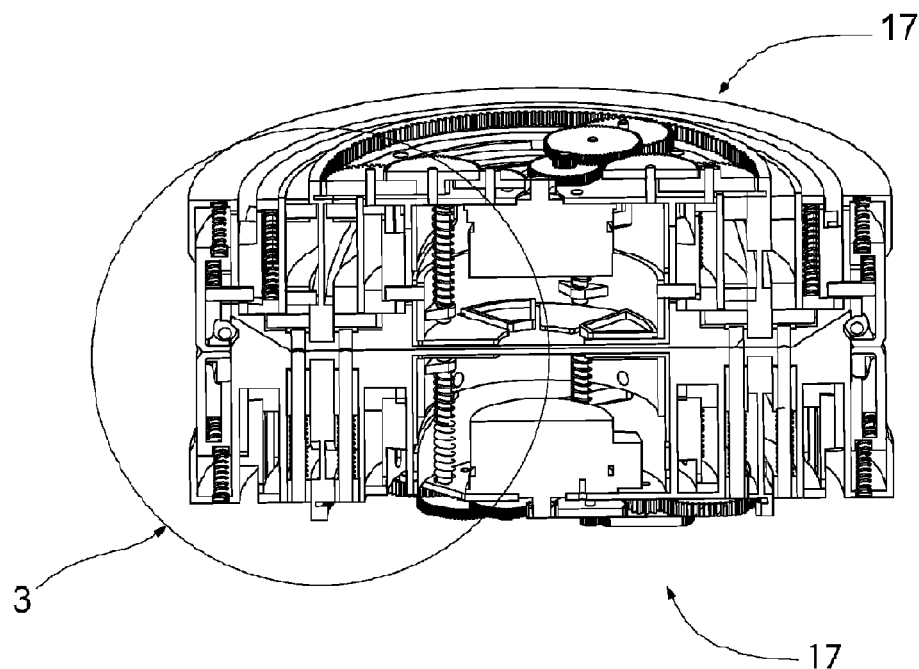
Fig.7F
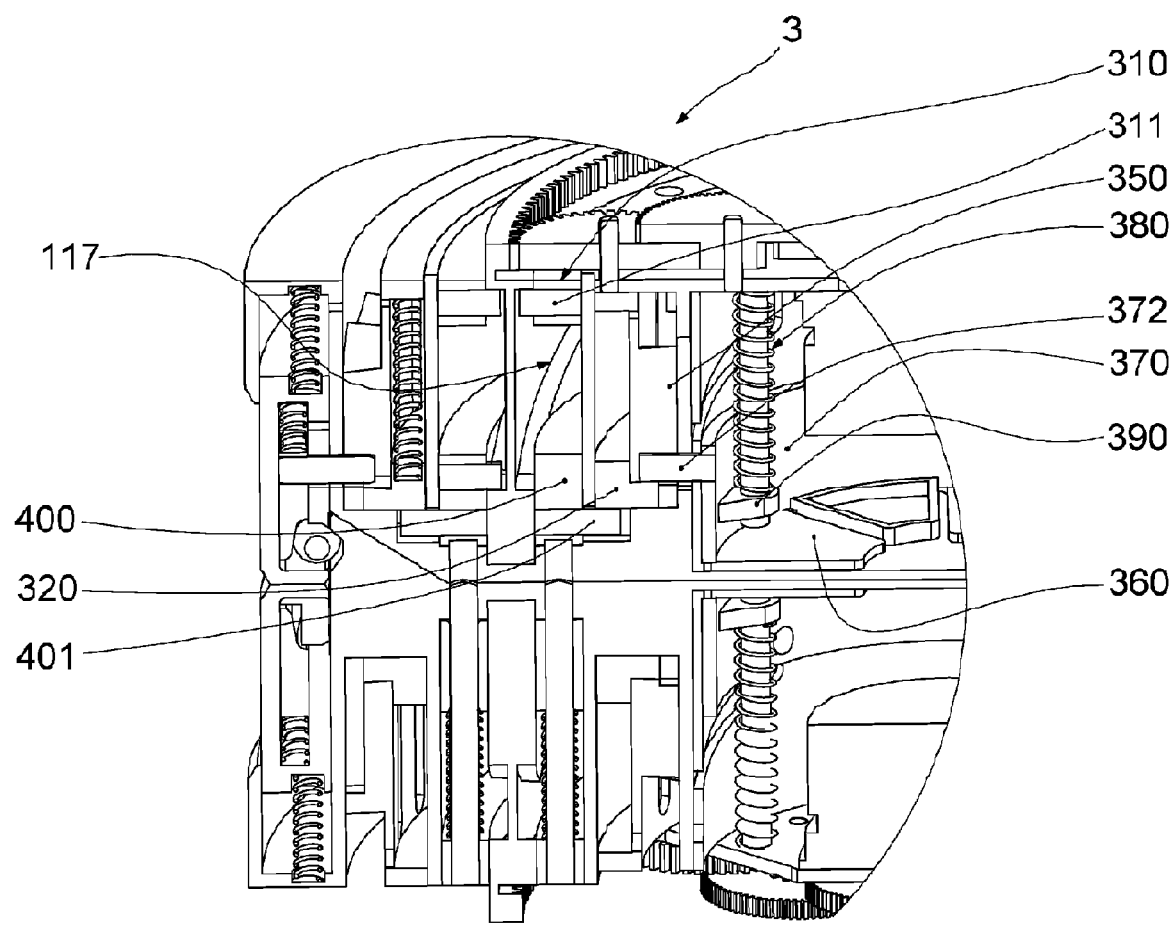

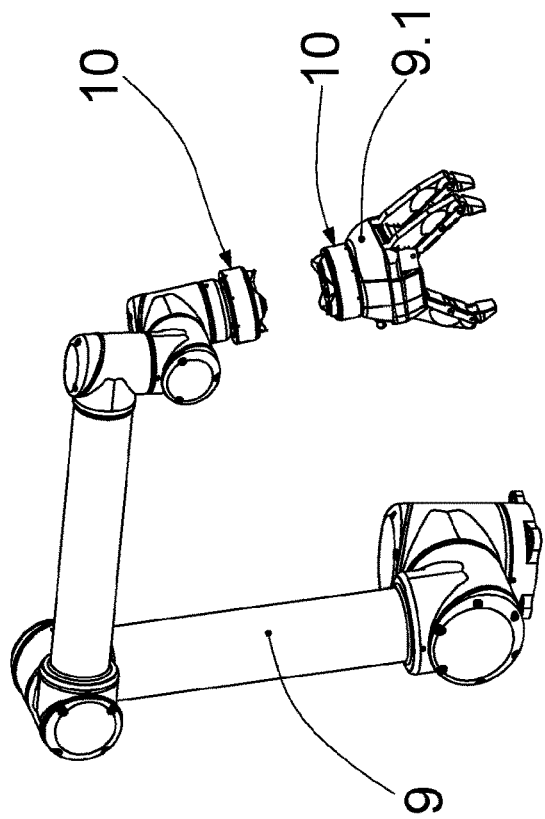
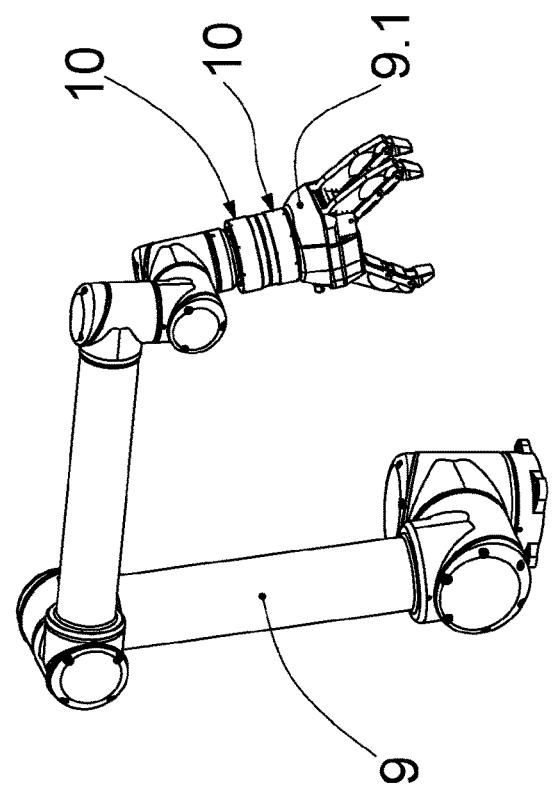
Fig.11A
Fig.11B

DEVICE AND METHOD FOR ANDROGYNOUS COUPLING AS WELL AS USE

TECHNICAL FIELD

The present invention refers to an androgynous coupling means as well as to androgynous couplings. The present invention further refers to a method of androgynous coupling. Not least, the present invention refers to the use of such androgynous coupling means, especially for modular satellites, in/for connectors and/or robots. In particular, the present invention further refers to methods and devices according to the independent claims.

BACKGROUND OF THE INVENTION

Androgynous couplings allow for safe and robust coupling methods in many applications. Nonetheless, androgynous coupling devices may require quite sophisticated techniques. Thus, for many applications good results may be provided by an androgynous coupling which may ensure a robust and practical way of coupling, without being unreasonably sophisticated in view of technical requirements.

WO 2015/150338 A1 describes an androgynous coupling for connecting modules, where the coupling exhibits a covering element with an aperture allowing a coupling means to enter the coupling region of a corresponding coupling means in a force-fitting and/or interlocking manner. One of the advantageous aspects of this type of coupling is that parts of the coupling may be locally integrated or may engage each other during the coupling procedure and that quite a good freedom of movement may be preserved during the coupling procedure.

U.S. Pat. No. 6,354,540 B1 describes an androgynous coupling with an active side and a passive side, where the active side may be adjusted by a plurality of actuators during coupling.

A need exists for an even more practical device and method of androgynous coupling. In particular, a need exists for an even more practical, workable and/or robust coupling mechanism. For example, for spacecraft, the manner of coupling should be as reliable, exact and robust as possible. In particular, a need exists for advantageous geometries and internal or external coupling kinematics for corresponding coupling partners.

SUMMARY OF THE INVENTION

It is an object to provide for a practical, workable and/or robust androgynous coupling mechanism. In particular, androgynous couplings should be made available for a plurality of applications with great ease of use, high security and high fidelity. Furthermore, the object may also comprise any efforts or measures for providing androgynous couplings such that the coupling procedure can be carried out with great reliability irrespective of any preload or position tolerance.

The above-mentioned object is solved by androgynous coupling means disclosed in the following description and claims.

The above mentioned object is advantageously solved by an androgynous coupling means exhibiting both male and female coupling sections. The androgynous coupling means is configured for form fit coupling, i.e., in a mechanical and geometrical manner, with at least one further androgynous coupling means exhibiting geometrically respective male and female coupling sections based on axial interlocking with each other. The male coupling sections exhibit at least one lateral locking contour (which is radially accessible and) configured for form fit with at least one blocking element based on radial interlocking. The respective lateral locking contour faces in a radial direction, especially in a radial direction outwards. Within the respective lateral locking contour, the male coupling sections exhibit at least one radial recess (oriented radially inwards or radially outwards) providing a radial cavity for arranging or radially accommodating, in a coupled state, one or more blocking element(s), especially at least one ball or pin. In the coupled state, the radial recess is configured for fixing the blocking element based on form fit within the cavity such that the androgynous coupling means is fixedly positioned/positionable in an axial relative position with respect to the corresponding androgynous coupling means. This allows for high reliability and high security for the coupling procedure, especially for a great spectrum of applications. This also allows for position tolerance during the coupling procedure. The inventive arrangement also allows for little actuating motions and/or little actuating forces, even when the coupling is preloaded.

A lateral locking contour is preferably a contour providing for form fit and/or force fit in a radial direction, especially when interlocking at least two elements by relative positioning in a radial direction.

A radial recess is any indentation provided in a radial direction, especially with respect to a lateral area.

A radial cavity is any indentation provided in a radial direction, where the cavity may also be enclosed in a circumferential direction.

Prior art, in contrast with this invention, depends on the use of form-fit elements which have to be rotated with respect to each other, e.g. classical bayonet joints or any mechanism in which form fit may only be ensured by relative rotation of the axially engaging coupling means. Such mechanisms may require quite exact positioning and longer actuating motions. These mechanisms may also require greater forces for decoupling, e.g. in case the coupling is preloaded (repressive forces; greater frictional forces; greater momentum). In addition, any radial motion could affect the position of a coupling partner, particularly if the coupling partner is free-floating, such as a satellite.

The blocking elements may move in a radial direction. The blocking elements can be positioned in a radial direction with respect to the radial recess (lateral locking contour). The blocking elements may be displaceable in all three spatial directions. Blocking elements in the form of spheres, pins or cylinders may provide great advantages and facilitate the coupling process whilst increasing position tolerance.

The radial recess accommodating the blocking elements allows for a manner of coupling, in which axial fixation and interlocking may be ensured by a blocking engagment (by means of a different element) in a radial direction (i.e., without relative rotation of the engaging coupling elements). This also allows for different mechanisms and motions independently from each other. This allows for a robust coupling process that does not include forces (e.g., rotational forces) that may cause the coupling partners to move out of their intended locking position. For example, the radial recess may exhibit a groove-like geometry.

Preferably, as far as interlocking of corresponding coupling components is concerned, the coupling process is a purely mechanical coupling process. The forces are applied especially at the free ends of the coupling means, i.e., by means of male and female coupling sections. Nonetheless, the process of coupling may be initiated or actuated by motors/actuators, e.g. electrical actuators arranged within a cavity of the respective coupling means, especially centrally arranged.

In the following, the term "corresponding" generally designates any element/component "of the corresponding coupling element."

In the following, the term "element" generally designates any separate component in the coupling mechanism, but does not restrict any structure or component to integral one-piece components. Rather, the term "element" may also designate components being composed of several constituent parts.

In the following, the term "blocking" generally designates any preferably reversible mechanical coupling which allows transfer of mechanical loads by means of preferably reversible coupling. For example, this can be achieved by movable balls which can be guided and forced into a locking position, especially in a relative radial blocking position.

In the following, the term "push-push" generally designates any mechanism which allows actuation based on successive relative motion in one direction, especially against a preload.

In the following, the term "push-pull" generally designates any mechanism which allows actuation based on successive relative motion in two opposed directions.

In the following, the term "corresponding element" generally designates the analog element of the corresponding coupling partner.

In the following, the term "androgynous" generally designates coupling parts which present both the male and the female aspects of classic couplings or connectors.

In the following, the term "forcing" generally designates any compelled or forced motion or actuation.

In the following, the term "form fit" generally designates joints or connections which can be ensured based on the geometric interaction between the connecting parts.

In the following, the term "force fit" generally designates joints or connections which can be ensured based on forces between the connecting parts.

In the following, the term "friction fit" generally designates force fit by frictional forces, e.g. surface forces in a radial and/or axial and/or circumferential direction.

In the following, the term "self-locking" generally designates any mechanism which allows for a locking function per se, without any active mechanism, especially by form fit and/or friction fit.

In the following, the term "preload" generally designates any tension or pre-stressing force or pre-load or momentum which is exerted on a machine part, the machine part being in a fixed position or being movable.

In the following, the term "cam-curve" or "cam-contour" generally designates any guiding surface configured to define a relative position depending on relative motion in a radial and/or axial and/or circumferential direction. In particular, the term "cam-curve" may refer both to contours which guide from one side only (so called open contours) and contours which guide from two sides (so called closed contours).

In the following, the term "gear" generally designates any component allowing for coupling machine parts and changing their relative speeds and/or their direction and consequently, the transmitted torque.

In the following, the term "motor" generally designates any actuator configured for generating energy and/or motion.

In the following, the term "sensor" generally designates any measuring device for at least one measuring parameter which allows for monitoring the coupling process, for example a force parameter, or a momentum parameter, or a position parameter.

In the following, the term "wedge" generally designates any inclined geometry or contour which is arranged for exerting a force or relative displacement in a second direction when actuated in a first direction.

In the following, advantageous embodiments of the invention are described in more detail.

In a preferred embodiment of the androgynous coupling means in an axial direction, the male and female coupling sections are geometrically configured in a mirror-inverted manner.

In an advantageous embodiment of the androgynous coupling means, the androgynous coupling means is configured for a ring-in-ring-arrangement of a plurality of axially guiding rings. Alternatively, the androgynous coupling means exhibits a base body providing a ring cavity for accommodation and at least axially guiding the blocking elements.

In a preferred embodiment of the androgynous coupling means, the radial recess is arranged within the radial extension of a base body of the androgynous coupling means.

In an advantageous embodiment of the androgynous coupling means, the androgynous coupling means exhibits a round circular or cylindrical outer contour or round circular or cylindrical outer lateral surface. In another embodiment, the androgynous coupling means exhibits 90°-symmetry. In yet another embodiment, the androgynous coupling means exhibits rotational symmetry, especially with respect to the outer lateral surface and/or with respect to the coupling sections.

According to one embodiment, referring to the whole coupling, the weakest element or link or mechanical interface (especially in view of mechanical power/force transfer) is, by design, the mechanical interface between blocking elements (especially balls or pins) and corresponding contours (especially radial recess with lateral contact area). This also allows for a kind of predetermined breaking point such that at worst, the above mentioned contact areas may be affected (especially plastically deformed), but any further interfaces will not be affected or impaired. In particular, such a predetermined breaking point may prevent loosening or decoupling of the coupling means if some of the blocking elements are overloaded. Instead of deforming the entire androgynous coupling means, the overloaded blocking elements will deform or break off whilst the non-overloaded blocking elements will maintain a secure coupling. This is an important security benefit.

In the following, external coupling kinematics are described in more detail, where "external" refers to all kinematics for actuating those machine parts which are designated to engage with the corresponding coupling partner (actively coupling machine parts). External coupling kinematics may include a plurality of axially movable pins. In addition, external coupling kinematics may be actuated by internal coupling kinematics.

In the following, internal coupling kinematics are described in more detail, where "internal" refers to all kinematics for actuating machine parts within the respective coupling means. The machine parts do not interfere with the corresponding coupling partner. In contrast to external coupling kinematics, the internal coupling kinematics are not directly coupling with corresponding coupling means; rather, internal coupling kinematics provide for actuation and relative motion within the respective coupling means. Internal coupling kinematics may include a plurality of rings interacting with a push-push-mechanism or a push-pull-mechanism. The internal coupling kinematics are configured for actuating axially movable pins of external coupling kinematics. The internal coupling kinematics may provide coupling functionality for at least mechanical coupling. The internal coupling kinematics may also provide for coupling functionality for at least electrical coupling or further for coupling of data or fluids. In particular, the internal coupling kinematics exhibit at least one slotted link element providing for at least one contour which allows for actuating a push-push-mechanism or a push-pull-mechanism in order to define relative axial positions of several rings of a ring-in-ring arrangement.

External coupling kinematics can alternatively be defined by the configuration of male and female coupling sections. More generally, external coupling kinematics can be defined by any mechanism or component which allows for engaging the corresponding coupling means, especially in order to activate the corresponding coupling means. In other words: the present invention also refers to a coupling design which provides for the option to actuate a passive coupling means by an active coupling means. This is an important safety aspect since it allows an active coupling means to couple with a malfunctioning or damaged coupling means.

The preferred design of the inventive coupling means is based on axial alignment of the coupling means and preferably includes axial pins for axial engagement with the corresponding coupling means.

At least one lateral locking contour may be an outer lateral locking contour and at least one lateral locking contour may be an inner lateral locking contour. Furthermore, at least one lateral locking contour may comprise at least one inner lateral locking contour and at least one outer lateral locking contour.

At least one radial recess can be oriented inwards, or the at least one radial recess can be oriented outwards.

The radial recess can be configured for fixing the blocking element(s) in an axial direction by means of an axially outmost edge, for example a lip, on the lateral locking contour. The radial recess may exhibit axial and/or radial sections or components. Preferably, the radial recess provides form-fit contours both in an axial and radial directions.

The male coupling sections may exhibit at least one convex area or a convex shape. The female coupling sections may exhibit at least one concave area or a concave shape.

Female coupling sections may preferably be provided in corresponding shape and configuration as the male coupling sections, but inverted respectively mirror-inverted, i.e. contrariwise. In other words: the detailed description referring to shape, configuration, position etc. of the male coupling sections may also apply for the female coupling sections, especially in a mirror-inverted meaning.

The male and female coupling sections may provide a kind of saw tooth profile or a saw tooth tread design, i.e., alternating convex and concave sections. Preferably, the protruding (male) sections as well as the recesses (female sections) are provided in a small number only, e.g. each three or four or five times along the circumference of the coupling means. Preferably, the teeth or protrusions (male sections) as well as the recesses (female sections) respectively exhibit a symmetrical shape at least in both circumferential directions.

The male and female coupling sections may exhibit at least one planar area. The male and female coupling sections may exhibit several surface areas arranged at an angle different than 0° with respect to each other, especially several planar areas.

The androgynous coupling means may exhibit a central docking area, where the male and female coupling sections encircle the central docking area in a circumferential manner. The male and female coupling sections may alternate in a circumferential direction. Alternatively, the male and female coupling sections may extend radially towards the center (at least approximately). Alternatively, the central area may be a cavity.

The male coupling sections may axially protrude from a central docking area of the androgynous coupling means, the male coupling sections especially being arranged adjacent the central docking area. The female coupling sections can be configured as axial recesses arranged adjacent the central docking area of the androgynous coupling means. Nonetheless, the exact location of the respective coupling sections may be designed individually for specific applications.

The invention allows for the transmission of considerable forces and torques especially since force transmission may be carried out along the outer edges (outer area) of the coupling, i.e., far from the fulcrum. Also, the invention may ensure high stability regarding forces and/or mechanical loads, e.g. bending forces, compression forces, traction forces, shearing forces and/or twist loads.

In the following, internal coupling kinematics are described in more detail, where "internal" refers to all kinematics for actuating machine parts within the respective coupling means. The machine parts do not interfere with the corresponding coupling partner. Internal coupling kinematics may include a plurality of rings interacting with a push-push-mechanism or a push-pull-mechanism, where the internal coupling kinematics are configured for actuating axially movable pins of the external coupling kinematics. Internal coupling kinematics may provide functionality for mechanical coupling but they may also provide functionality for electrical, data or fluid connections. In particular, the internal coupling kinematics exhibit at least one slotted link element providing for at least one contour which allows for actuating a push-push-mechanism or a push-pull-mechanism in order to define relative axial positions of several rings as part of a ring-in-ring arrangement. The word fluid refers to liquids and/or gases.

According to one embodiment, an outer ring remains in a retracted axial position. Push-pull mechanisms and push-push mechanisms allow the outer ring to remain in a retracted axial position. This arrangement allows off-axis approaches.

The presence of a push-pull or a push-push mechanism has been shown to reduce the complexity of the coupling process especially for robotic or human users, especially for plug connections or plug connector applications of the inventive coupling.

The inventive arrangement also allows for advantageous disposition of components and elements (connections, interfaces, lines or cables for power, data or fluids) within the coupling. These components are protected from water, dirt, or other aggressive, abrasive or corrosive materials. Depending on an appropriate choice of materials, further, an insulation and/or shielding against magnetic or electro-magnetic fields, temperature and/or radiation can also be achieved. In particular, the inventive constructive arrangement (coupling design) allows for good shielding thanks to a ring-in-ring-arrangement without occupying additional space which is especially useful for applications in which axial length is limited.

The male and female coupling sections can be geometrically configured in a mirror-inverted manner, especially along the axial direction.

According to one embodiment the androgynous coupling means is self-locking using force-fit based on frictional engagement and/or spring load, especially by means of at least one wedge-shaped geometry or profile interacting with the at least one blocking element. This allows for a secure, robust blocking mechanism which fixes the relative axial position of the coupling means. For example, force-fit is ensured by a plurality of spring-loaded elements between at least two components (especially rings) of each coupling means. Alternatively, or in addition, friction-fit is provided, for example by springs and/or by any frictional element.

For example, the coupling means may be configured for relatively high locking forces, e.g. 20 kN at an outer diameter of e.g. about 150 mm, especially by use of hard or hardened material such as hardened steel or ceramics for the blocking elements, especially by means of blocking elements which are radially positioned by blocking an axial relative position of the blocking elements. In particular, coupling sections arranged at an outer circumferential line allow for high torques as well as robustness with respect to tractive forces and/or compressive forces and/or bending forces/moment (side loads), or in other words: axial, twisting or shear loads. In particular, the at least one wedge-shaped geometry is configured and arranged for pushing at least one blocking element into a corresponding cavity. In particular, this geometry can be used to push at least one blocking element radially inwards or outwards in a radial recess or groove.

According to one embodiment, the androgynous coupling means is configured for a ring-in-ring-arrangement of a plurality of axially guiding rings. This also allows for robustness. The androgynous coupling means may exhibit a base body providing a ring cavity for accommodating and axially guiding the blocking elements. This may favour support of the blocking elements as well as advantageous flux of forces. The base body's ring cavity may also provide accommodation for an outer ring and/or at least one positioning ring (especially wedge ring). Such an arrangement has been found to be advantageous both in view of volume requirements and precision (especially guiding accuracy).

According to one embodiment the radial recess is arranged within the radial extension of a base body of the androgynous coupling means. This allows for favorable arrangement and support of several components of the coupling means, especially for a ring-in-ring-arrangement of a plurality of rings axially overlapping and radially supporting each other.

The androgynous coupling means may exhibit a circular or cylindrical outer contour. The androgynous coupling means may exhibit 90°-symmetry. The androgynous coupling means may exhibit rotational symmetry, especially with respect to the outer lateral surface and/or with respect to the coupling sections. 90°-symmetry has been found advantageous for many applications. Alternatively, symmetry is provided based on an angle of e.g. 120°. The outer contour may also exhibit an ellipsoid-like geometry or be in the shape of a regular polygon.

The androgynous coupling means can be configured for diagonal interlocking of corresponding coupling sections, especially for ensuring or for improving a diagonal docking trajectory (also in contrast to an axial docking strategy, i.e. approaching along the axial direction). The androgynous coupling means may exhibit pairs of oppositely arranged coupling sections configured for diagonal interlocking with the corresponding androgynous coupling means.

The androgynous coupling may exhibit diagonal flanks or edges, especially diagonal flanks protruding in a circumferential direction, especially diagonal flanks protruding in both circumferential directions from a respective male coupling section. The male and female coupling sections can provide for a continuous coupling contour, especially along the complete circumferential line of the androgynous coupling means. The coupling contour may even extend in a circumferential direction in an uninterrupted manner.

The lateral locking contour (male and female coupling sections) may exhibit at least two or three flanks or edges with individual orientation or shape, especially two diagonal flanks protruding in oppositional manner in both circumferential directions and one intermediate flank, especially a flat and not inclined intermediate flank or intermediate plane. The lateral locking contour may exhibit both convex and concave areas or contours in an alternating manner in the circumferential direction. The lateral locking contour may exhibit convex and concave areas arranged on an outer ring or outer region of the cross-sectional area of the androgynous coupling means, especially arranged on an outer ring with a width that is a fraction of the diameter of the androgynous coupling means, for example less than 30% or less than 20% of the diameter. This also allows for transmitting high torques and forces on/within relatively small available space (especially compact arrangement with little cross section). Alternatively, the male and female coupling sections are provided along the whole cross-sectional area, or within a ring section which is offset inwards with respect to the outer lateral surface of the coupling means.

The above mentioned object is also solved by a device, especially by a module (modular device), comprising at least one androgynous coupling means as described above, especially a device in the shape of a modular cube with at least two androgynous coupling means arranged on different sides/surfaces of the device, especially with one androgynous coupling means arranged on each side of the device, where the (respective) androgynous coupling means is fixedly mounted on the device, especially by means of an outer ring of the androgynous coupling means.

In particular, the device is provided in one of the following configurations or exhibits at least one of the following components: planetary gear, locking system, robot (especially modular robots, reconfigurable robots), vehicle (especially modular vehicle, truck, train, wagons), assembly of vehicles, especially trucks or truck trailers, satellite or assembly of satellites, active tool configured for being actuated actively, pipes, drill pipe or drill rod or boring tool, quadcopter or multicopter, logistics system or loading system or cargo, aerodyne or aircraft, power take-off, especially power take-off for a tractor or quadcopter.

In particular, the device is provided in the configuration of a connector and is configured for connecting energy lines or flow lines and/or for connecting information lines or flows and/or for connecting fluid lines or flows like gas flow, especially for thermally and/or electrically connecting these lines or flows.

The above mentioned object is also solved by an androgynous coupling comprising at least two androgynous coupling means described above, where the androgynous coupling is configured for coupling by form fit both in the axial and radial direction, especially for coupling at least two modular devices each exhibiting at least one mounted androgynous coupling means described above. The androgynous coupling exhibits a plurality of blocking elements, especially balls, and further exhibits at least one positioning element configured for positioning the blocking element(s) of the respective androgynous coupling means such that the androgynous coupling means is fixedly positioned in an axial relative position with respect to the corresponding androgynous coupling means.

The positioning element can be in engaging/interlocking arrangement with a fixing element configured for fixing the positioning element, in particular at least one interlocking pin. The at least one positioning element can be configured for positioning the blocking element(s) with respect to an outer and/or inner lateral locking contour of the respective androgynous coupling means. The fixing element can be provided as form fit element, e.g. as a pin or as a plurality of pins preferably protruding in a radial direction.

According to a preferred embodiment of the invention the androgynous coupling means is in interlocking arrangement with a fixing element configured for fixing the positioning element and/or the at least one positioning element is configured for positioning the blocking element(s) with respect to an outer and/or inner lateral locking contour of their respective androgynous coupling means.

According to a preferred embodiment of the invention in the coupled state, fixing/blocking of the androgynous coupling means can be carried out in all translational and/or in all rotational directions.

The androgynous coupling can be configured for rotating the androgynous coupling means with respect to each other, for example by at least 90° or by a multiple of 90° or for example by 120°. This also allows for coupling any devices/modules/cubes being rotated by 90 degrees in a convenient manner. This is especially useful for coupling means with rectangular shapes, especially cubes, to larger devices, for example in outer space.

Each androgynous coupling means may comprise one, two, three or more male and female sections, preferably exactly four male and four female sections.

In a coupled state, the radial recesses of the male and female coupling sections may overlap each other in an axial direction.

The androgynous coupling can be configured for lateral form-fit coupling in at least two different axial positions at the respective coupling sections of engaging/interlocking androgynous coupling means.

The androgynous coupling can be configured for coupling the at least two androgynous coupling means both in a passive and active manner (passive or active state of the respective androgynous coupling element). The active state is characterized by an active motor actuating the slotted link element for axial positioning/interlocking, and the passive state is characterized by a passive motor in a passive state or in a stand-by state.

The androgynous coupling can be provided as a hydraulic coupling, especially with at least one of the coupling components being actuated hydraulically; or as a mechanical coupling, especially with the coupling components being configured as mechanically positioned components; or as a pneumatic coupling, especially with at least one of the coupling components being actuated pneumatically; or as an electric coupling, especially with at least one electrical connector being configured for axial positioning. In particular, the electrical coupling function may be provided in addition to any of the above mentioned coupling functionality.

The androgynous coupling is configured for position finding by form fit, especially by relative rotation of one of the androgynous coupling means with respect to the corresponding androgynous coupling means, especially such that male and female coupling sections are guided along each other, especially during relative rotation. The male coupling sections may guide corresponding female coupling sections, and vice versa.

The androgynous coupling may comprise at least one sensor configured for detection of the relative position of the coupling means. The androgynous coupling may comprise at least one sensor configured for detection of the absolute and/or relative position of the slotted link element(s). The androgynous coupling may comprise at least one sensor configured for position detection, especially absolute position or relative angular position of at least one of the androgynous coupling means, based on the shape or location of a contact line at form fitting lateral locking contours of engaging/interlocking androgynous coupling means, for example position detection based on relative position of blocking elements.

In the following, the functionality of the androgynous coupling is shortly described.

A motor provides for actuation, especially by means of a gearing mechanism (e.g. comprising gear wheels and/or belt drives and/or other traction mechanisms). The gearing mechanism interacts with a slotted link element, especially via internal toothing. The slotted link element exhibits at least one cam contour, preferably two cam contours. Each cam contour may be provided in an open or closed configuration (open: unilaterally force fitted; closed: bilaterally force fitted). The slotted link element is arranged in a pivot bearing. In particular, the slotted link element exhibits a cylindrical geometry (hollow cylinder, bushing). In particular, the slotted link element exhibits at least one closed cam contour (no force fit of any pins required). Alternatively, the motor may be replaced by any alternative actuator providing likewise/similar functionality.

The slotted link element interacts with one or more pins or bolts or other equivalent form fit elements. In particular, the slotted link element interacts with one or more rings each exhibiting several pins or bolts protruding axially and/or radially. The rings may move in an axial direction (translational bearing), especially in a bidirectional manner (back and forth).

The gearing mechanism may couple the motor to the ring(s) in such a manner that at least unidirectional motion, preferably bidirectional motion (back and forth), is controllable by the motor.

The at least one cam contour allows for actuating the internal coupling mechanism (i.e., the mechanism for carrying out relative motion of internal components in order to allow for the androgynous coupling of two corresponding androgynous coupling means), especially based on rotational relative movement. The internal coupling mechanism may comprise an interaction of form fit elements of an adapter ring with an activation ring, especially providing for relative rotation of the activation ring with respect to the adapter ring. The internal coupling mechanism may comprise an interaction of the activation ring with the indexing ring, especially by axially contacting the indexing ring, especially such that axial pressure generates relative rotation. Indeed, axial motion of the rings (in particular, the activation ring and the indexing ring) may ensure radial positioning (relative radial rotation). The activation ring may provide for a slanted contour, especially slanted with respect to a radial plane (plane with identical axial coordinates, extending in a radial direction). In particular, the activation ring exhibits a saw tooth profile or a saw tooth tread design. The internal coupling mechanism may comprise an interaction of the indexing ring with a positioning element (in particular: ball wedge ring), especially by guiding the positioning element along a saw tooth profile or a saw tooth tread design of the indexing ring. The positioning element (ball wedge ring) may exhibit one or more pins or bolts or other equivalent form fit elements, especially in radial extension. The internal coupling mechanism may comprise an internal relative rotation of rings with respect to each other, especially based on relative rotational positioning according to (defined by) at least one saw tooth profile.

The saw tooth profile of the indexing ring may be provided by at least two types of axial recesses (especially grooves or channels): first axial recesses having a first length and second axial recesses having a second length longer than the first length. These axial recesses or grooves may be configured for determining the state of the coupling. In particular, the shorter recesses may be arranged and configured such that corresponding androgynous coupling means remain in an uncoupled state, and the longer recesses may be arranged and configured such that corresponding androgynous coupling means are moved in the coupled state for axial interlocking with each other.

A plurality of force-loading means may provide for spring-loaded bearings for the rings and for further coupling means, especially in an axial direction respectively. In particular, pressure springs are provided for axial force-loading in at least one of the following mechanical interfaces: between the slotted link element and an adapter ring, between an indexing ring and an activation ring, between a positioning element (especially: ball wedge ring) and a structure element (base body of androgynous coupling means, especially ring structure element).

In particular, the androgynous coupling may be configured by or may comprise at least the following components: a slotted link element in radial engagement with a forcing ring, a forcing ring in axial engagement with an adapter ring (especially in axial engagement with an adapter ring of the corresponding androgynous coupling element), an adapter ring in axial engagement with at least one component of the corresponding androgynous coupling means. Also, the slotted link element can be provided in radial engagement with an adapter ring.

According to an additional variant, the androgynous coupling may be configured by or may comprise at least one of the following additional components: an indexing ring, and an activation ring. The indexing ring and the activation ring may be part of a force-loaded push-push-mechanism (especially spring-loaded).

For example, the positioning element (especially: ball wedge ring) may be guided within the contour of an outer ring. The outer ring may be guided on an outer area/surface of the structure element (base body) of the respective androgynous coupling means.

In particular, the ball wedge ring exhibits a wedge-shaped geometry, especially an inner conical or a wedge-shaped geometry, and is configured and arranged for pushing at least one blocking element (especially: ball) in a radial direction (especially radially inwards), based on axial relative movement. This allows for axial interlocking and axially fixing both androgynous coupling means.

In particular, by interaction, the outer ring and the positioning element (especially: conical ring) of the respective androgynous coupling means allow for retraction of the coupling mechanism back to a position out of the cavity defined by the positioning element and the outer ring, especially in such a manner or to such a degree that both male and female coupling sections of the corresponding androgynous coupling means are cleared/exposed/accessible, especially in such a manner or to such a degree that diagonal engagement of corresponding androgynous coupling means can be ensured.

The structure element (base body) of the respective androgynous coupling means and the male and female coupling sections may be provided as an integral piece (made of one single body). This also allows for high accuracy, also in view of axially guiding and relatively positioning several components, especially several rings of a ring-in-ring-arrangement, especially in conjunction with a push-push-mechanism or a push-pull-mechanism predefining at least two different axial relative positions.

The adapter ring may prevent any blocking between a forcing ring and further components. The adapter ring is not necessarily required. In particular, the slotted link element (especially cam disc) or first and/or second cam contours may be configured such that the adapter ring and the forcing ring do not interact directly on respective front sides. In particular, a relatively great axial extension of the slotted link element may favour this configuration. This allows for renouncing any adapter ring. In particular, in a configuration without an adapter ring, guide pins of a ring which engage the blocking elements may protrude to the position of the slotted link element and may be guided in the respective profile or by the respective contour.

The above mentioned object is also solved by a method of reversibly coupling at least two devices, especially modules, by means of an androgynous coupling comprising at least two androgynous coupling means, especially by means of an androgynous coupling described above, at least one androgynous coupling means being fixedly arranged (especially without any relative movement) on each device (androgynous coupling means is in a state fixedly mounted on the device). The coupling of the at least two androgynous coupling means (respectively coupling of the at least two devices) among each other is carried out in a form-fit manner based on axial interlocking by means of both male and female coupling sections on each of the two corresponding androgynous coupling means. The male and female coupling sections overlap in an axial direction. Fixing the relative axial position of corresponding androgynous coupling means in the coupled state is carried out in a form-fit manner based on radial interlocking by means of the male coupling sections of the respective androgynous coupling means. The male coupling sections exhibit at least one lateral locking contour. At least one blocking element is actuated in a radial direction for radially engaging the lateral locking contour of the male coupling sections of at least one of the androgynous coupling means and for axially blocking the respective androgynous coupling means based on the radial engagement.

According to a variant, axial engagement or axial interlocking may be added or superposed by optionally additional radial engagement. Nonetheless, when describing axial interlocking in the present specification, the invention may be carried out already based on purely axial interlocking.

In a coupled state, the at least one blocking element's position can be fixed in a form fit manner within a cavity of the lateral locking contour such that the device is coupled in a self-locking manner and such that the androgynous coupling means is fixedly positioned in an axial relative position with respect to the corresponding androgynous coupling means.

During axial engagement, male coupling sections of the first coupling means may be brought in contact with female coupling sections of the second coupling means, and female coupling sections of the first coupling means may be brought in contact with male coupling sections of the second coupling means.

For the axial interlocking of the androgynous coupling means among each other, at least one of the two androgynous coupling means may be moved in an axial direction to get in contact with the further/corresponding androgynous coupling means, especially with a central docking area of the further androgynous coupling means.

According to one embodiment, the at least one blocking element's radial position in the coupled state is fixed by means of a positioning element which is actuated in an axial direction. The positioning element may be axially fixable in at least two predefined positions. This configuration allows for form-fit in a radial direction based on a relatively exact and/or little actuation in an axial direction. Such an axial actuation may be realized in a technically advantageous manner also.

The at least one blocking element's position in the coupled state can be fixed by means of a fixing element which is actuated in a radial direction and which engages a positioning element engaging the blocking element. This locking mechanism may also provide for great reliance and safety and robustness, especially when the fixing element is actuated in a direction at least approximately orthogonal to the path of motion of the blocking element. In particular, great reliability of the coupled state may be ensured by a plurality of blocking elements which are positioned by at least one ring-formed positioning element, which is fixed by a plurality of fixing elements.

The at least one fixing element can be actuated in an axial direction, and the at least one blocking element can be actuated in a radial direction by the axial motion of the fixing element. For decoupling, a positioning element in the form of an inner ring with a form-fit contour facing inwards, especially an inner ring with wedge-shaped geometry or profile (V-ring; tapered ring) can be actuated in an axial direction, especially for unblocking the at least one blocking element. This configuration also allows for multiplying this mechanism along the circumference, in order to provide symmetry and good flux of forces over all sections of the coupling means. The wedge-shaped geometry may facilitate radial positioning based on axial relative motion. Also, based on the geometric configuration of the positioning element, especially of an inner lateral area, the coupling characteristics may be adjusted. An outer lateral area may provide for a sliding bearing with at least one further ring of the internal coupling mechanism.

For de-/coupling, at least two rings can be axially moved and positioned with respect to each other, especially an indexing ring and an activation ring. By axial relative movement, a respective form-fit element engages/disengages a contour of at least one of the rings, especially a saw tooth profile of the indexing ring, whereby relative rotation of the rings is evoked, especially within a cavity of the respective androgynous coupling means. This configuration allows for safe and robust internal coupling mechanisms for relatively positioning corresponding external sections of corresponding coupling means.

For coupling, an outer ring can be actuated, especially retracted such that form fit is released for allowing diagonal interlocking of a further coupling means, especially by actuating an inner ring with the preferably wedge-shaped geometry or profile. The outer ring can provide for axial guidance and/or accommodation of at least one further ring.

The positioning element, especially inner ring (especially V-ring; tapered ring), can be spring-loaded. The inner ring can be coupled to at least one spring. Further, the outer ring can be spring-loaded, especially in the axial direction with respect to at least one further ring. The outer ring can be coupled to at least one spring. A force-loaded arrangement of the inner ring and/or of the outer ring also allows for a favorable bidirectional actuation, in particular when only one axial direction is a motor driven actuation. The inventive coupling may provide a ring-in-ring-arrangement configured for axial relative positioning of a plurality of rings with respect to each other and guided along inner and/or outer lateral areas of the rings.

Coupling with at least one device can be carried out by at least one of the following forms of actuation: hydraulic actuation, mechanical actuation, pneumatic actuation, electrical actuation, magnetic actuation, electromagnetic actuation or piezoelectric actuation.

The above mentioned object is also solved by an androgynous coupling means exhibiting both male and female coupling sections, processed by providing male coupling sections with at least one lateral locking contour facing in a radial direction and exhibiting at least one radial recess configured for form fit with at least one blocking element based on radial interlocking. The radial recess is arranged such that based on axial relative motion of at least two rings or components in a ring-in-ring-arrangement, the at least one blocking element can be radially positioned and fixed by axial relative motion, especially by axial relative motion of a positioning element within the ring-in-ring-arrangement, especially a positioning element with a conical or wedge-shaped geometry. This allows for the above mentioned advantages. This process for providing this kind of coupling means may be a manufacturing process and/or an assembling process.

The above mentioned object is also solved by use of an androgynous coupling or androgynous coupling means, respectively as described above, for/in a planetary gear, especially for actuating a cam disk, especially in conjunction with at least one angle sensor, or for/in a spring-loaded push-push mechanism, or for/in a ball pen mechanism, or for/in a hydraulic coupling, or for/in a mechanic coupling, or for/in a pneumatic coupling, especially for/in a quick-release pneumatic coupling, or for/in an electric coupling or for/in a locking system, especially for/in a locking system for industrial machining, or for/in a robot (especially modular robot or reconfigurable robot), or for/in a vehicle (especially modular vehicle), or for/in a satellite, or for/in a tool, especially in an active tool configured for being actuated actively, or for coupling drill pipes or drill rods or boring tools. This allows for the above mentioned advantages. In particular, as far as a configuration with spring-loaded push-push mechanisms are concerned, the invention may favorably be implemented for manual applications also. For example, implementations of a mechanism for coupling SD cards in a computer or camera, or for a push loading drawer, or for any other bidirectional mechanism which provides a coupling function in reaction to external push or pull forces can be used for implementing the invention.

The above mentioned object is also solved by use of an androgynous coupling or androgynous coupling means, respectively in a configuration as described above, for/in a spacecraft or satellite, especially for coupling at least two components of the following group of components: at least two satellites, or any device and a space station, at least two aerospace devices, especially in outer space or en route to outer space, or a plurality of components for mounting/ constructing an operational unit for extraterrestrial applications (e.g. satellite, space platform, telescope for outer space). This allows for the above mentioned advantages.

The above mentioned object is also solved by use of an androgynous coupling or androgynous coupling means, respectively in a configuration as described above, for/in a drone or for/in a quadcopter or multicopter, especially for coupling at least one component of the following group of components: at least one load/cargo, at least one parcel, at least one further aerodyne or aircraft. This allows for the above mentioned advantages.

The above mentioned object is also solved by use of an androgynous coupling or androgynous coupling means, respectively in a configuration as described above, for/in vehicles, especially for/in a truck or for/in truck trailers, especially for coupling at least two components of the following group of components: at least two vehicles, especially in series one after another, and at least two truck trailers, especially in series one after another. This allows for the above mentioned advantages.

The above mentioned object is also solved by an androgynous coupling means, especially androgynous coupling means configured for coupling with a corresponding androgynous coupling means in an androgynous coupling described above, where the androgynous coupling means exhibits both male and female coupling sections, the male coupling sections being provided with at least one lateral locking contour facing in a radial direction and exhibiting at least one radial recess configured for form fit with at least one blocking element based on radial interlocking, the at least one blocking element being positionable in a radial direction based on relative axial actuation on the blocking element. The androgynous coupling means exhibits an inner cavity configured for arranging at least one component providing for electrical connection of corresponding coupling means, preferably configured for arranging the whole assembly group for providing and relatively positioning at least one power and/or data transfer pin arranged in an axial direction, the inner cavity being arranged radially inwards with respect to the radial recess, especially at least approximately centrally. This also provides for electric coupling, based on the advantages described above.

According to a further aspect of the invention, in addition or alternatively to the embodiments described above, the above mentioned object can also be solved by an androgynous coupling means exhibiting both male and female coupling sections, where the androgynous coupling means is configured for form fit coupling with at least one further androgynous coupling means exhibiting geometrically respective male and female coupling sections, characterized in that the androgynous coupling means exhibits a motor and a gearing mechanism with at least one gear coupled to the motor. By actuating the motor and the gearing mechanism, a slotted link element can be pivoted, the motor and the gear being arranged and configured for bidirectional rotational actuation and positioning of the slotted link element. The slotted link element exhibits at least one cam contour providing a slotted link in the circumferential direction and providing an axial actuation when rotating/pivoting the slotted link element, the cam contour preferably interacting with a plurality of (radially) engaging pins. The androgynous coupling means exhibits at least one ring being actuated/driven by the slotted link element, especially a forcing ring, the at least one ring being configured for axially engaging a corresponding coupling means when actuated by the slotted link element. The at least one ring is positionable in at least two predefined relative axial coupling positions, namely at least one engaging axial position and at least one disengaging axial position. For de-/coupling, the androgynous coupling means is configured for actuating and axially positioning the at least one ring, especially forcing ring, based on rotation of the slotted link element such that the androgynous coupling means is fixedly positioned/positionable in axial relative position with respect to the corresponding androgynous coupling means (coupled or decoupled state). This provides for advantages already described above.

According to one embodiment, the androgynous coupling is configured for bidirectional axial actuation and positioning of an adapter ring in at least two predefined relative axial coupling positions, especially along the contour of an indexing ring, one of the axial actuation forces being a constraining force resulting from pivot actuation of a slotted link element, and the other axial actuation force being a spring-loaded force in opposite axial direction, especially spring forces guided/directed by axial forcing pins.

According to one embodiment, the androgynous coupling means is configured for bidirectional axial actuation and positioning of a first ring along the contour of a second ring, the second ring defining the at least two predefined relative axial coupling positions, especially by means of a push-pull-mechanism or a push-push-mechanism, especially by means of force-loaded actuation along a saw tooth profile of the second ring.

In particular, for axial engagement in the corresponding androgynous coupling means, one or two rings may interfere with the slotted link element, where by actuation of the slotted link element, at least one ring is axially positioned according to the profile of a further ring which defines the at least two axial coupling positions, especially based on force-loaded actuation in at least one axial direction.

In particular, the androgynous coupling can be configured for bidirectional axial actuation of an adapter ring (third ring) by means of at least one of first and second cam contours of the slotted link element, where the adapter ring is arranged and functioning as an intermediate between the slotted link element and an indexing ring defining the at least two predefined relative axial coupling positions.

In particular, the slotted link element can be provided in the form of a bushing or cylindrical ring arranged within a cavity of a base body of the androgynous coupling means, especially within a cavity within at least two or three rings interfering with the slotted link element.

In particular, the slotted link element may exhibit a first cam contour and a second cam contour, each providing a slotted link in the circumferential direction when rotating the slotted link element, the cam contours preferably each interacting with a plurality of (radially) engaging pins.

In particular, a forcing ring is provided in an arrangement axially engaging an adapter ring or axially engaging, in a coupled state, a corresponding androgynous coupling means, especially by means of axially overlapping pins. This also allows for high accuracy and exact actuation along the whole circumference of the coupling. The forcing ring can be guided/positioned by an open contour or alternatively by a closed contour. According to a variant, axial engagement may be added or superposed by optionally additional radial engagement.

According to one embodiment, the androgynous coupling is configured for actuating the adapter ring based on actuation of a corresponding forcing ring by rotation of the slotted link element. The androgynous coupling can be configured for actuating the adapter ring along a second cam contour such that the adapter ring can be positioned by external impact/influence against preload forces, especially against preload springs being arranged in axial alignment with forcing pins, especially in reaction to external impact/influence exerted by a forcing ring and forcing pins of the corresponding coupling means.

According to one embodiment, the androgynous coupling is configured for actuating the adapter ring based on rotation of a corresponding slotted link element.

The androgynous coupling means may comprise an indexing ring exhibiting a saw tooth profile or a saw tooth tread design, the indexing ring engaging the adapter ring or vice versa. The androgynous coupling means may comprise an indexing ring exhibiting at least two types of axial recesses (especially grooves or channels): first axial recesses having a first length and second axial recesses having a second length longer than the first length.

The androgynous coupling means may comprise an activation ring interacting with an indexing ring.

It has to be noted that this mechanism may be replaced by any other alternative push-push-mechanism or push-pull-mechanism.

According to one embodiment, the first cam contour is an open or a closed contour, and the second cam contour is an open contour.

According to one embodiment, the (respective) cam contour circumferentially extends along a circumferential angle of at least 90°, preferably at least 120°, especially along a circumferential angle being a factor of 360°, e.g. a factor of ⅕ or ⅙.

At least one of the following mechanical interfaces is force-loaded, especially by means of at least one pressure spring: a mechanical interface between a slotted link element and an adapter ring, a mechanical interface between an indexing ring and an activation ring, a mechanical interface between a wedge-shaped ring and the base body.

The gearing mechanism may comprise a plurality of spur gears and/or at least one planetary gearing. The motor and the gearing mechanism can be arranged within a cavity of at least one ring of the androgynous coupling means.

The androgynous coupling means may exhibit a ring-in-ring arrangement of at least three rings, at least two of the rings being axially spring-loaded, and at least one of the rings interacting with the at least one ring being driven by the slotted link element.

According to a further aspect of the invention, the above mentioned object can also be solved by an androgynous coupling comprising at least two androgynous coupling means, especially androgynous coupling means as described above. The androgynous coupling is configured for coupling in a form fitting manner, especially for coupling a plurality of modules each comprising at least two androgynous coupling means. Each androgynous coupling means exhibits a motor and a gearing mechanism with at least one gear coupled to the motor, the motor and the gear being arranged and configured for bidirectional rotational actuation and positioning of a slotted link element. Each androgynous coupling means exhibits at least one ring being actuated/driven by the slotted link element, especially a forcing ring, the at least one ring being configured for axially engaging the corresponding coupling means when actuated by the slotted link element. The at least one ring is positionable in at least two predefined relative axial coupling positions, namely at least one engaging axial position and at least one disengaging axial position. For de-/coupling, the androgynous coupling is configured for actuating and axially positioning the at least one ring, especially forcing ring, based on rotation of the slotted link element such that the corresponding (passive) androgynous coupling means can be activated by actuation of only one of the androgynous coupling means. This provides for the above mentioned advantages.

The androgynous coupling can be configured for rotating the androgynous coupling means with respect to each other by at least 90° or by a multiple of 90°, especially by means of actuating rotational motion of a slotted link element for axially positioning of form-fit elements (especially axially engaging pins).

Each androgynous coupling means may provide for a spring-loaded ring-in-ring arrangement of at least three rings, at least two of the rings being axially spring-loaded, where at least one of the rings of the ring-in-ring arrangement interacts with a push-push-mechanism or push-pull-mechanism for axially positioning of a forcing ring in at least two predefined relative axial coupling positions, namely at least one engaging axial position and at least one disengaging axial position, the forcing ring being arranged within the ring-in-ring arrangement.

Axial positioning for axial interference of the corresponding androgynous coupling means can be ensured based on relative rotation by a circumferential angle of at least 90°, preferably at least 120°, especially along a circumferential angle being a factor of 360°, e.g. a factor of ⅕ or ⅙.

According to the further aspect of the invention, the above mentioned object can also be solved by an androgynous coupling means, especially androgynous coupling means configured for coupling with a corresponding androgynous coupling means in an androgynous coupling as described above. The androgynous coupling means exhibits both male and female coupling sections. The androgynous coupling means exhibits a motor and a gearing mechanism with at least one gear coupled to the motor. By actuating the motor and the gearing mechanism, a slotted link element can be pivoted. The androgynous coupling means exhibits at least one ring being actuated/driven by the slotted link element and being configured for axially engaging a corresponding coupling means when actuated by the slotted link element. The androgynous coupling means exhibits an inner cavity arranged within the at least one ring and configured for arranging at least one component providing for electrical connection of corresponding coupling means, preferably configured for arranging the whole assembly group for providing and relatively positioning at least one power and/or data transfer pin arranged in an axial direction, the inner cavity being arranged radially inwards with respect to the radial recess, especially at least approximately centrally. This allows for the above mentioned advantages.

According to the further aspect of the invention, in addition or alternatively to the embodiments described above, the above mentioned object can also be solved by a method of reversibly coupling at least two devices or modules by means of an androgynous coupling comprising at least two androgynous coupling means, especially by means of an androgynous coupling as described above, at least one androgynous coupling means being fixedly arranged (especially without any relative movement) on each device or module (androgynous coupling means is in a state fixedly mounted on the device/module). Coupling of the at least two androgynous coupling means (respectively coupling of the at least two devices) among each other is carried out in a form-fit manner based on axial interlocking by means of both male and female coupling sections on each of the two corresponding androgynous coupling means. By actuating a motor and a gearing mechanism, a slotted link element is pivoted such that at least one cam contour provides for axial actuation of at least one ring interacting with the slotted link element, especially a forcing ring, the at least one ring being actuated in an axial direction for axially engaging a corresponding coupling means. The at least one ring is positioned in at least two predefined relative axial coupling positions, namely at least one engaging axial position and at least one disengaging axial position. In the engaging axial position, the androgynous coupling means is fixedly positioned in axial relative position with respect to the corresponding androgynous coupling means, based on the axial interference of the at least one ring. This also allows for the above mentioned advantages.

Actuating and positioning the blocking elements can be initiated based on the mechanism already described above, in particular by a mechanism where the male and female coupling sections overlap in an axial direction. Fixing the relative axial position of corresponding androgynous coupling means in the coupled state is carried out in a form-fit manner based on radial interlocking by means of the male coupling sections of the respective androgynous coupling means, which male coupling sections exhibit at least one lateral locking contour. At least one blocking element is actuated for radially engaging the lateral locking contour of the male coupling sections of at least one of the androgynous coupling means and for axially blocking the respective androgynous coupling means based on the radial engagement.

In a coupled state, the at least one blocking element's position can be fixed in a form fit manner within a cavity of the lateral locking contour such that the device or module is coupled in a self-locking manner and such that the androgynous coupling means is fixedly positioned in an axial relative position with respect to the corresponding androgynous coupling means.

The at least one blocking element's position in the coupled state can be fixed by means of a positioning element (especially a ring, preferably a wedge-shaped ring) which is actuated in an axial direction. The at least one blocking element's position in the coupled state can be fixed by means of a fixing element, especially by a fixing element which is actuated in radial direction and which engages a positioning element engaging the blocking element(s).

For decoupling, an inner ring, especially an inner ring with wedge-shaped geometry or profile (V-ring; tapered ring) can be actuated in an axial direction, especially retracted, for unblocking the at least one blocking element.

For coupling, an outer ring can be actuated, especially retracted, such that form fit is released for allowing diagonal interlocking of a further coupling means, especially by actuating an inner ring with the preferably wedge-shaped geometry or profile.

Coupling with at least one device or module can be carried out by at least one of the following forms of actuation: hydraulic actuation, mechanic actuation, pneumatic actuation, electric actuation, magnetic actuation, electromagnetic actuation, and piezoelectric actuation.

According to the further aspect of the invention, the above mentioned object can also be solved by an androgynous coupling comprising at least two androgynous coupling means exhibiting both male and female coupling sections, processed by providing a motor and a gearing mechanism and a slotted link element within a central cavity of each androgynous coupling means. The slotted link element is coupled to the gearing mechanism such that it can be pivoted for bidirectional rotational actuation and positioning. At least one ring is coupled to the slotted link element such that the at least one ring is axially positioned in at least two predefined relative axial coupling positions by the slotted link element for axially engaging or disengaging a corresponding coupling means, and for coupling in the axially engaging position in such a manner that the androgynous coupling means is fixedly positioned in axial relative position with respect to the corresponding androgynous coupling means. This allows for the above mentioned advantages. This process for providing this kind of coupling means may be a manufacturing process and/or a mounting process (assembly). Such an androgynous coupling may e.g. also be processed by modular devices in outer space. Such an androgynous coupling may e.g. also be processed by connecting several components or arms for creating a robot. This process may include coupling of electrical connectors (also power/data/fluid lines), especially each line being coupled within the cavity defined by each coupling means. In particular, the internal coupling kinematics may provide for both mechanical and electrical coupling functionality, especially in an arrangement as described in more detail in the figures.

The present invention may also generally be described in view of functionality and applications and uses according to the following considerations.

The present invention may provide for androgynous coupling in an easy and robust manner, especially by relatively small and robust relative motion and positioning. Radial engagement may allow for interlocking of corresponding coupling means in a predefined axial relative position in which corresponding male and female coupling sections are already interlocking and engaging each other. In particular, radial engagement may involve form-fit and/or force-fit, and radial engagement may be evoked by axial relative positioning of at least one positioning element, especially in the form of a ring.

The present invention may also provide for a coupling function for any of power, data, and/or fluid transfer lines. In particular, a plurality of openings or feedthroughs may be provided on a (central) docking area of each coupling means, where internal coupling kinematics allow for relative axial positioning of each connector or receptacle component, especially at a predetermined phase of the coupling process. In particular, preferably, this axial positioning of ends of lines for transferring power, data, and/or fluids can be carried out based on the same internal coupling and positioning kinematics which are provided for the mechanical coupling process.

Further, the present invention may ensure coupling of an active coupling means with at least one passive coupling means (e.g., motor of passive coupling means in an inactive state) by providing internal coupling kinematics configured for relative axial positioning of activating means (especially activating ring or activating pins), where the activating means are configured and arranged for engaging the corresponding passive coupling means, especially via a central docking area, especially in a purely axial direction (preferably axial forcing pins). This also provides for robust functionality and high reliability of operation.

In particular, the present invention allows for synergetic combination of at least two aspects, namely a first aspect referring to the blocking of relative position of corresponding coupling means (i.e., referring to the manner of mechanical interlocking and to the manner of blocking any relative movement by means of form-fit and/or force-fit), and at least one further (second) aspect referring to internal coupling kinematics which may ensure relative internal positioning, especially relative internal positioning of a plurality of rings with respect to each other (especially by actuating a push-push-mechanism or a push-pull-mechanism), and also further at least one further (second) aspect referring to external coupling kinematics which may ensure coupling of a passive coupling means by external engagement (especially by axially protruding forcing pins), especially also by relative axial positioning of coupling components. In other words: it has been found a solution which may provide for a plurality of favorable aspects for mechanical coupling and for connecting coupling means via a plurality of different interfaces, where the inventive coupling mechanisms may also be duplicated several times within the same coupling arrangement.

In particular, blocking of axial relative position of at least two rings of a ring-in-ring-arrangement advantageously can be carried out by radial engagement in radial recesses. In particular, relative axial positioning of internal and external coupling components advantageously can be carried out by a force-loaded push-push-mechanism or a push-pull-mechanism which is actuated by at least one slotted link element with at least one guiding contour, especially a circumferential guiding contour. It has been found that this kinematic concept may be realized not only for mechanical coupling, but also for electrical coupling, for coupling of power lines, for optical coupling, for coupling of fluid transfer lines (e.g., gas, liquids, fluids) and/or for data coupling (especially for any combination of lines or links providing for fluids, power, data). In particular, the inventive coupling may provide for robust and elegant coupling of electric connectors.

The present invention allows for arrangement of a plurality of connecting elements and interfaces for different fluids and/or power and/or data, especially centrally within a cavity defined by at least one ring or body of the coupling means, especially axially leading to a central plane docking area of the coupling means. In particular, the present invention can be implemented in any coupling application which relies on connection of coupling partners in an axial direction, especially in one of the following applications or at least in context with such applications: planetary gear, hydraulic coupling, mechanic coupling, pneumatic coupling, electric coupling, locking system, industrial machine, robot, vehicle, satellite, tool, drill pipe, boring tool, spacecraft, space station, aerodyne, aircraft, aerospace device, extraterrestrial application, drone, copter/multicopter, cargo device, parcel, truck, and/or truck trailer.

BRIEF DESCRIPTION OF THE DRAWINGS

In the following, the invention is described based on several figures and reference signs. For reference signs which are not explicitly mentioned in a specific one of the figures, reference is made to the further figures. The following figures describe coupling mechanisms and coupling components according to embodiments of the invention, especially also in view of further connections for electric/data/fluid lines, which may optionally be provided by the inventive coupling, too.

FIG. 4 shows a sectional side view of an androgynous coupling means resp. androgynous coupling, especially for purely mechanical coupling;

FIGS. 5A, 5B, 5C, 5D, 5E, 5F, 5G, 5H, 5I show in several views the configuration and specific components of an androgynous coupling means resp. androgynous coupling according to one of the embodiments of the invention, especially for purely mechanical coupling;

FIGS. 6A, 6B, 6C, 6D, 6E show in several views the configuration and specific components of an androgynous coupling means resp. androgynous coupling according to a further one of the embodiments of the invention;

FIGS. 7A, 7B, 7C, 7D, 7E, 7F show in several views the configuration and specific components of an androgynous coupling means resp. androgynous coupling according to a further one of the embodiments of the invention;

FIGS. 11A, 11B show in perspective views use of an androgynous coupling according to the invention;

DETAILED DESCRIPTION OF THE PREFERRED EMBODIMENTS

In the following, at first, the invention is described generally, by referring to all reference signs and all figures. Secondly, the invention is described in a more specific manner, by referring to each figure individually.

The present invention refers to mechanisms and components for androgynous coupling. All reference signs are mentioned in descriptive manner (not exclusively). Reference to one element of a specific embodiment may comprise any reference to further embodiments (if not explicitly denied).

Figure 1:
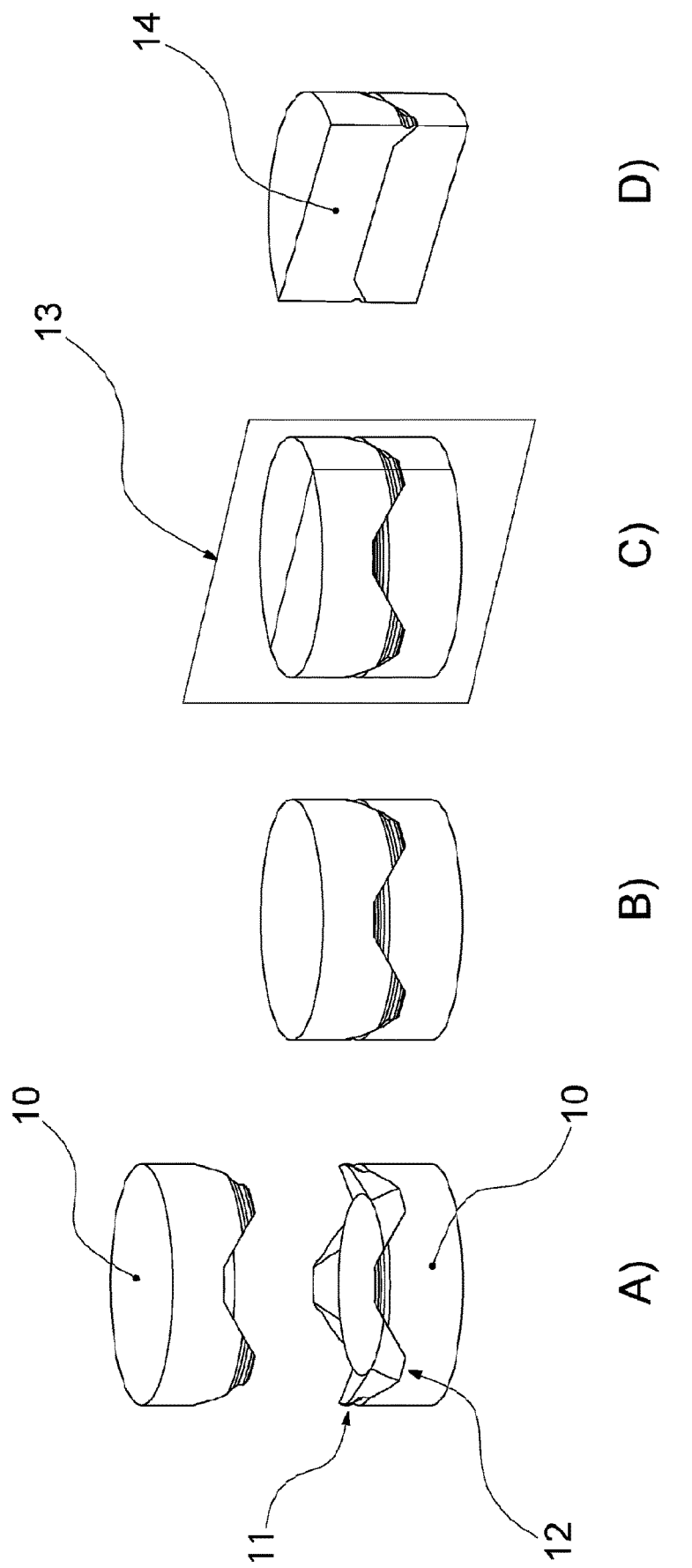
FIG. 1 shows schematic illustrations of corresponding androgynous coupling means in several views.

FIG. 1 shows two corresponding androgynous coupling means 10 respectively exhibiting male coupling sections 11 and female coupling sections 12. A pair 13 of axially engaging and interlocking coupling means is shown in view C), and a cross-section 14 of a pair of corresponding coupling means is shown in view D).

Figure 2:
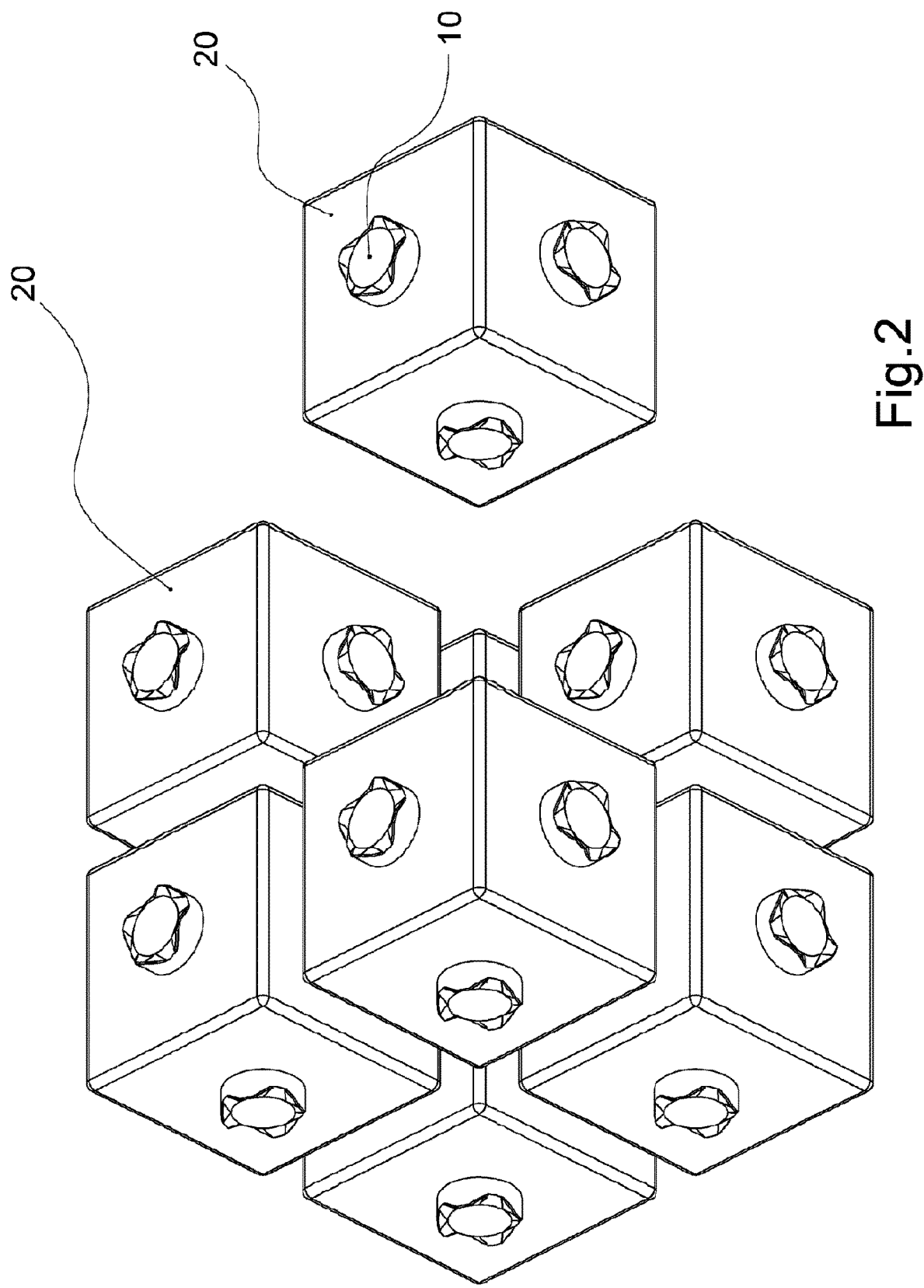
FIG. 2 shows a number of devices or modules, each having androgynous coupling means.

FIG. 2 shows a plurality of modules or devices 20 (especially cube satellite or satellite cubes) each having several lateral faces on which an androgynous coupling means 10 is mounted. The cubes may be coupled among each other at a plurality of lateral faces, resp. by a plurality of pairs of androgynous coupling means 10, especially on each lateral face (six faces in case of cubes). This kind of modularity may be ensured due to the inventive coupling mechanism.

Figure 3:
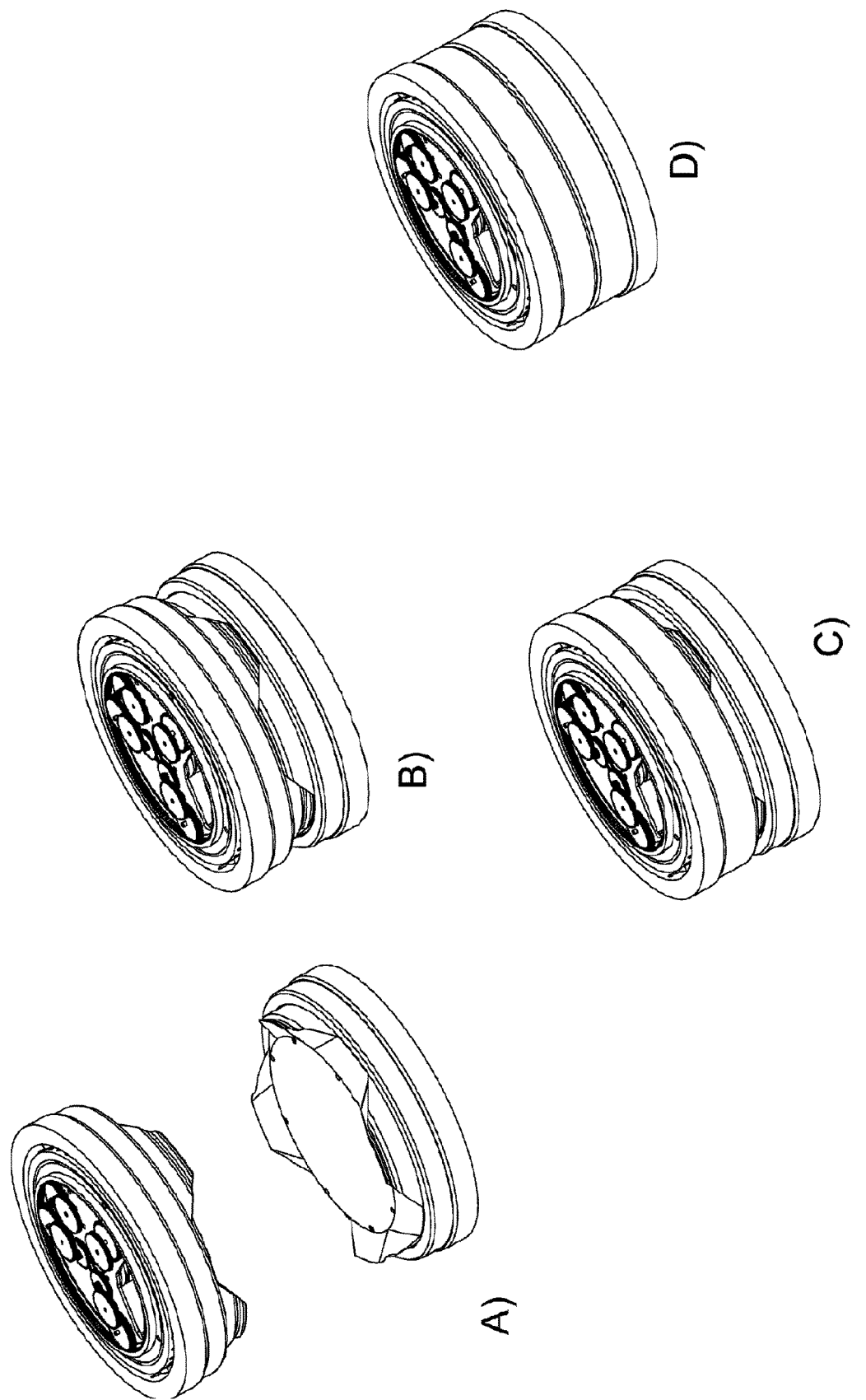
FIG. 3 shows corresponding androgynous coupling means in several views in different coupling states.

FIG. 3 shows one concept of the inventive androgynous coupling, especially for a purely mechanical coupling procedure. The pair of androgynous coupling means may comprise an active side (actively coupling androgynous coupling element) and a passive side (passive androgynous coupling element).

In FIG. 3A, the upper androgynous coupling means is an actively coupling androgynous coupling means; FIG. 3A illustrates a position finding procedure (situation C; S4), supported by form fit. In FIG. 3B, the actively coupling androgynous coupling means is actuated for mechanical engagement in an axial direction (situation D; S5). FIG. 3C illustrates a state in which the passive side is forced to engage the active side (situation D; S5). FIG. 3D illustrates the fully engaged state (situation E; S6).

FIG. 4 shows components of an androgynous coupling means, in particular a motor 130 and gear components 131, 140, 150, 160 (drive unit) as well as parts of a sensor arrangement 170, 180, 190. It can be seen that three different assembly groups are arranged in radial sequence, namely a drive unit 130, 140 (motion pattern generator based on relative rotation, especially including at least one slotted link element), an internal push-push-mechanism or push-pull-mechanism (internal state machine defining a mechanically engaged or disengaged state) and relative positioning kinematics for corresponding interlocking of blocking elements at male coupling sections (mechanical locking for fixing axial relative position, resp. for fixing the coupling state between corresponding coupling means). This radial serial arrangement also provides the advantage of compact and robust arrangement of multi-functionality within little available space, especially with short axial installation length.

All components are arranged within an axial section which is defined by the axial extension of a base body 70 of the androgynous coupling means. The drive unit 130, 140 is arranged centrally within a cavity 75 defined by the base body. Further radially outwards is arranged a motion pattern generator, a state machine (mechanical engagement/disengagement) as well as a mechanical locking mechanism (mechanism for axial interlocking based on radial engagement).

Figure 5A:
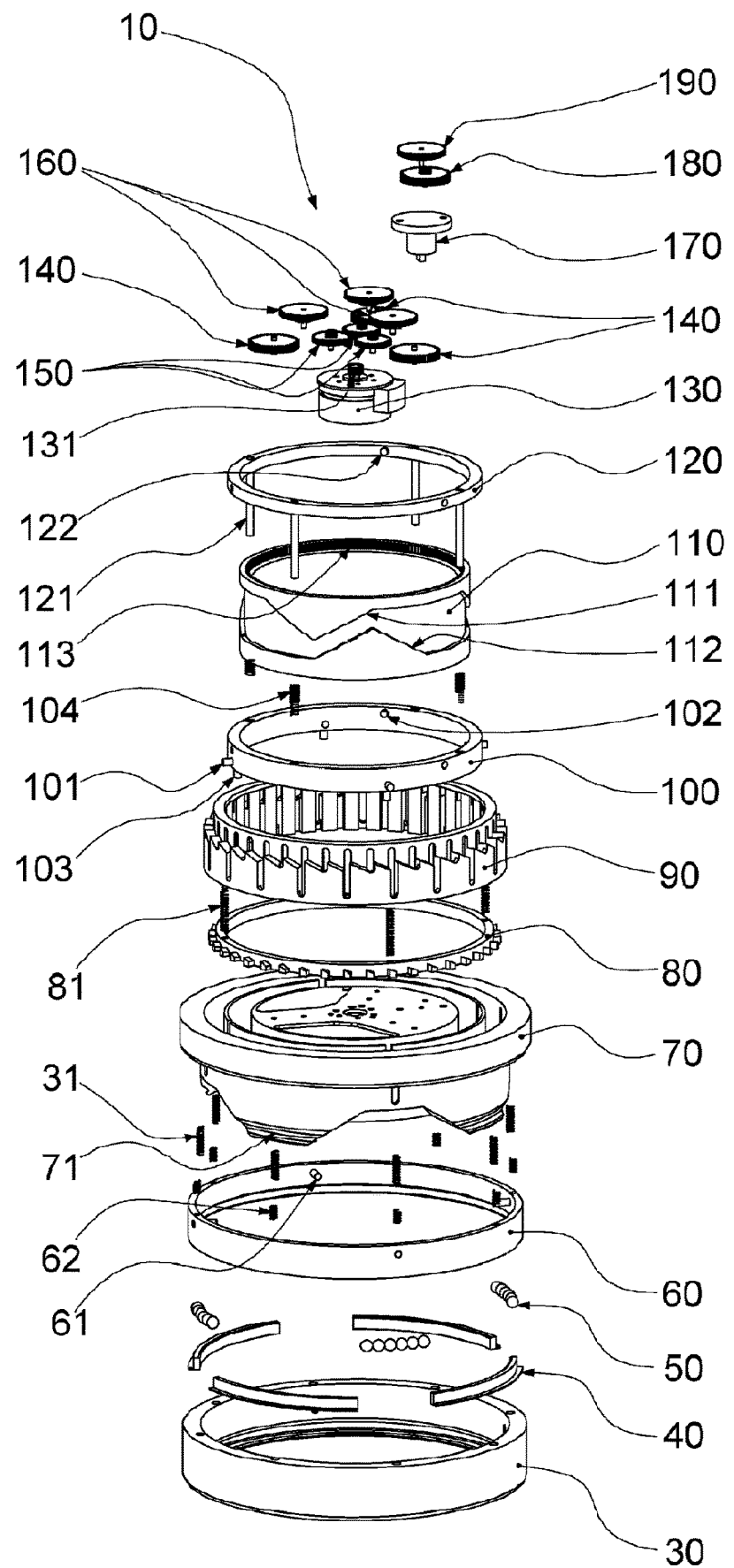

FIG. 5A, 5B, 5C, 5D, 5E, 5F, 5G, 5H, 5I show an androgynous coupling means 10 according to one of the embodiments of the invention. FIG. 5A shows an outer ring 30 with ball separator elements 40 arranged therein for separating several groups of balls 50 (blocking elements). A positioning element 60, especially a ball wedge ring, is arranged within the outer ring 30. Guide pins 61 (fixing elements) allow for guiding the ring 60 with respect to the blocking elements, especially for locking the blocking element's relative position. The balls 50 may, e.g., be provided as rolling bodies, especially as hardened metal balls. They can of course be substituted by other blocking elements, especially pins 51.

The positioning element 60 overlaps a base body 70 which provides for male and female coupling sections 11, 12. The male coupling sections exhibit at least one radial recess 71.

The arrangement according to FIGS. 5A-5I is an exemplary arrangement for a push-push-mechanism.

An activation ring 80 is coupled to an indexing ring 90 by force-loading means 81. The indexing ring 90 exhibits a saw tooth profile. The activation ring 80 exhibits pins or trunnions with inclined contact surfaces, similar to a saw teeth profile. The pins or trunnions interfere with guiding slots on the inner lateral area of the indexing ring 90. Rings 80, 90 may rotate interdependently.

An adapter ring 100 exhibits several form fit elements 101, 102, 103, especially in the form of pins which may be force-loaded (especially spring-loaded). These elements protrude in axial and in radial directions. The adapter ring 100 is force-loaded, especially spring-loaded. Each pin may be force-loaded, preferably in an indirect manner.

A slotted link element 110, especially in the form of a cam disc or cam ring, is arranged between the adapter ring 100 and a forcing ring 120. The forcing ring 120 exhibits several form fit elements 121, 122. The forcing ring 120 is force-loaded, especially spring-loaded. Each pin may be force-loaded, preferably in an indirect manner.

The slotted link element 110 exhibits several guiding contours, in particular a first cam contour 111 (outer, top) and a second cam contour 112 (outer, bottom). The first cam contour 111 can be provided as an open contour or as a closed contour. The second cam contour 112 is an open contour, especially in order to guide any form fit elements (especially radial pins 102) in a unidirectional force-loaded manner (not bidirectional). In particular, this configuration allows for axially actuating (especially retracting) the adapter ring 100 (based on rotational actuation), especially with respect to pins 103, especially for axial engagement by pins 103.

The second cam contour 112 actuates the internal coupling mechanism which allows for relative positioning and for de-/coupling. A relative motion along the first cam contour 111 forces axial positioning of the involved ring(s), especially by means of pins 122 which interact with pins 103 of the corresponding coupling mechanism. Effect: corresponding adapter ring 100 (i.e., adapter ring 100 of the corresponding coupling element) is axially moved/positioned, especially according to the contour 112.

For example, the adapter ring 100 may interact with a ball pen mechanism or with any other push-push-mechanism. In particular, the adapter ring 100 is arranged and configured for actuating the activation ring 80, especially for relative rotation of the ring 80 with respect to the ring 100, especially by means of pins 101 engaging or loading the ring 80.

As an alternative, the adapter ring 100 and the activation ring 80 can be provided as a single integral component (especially one single piece), or rings 100 and 80 may at least be coupled together, for synchronous motion.

Axial relative motion of ring 80 with respect to indexing ring 90 allows for relative rotational motion of the rings 80, 90 within the cavity of the respective coupling means, the relative rotational motion being defined by the pins 61 being guided along the contour of the indexing ring 90 (especially along a saw tooth profile exhibiting grooves or channels of at least two different lengths).

Preferably, the contour of the indexing ring 90 provides for first recesses or grooves allowing for positioning of corresponding coupling means in a decoupled state (first length, short), and further provides for second recesses or grooves allowing for positioning of corresponding coupling means in a decoupled state (second length, relatively longer). In particular, the recesses or grooves are orientated strictly axially (no radial component or radial orientation).

In particular, indexing ring 90 interferes with activation ring 80 and with pins 61.

In conjunction with a push-pull-mechanism or with a push-push-mechanism, blocking elements 50, 51 allow for applying force-loading to the coupling.

The slotted link element 110 exhibits gear means 113, especially at least one hollow gear or internal gearing.

Same as the adapter ring 100, the forcing ring 120 exhibits several form fit elements 121, 122, especially in the form of pins which may be force-loaded (especially spring-loaded). These elements protrude in axial and in radial directions. The axially protruding form fit element 121 may be configured as outer forcing pins.

Preferably, the positioning element 60 exhibits several radial pins 61 distributed in a circumferential direction at least approximately evenly in several points (e.g. four radial pins each positioned 90° offset), and the positioning element 60 is axially force-loaded with respect to the outer ring 30, especially by means of a plurality of (axial) pressure springs 62. Furthermore, the outer ring 30 is axially force-loaded with respect to the base body 70, especially by means of a plurality of (axial) pressure springs 31. Outer ring 30 may provide for axial guidance of the positioning ring 60, especially within the outer ring 30. The base body 70 may provide for axial guidance of the outer ring 30, especially at an outer contour (lateral area) of the base body 70. This arrangement may be described as a ring-in-ring-arrangement of a plurality of axially guiding rings.

The springs described above may also provide for compensation of any alignment tolerances. The springs may further be combined with damping elements.

Both force-loading means 31, 62 also allow for damping/absorbing an axial motion during the coupling process. This also allows for good coupling characteristics, even when exact relative positioning of devices/modules is not easy.

Preload springs 31 and preload springs 62 and preload springs 104 respectively ensure force-loading of adjacent engaging components described above. In particular, preload springs 104 allow for back-pressure of the pins 102 against the contour 112, as well as for back-pressure of the pins 122 against the contour 111.

In particular, each coupling means may exhibit four types of force-loading means (especially springs) each operating in an axial direction, but each optionally operating also in further directions, especially when bypassed or deflected.

It should be noted that already one single contour may ensure the desired functionality. In particular, a closed contour 111 allows for relative motion without force-loading; then, any preload of pins 122 against the contour 111 is not required.

A motor 130 is coupled to the internal gearing 113 by means of a gearing 131 comprising or engaging first gearing means 140 (especially satellite gear) and/or second gearing means 160 (especially satellite gear) and/or third gearing means 150 (especially satellite gear). A position sensor 170 is implemented such that the positioning initiated by the motor 130 may be monitored. In particular, the position sensor 170 comprises first and second spur gears 180, 190. The motor 130 may be replaced by manual operation also (hand drive).

In particular, gearing means 131 are configured and arranged such that any axial and/or radial forces on slotted link element 110 are prevented.

The position sensor 170 may monitor at least one angular position, especially at least rotational motion of the slotted link element 110. In particular, the position sensor 170 may monitor the coupling procedure based on the angular position of the slotted link element 110. In particular, the position sensor 170 is configured for monitoring a relative rotation along a circumferential angle being a factor of 360°, e.g. a factor of ⅓ or ¼ or ⅕ or ⅙, preferably of at least 120°, thereby monitoring the process of the coupling resp. decoupling procedure.

As can be seen in FIG. 5A, the slotted link element 110 provides for coupling of axial and rotational actuation. The slotted link element 110 may also be designated as an "axial-pivot-coupler". The slotted link element 110 may also be designated as a "cam bushing".

The slotted link element 110 may provide for preferably at least three angular sectors each exhibiting a contour (resp. cam contour), e.g. for three angular sectors each exhibiting a contour circumferentially extending about a circumferential angle being a factor of 360°, e.g. a factor of ⅓ or ¼ or ⅕ or ⅙, preferably 120°, or an angle of 90° or 100° or 110°.

The configuration shown in FIGS. 5A-5I may exhibit further sensors, especially further sensors monitoring start/end of de-/coupling procedures, e.g. with respect to angular start/end points. In particular, sensors of corresponding coupling means may exhibit communication modules configured for communicating with further sensors. In particular, sensors for detecting radial orientation of coupling partners may be provided; this is, e.g., quite useful in robot applications.

Figure 5B:
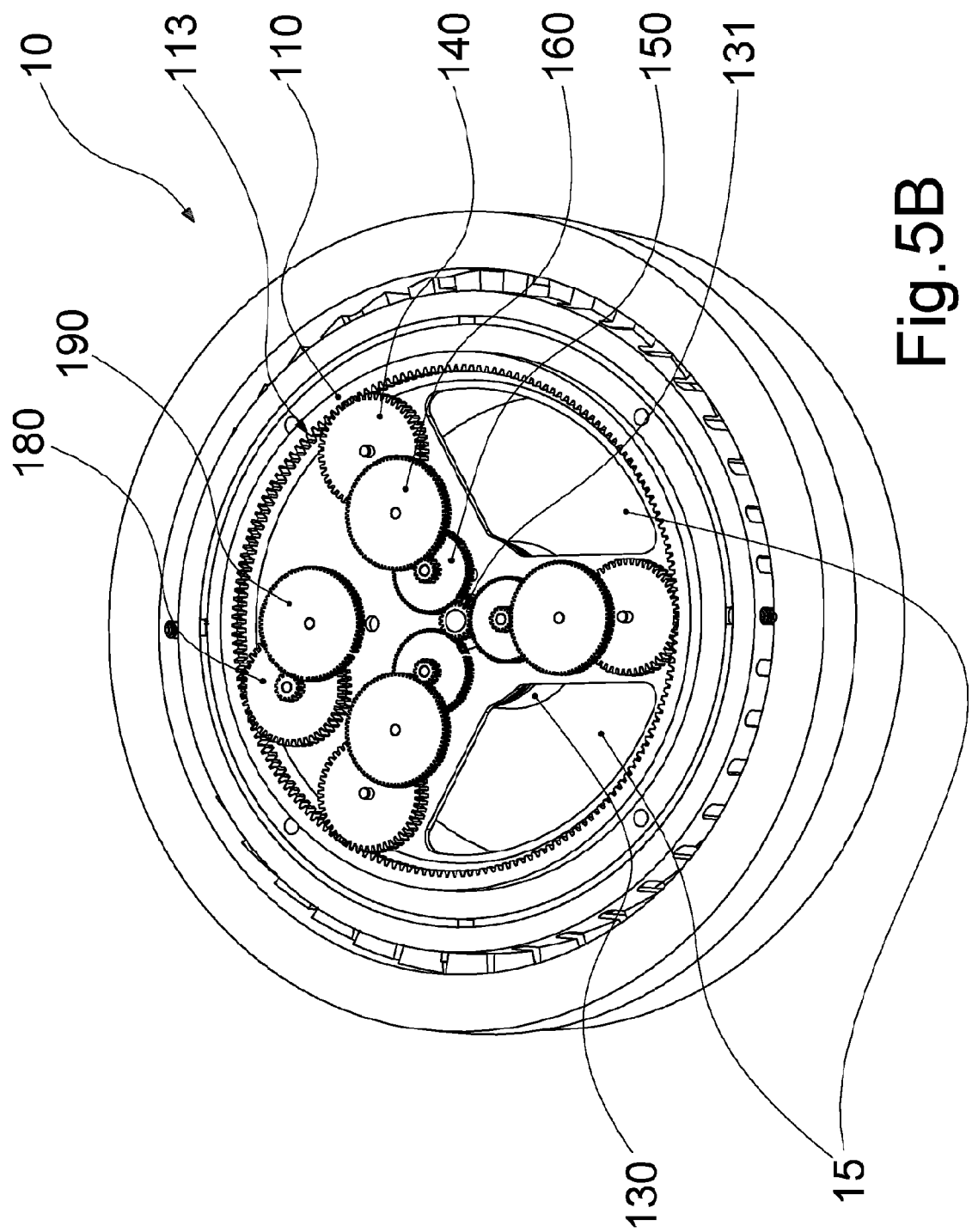

FIG. 5B shows, in a perspective view onto the underside resp. onto the rear side, in detail the internal gearing 113 provided in the structure of the slotted link element 110. In addition to gear components already described above, FIG. 5B shows openings 15, especially configured for cable feedthrough.

Figure 5C:
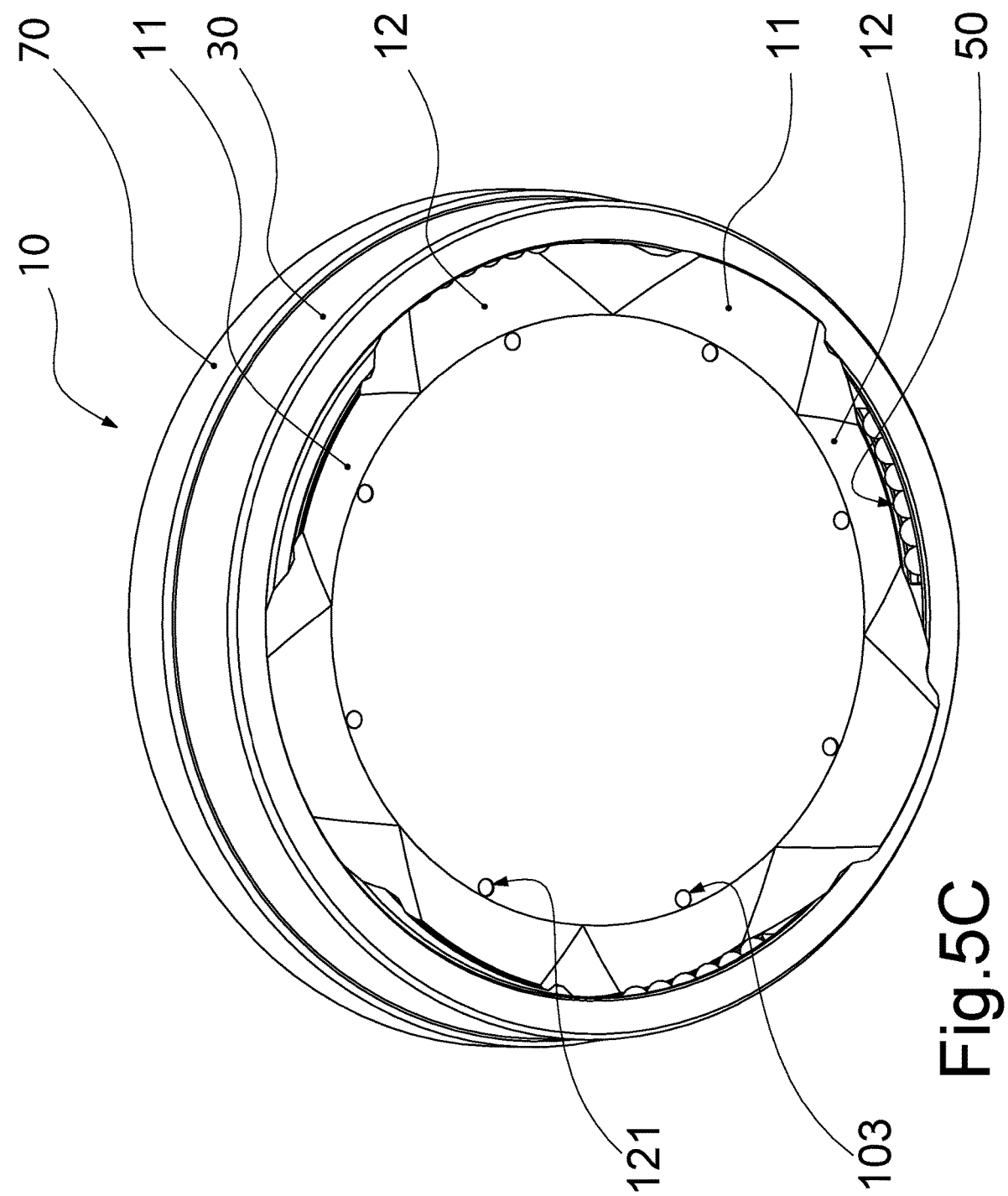

FIG. 5C shows, in a perspective view onto the upper side resp. onto the front side, in detail the form-fit contour 11, 12 of the respective coupling means 10. Male and female coupling sections 11, 12 alternate in a circumferential direction. Pins 103, 121 are part of the axial interlocking as described above. In particular, for each male coupling section 11 is provided one axial pin 121 resp. the corresponding channel or lead through, and for each female coupling section 12 is provided one axial pin 103.

Figure 5D:
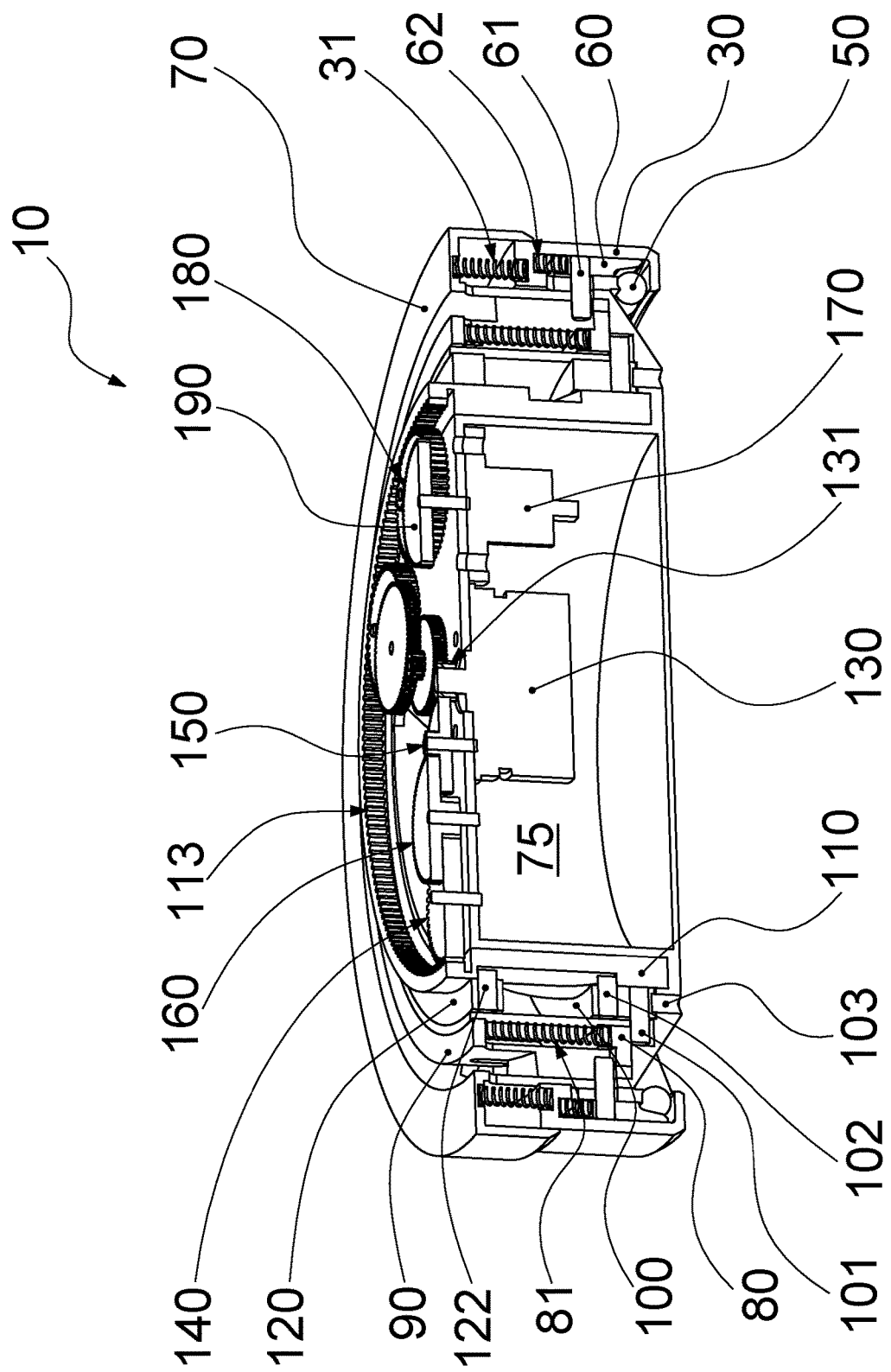

FIG. 5D shows, in a sectional side view, in detail the arrangement of the motor and gear components within a cavity of the base body 70 (or within a cavity created by the base body 70 or by the slotted link element 110). Such an arrangement also favors a relatively flat design of the whole coupling.

FIG. 5E shows a pair of coupling means 10 both exhibiting the components according to FIG. 5D, in a decoupled state (no radial engagement of blocking elements 50, 51 in radial recess 71). The respective outer ring 30 of both passive coupling means 10, 10 is retracted. The ring 60 exhibits a conical wedge-shaped geometry, which allows for actuating the blocking elements 50, 51 for radial motion and for radially positioning the blocking elements 50, 51 within the radial cavity 71. This kind of radial form-fit blocking allows for interlocking of corresponding coupling means also in an axial direction.

In other words, by a relatively small (short) actuating motion of relatively small elements (preferably balls), coupling of considerably high loads and forces may be ensured. This aspect emphasizes the fact that the present inventive coupling arrangement allows for a safe and robust process for a broad range of forces and for a broad spectrum of applications. Thereby, the blocking elements 50, 51 may even autonomously search and find the designated end position (within recess 71; cf. FIG. 5H), especially when provided in the shape of spheres/balls. Also, the recess 71 may be provided in a shape facilitating this self-positioning mechanism, e.g. in the shape of a half-shell or a hollow sphere geometrically corresponding to the shape of the blocking elements 50, 51.

In particular, FIG. 5E shows a situation A according to step S2, namely a state with the docking/coupling means detached from each other.

FIG. 5F shows the components according to FIG. 5E, in a state in which the corresponding coupling means 10, 10 are already docking, but in which the outer ring 30 is not yet actuated or positioned in the axial direction (axial interlocking, but not yet radial engagement of the blocking elements). Rather, the outer ring 30 is retracted (pre-stressed springs 31, 62). This retracted position also facilitates coupling and interlocking of the male and female coupling sections 11, 12. In particular, activation of a passive coupling means may be initiated by internal axial engagement; the outer ring 30 may be initiated to axially move in reaction to axial engagement within the internal coupling mechanism.

In particular, FIG. 5F shows a situation B according to step S3 in which the active coupling means deploys its engagement mechanism, both coupling components being axially retracted (axial springs are all preloaded).

FIG. 5G shows in detail in a sectional side view as well as in a detailed view a cross section 1 of a pair of corresponding coupling means 10, 10, in an interlocking state (coupled state), both axially and radially engaged (radial engagement of blocking elements 50, 51 in radial recess 71). In particular, FIG. 5G illustrates an interaction between pins 121 and pins 103 in the axial direction. Referring to the orientation of FIG. 5G, the upper one of the two coupling means 10, 10 is active, and the lower one is passive. An active coupling means may be characterized by an active motor/actuation. The outer ring 30 of the passive coupling means 10 is retracted (not advanced, not extended). FIG. 5G also shows that base body 70 provides for a ring cavity for accommodating the outer ring 30, and the outer ring 30 provides for a ring cavity for accommodating the ring 70. Thereby, axial guiding can be ensured in quite exact and robust manner.

In particular, FIG. 5G shows a situation C according to step S4 in which the active coupling means deploys or has already deployed the engagement mechanism, the coupling components of the passive coupling means being (still) axially retracted. Active and passive state may be inverted also.

FIG. 5H shows the components according to FIG. 5E, in a fully coupled state (especially situation D). The respective outer ring 30 of both coupling means 10, 10 is positioned in an extended axial position. The respective passive element 10 can be forced for axial/radial engagement by the respective active element 10. In the coupled state according to FIG. 5H, the front face of the outer ring 30 is in contact with the front face of the corresponding outer ring 30.

In particular, FIG. 5H shows a situation D according to step S5 in which the active coupling means forces the passive coupling means to deploy its engagement mechanism, both coupling components being axially extended (driven out).

As shown in FIG. 5G, 5H, the outer ring 30 can be axially actuated such that the coupling mechanism may be retracted out of ring 60, ring 30, elements 50, 51 and elements 40. Effect: male and female coupling sections 11, 12 are cleared such that diagonal approximation or diagonal arrangement or diagonally angled relative positioning of corresponding coupling means is allowed or ensured. This further facilitates relative positioning of corresponding coupling means, even if e.g. external effects like vibrations or shocks may not be inhibited or anticipated. Thereby, the outer ring 30 interacts with ring 60 which may be axially guided by ring 30. By relatively positioning the ring 60 in an axial direction with respect to ring 30, the blocking elements 50, 51 are pushed radially inwards for form-fit in/within cavity 71, in order to ensure axial interlocking. Blocking elements 50, 51 preferably are provided as balls/spheres, but may also be provided as pins, rolls or any rolling element.

As described with regard to several figures, especially all FIGS. 5A-5I, balls 50 are one example of a blocking element according to the invention. However, the blocking elements 50, 51 can also be realized with modifications, especially by replacing a string of balls 50 by a pin 51. Such an implementation of pins 51 instead of balls 50 is described in FIG. 5I, which can of course be combined with the other embodiments of the invention, especially by the replacement of one or more balls 50 by a pin 51.

FIG. 5I corresponds to FIG. 5C and shows, in a perspective view onto the upper side resp. onto the front side, in detail the form-fit contour 11, 12 of the respective coupling means 10. Male and female coupling sections 11, 12 alternate in a circumferential direction. Pins 103, 121 could be used as part of the axial interlocking as described above with regard to the other figures. In particular, for each male coupling section 11 is provided one axial pin 121 resp. the corresponding channel or lead through, and for each female coupling section 12 is provided one axial pin 103. In conjunction with a push-pull-mechanism or with a push-push-mechanism, the pins 51 act as blocking elements 51 which allow for applying force-loading to the coupling. Preferably, each pin 51 which is capable of acting as a blocking element 51 has an axis which is arranged perpendicular to a radius of a more or less rotation symmetric coupling means 10.

Referring to FIG. 5E, 5F, 5G, 5H, 5I, the coupling mechanism is further described. An active coupling means (active motor/actuator) mechanically couples by activating its own internal mechanism. By means of form-fit elements of the active coupling means, especially by axially arranged outer forcing pins 121 of the internal mechanism of the active coupling means, the internal mechanism of the corresponding (passive) coupling means can be activated. In particular, form-fit elements exert an axial force on the corresponding passive coupling means; since mechanical coupling of respective male and female coupling sections is already ensured at this stage, the axial activation force may activate the axial positioning of the blocking elements of the passive coupling means, thereby also radially interlocking the corresponding male coupling sections by means of these blocking elements (especially balls). Forcing pins 121 are configured and arranged for forcing passive coupling means to couple with/to the active coupling means. Rotational actuation forcing axial relative motion, forcing axial engagement in corresponding coupling means, forcing actively coupling of a passive coupling means (axial engagement for activating passive coupling partner).

Decoupling may be initiated by relatively rotating the slotted link element 110 in the opposite direction. Actuating motion is provided by internal relative rotational actuation of cam contours (resp. cam profiles) and/or guide slots extending on a cylindrical lateral area. Decoupling may be initiated both by active or passive coupling means, i.e., the process of decoupling may be independent of any previous coupling procedures.

Actively or passively coupling may imply that the adapter ring 100 be actuated by internal and/or external forces, i.e. exclusively by the active internal coupling mechanism and/or by the coupling mechanism of the corresponding coupling means.

The active/passive mechanism described above also provides the advantage that passive (eventually defect) coupling means may be recuperated by an active coupling means.

According to one variant, coupling of two active coupling means may be controlled by controlling the actuation of both slotted link elements 110 of both coupling means, especially depending on each other, especially synchronous coupling motion of both slotted link elements 110. An active/active coupling process may, e.g., be advantageous in cases in which the motors/actuators of one of the coupling means should be supported by the motors/actuators of the corresponding coupling means.

The mechanism described above may also be implemented for electric coupling, as suggested in FIGS. 7A-7F.

As implied in FIGS. 5A-5I, each coupling means may exhibit further components for coupling not only forces or momentum, but also energy, data and/or fluids, where each corresponding component may be active or passive.

It has to be noted that the outer ring 30 in FIGS. 5A-5I may be replaced by an alternative component or may even be omitted, especially for simple connector applications.

It has to be noted that the profile 71 according to FIGS. 5A-5I may be duplicated in the axial direction, on the lateral area of the base body 70. This may also allow for omitting elements 40.

It has to be noted that the contour 11 may be provided in an interrupted configuration (open contour) or in a continuous configuration (closed contour).

FIGS. 6A, 6B, 6C, 6D, 6E show an androgynous coupling means according to a further one of the embodiments of the invention, where reference sign 16 signalizes an embodiment with power and data interface of a first type. For reference signs not explicitly described in the following, it is referred to in FIGS. 5A-5I.

Figure 6A:
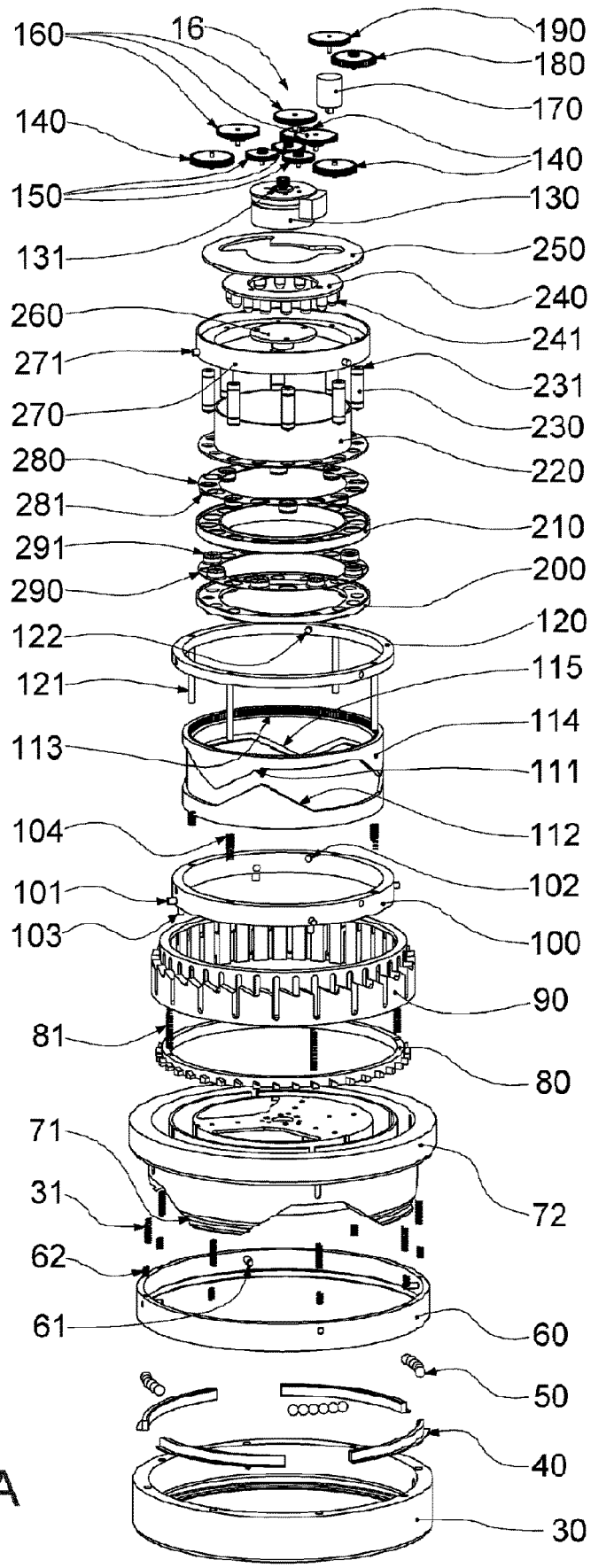

FIG. 6A shows a base body 72 for a power and data interface of a first type, where a slotted link element 114, especially a cam disc, is further provided with a (further, third) cam contour 115 (inner, closed). This configuration allows for relative axial positioning in two different manners, based on one single pivot actuation. In particular, the slotted link element 114 may provide for both electric and mechanic coupling.

FIG. 6A further shows the power and data interface of a first type, namely the following components: electrical isolation ring (lower) 200, (further) electrical isolation ring (middle) 210, (further) electrical isolation ring (top) 220, form fit elements 230, especially electrical power transfer pins (electrically conducting pins for transferring energy and/or data), mounting isolation 231 (isolation body also providing for mechanical connection of parts 230 and 270), (first) optical data interface 240 with optocoupler elements 241 (especially transceiver) and optocoupler element receivers 242 and transmitters 243 (FIG. 6B), control PCB 250 (control of coupling means), (second) optical data interface 260, drive ring 270 (especially for electrical power transfer pins) with form fit elements 271, especially guide pins, electrical power distribution ring (top) 280 with contact rings 281, electrical power distribution ring (bottom) 290 with contact rings 291. The ring 270 may provide for fixation of any elements for energy and/or data and/or fluid transfer. The ring 270 may provide for synchronous connection of all contact elements fixed thereto. Guide pins 271 also allow for mechanical connection of inner push-push-mechanism or inner push-pull-mechanism. In particular, the ring 280 is made of copper (or another material with high electric conductivity) and allows for energy and data connections by means of pins 230. Rings 280, 290 may be supported/bedded by force-loaded contact rings 281, 291.

Figure 6B:
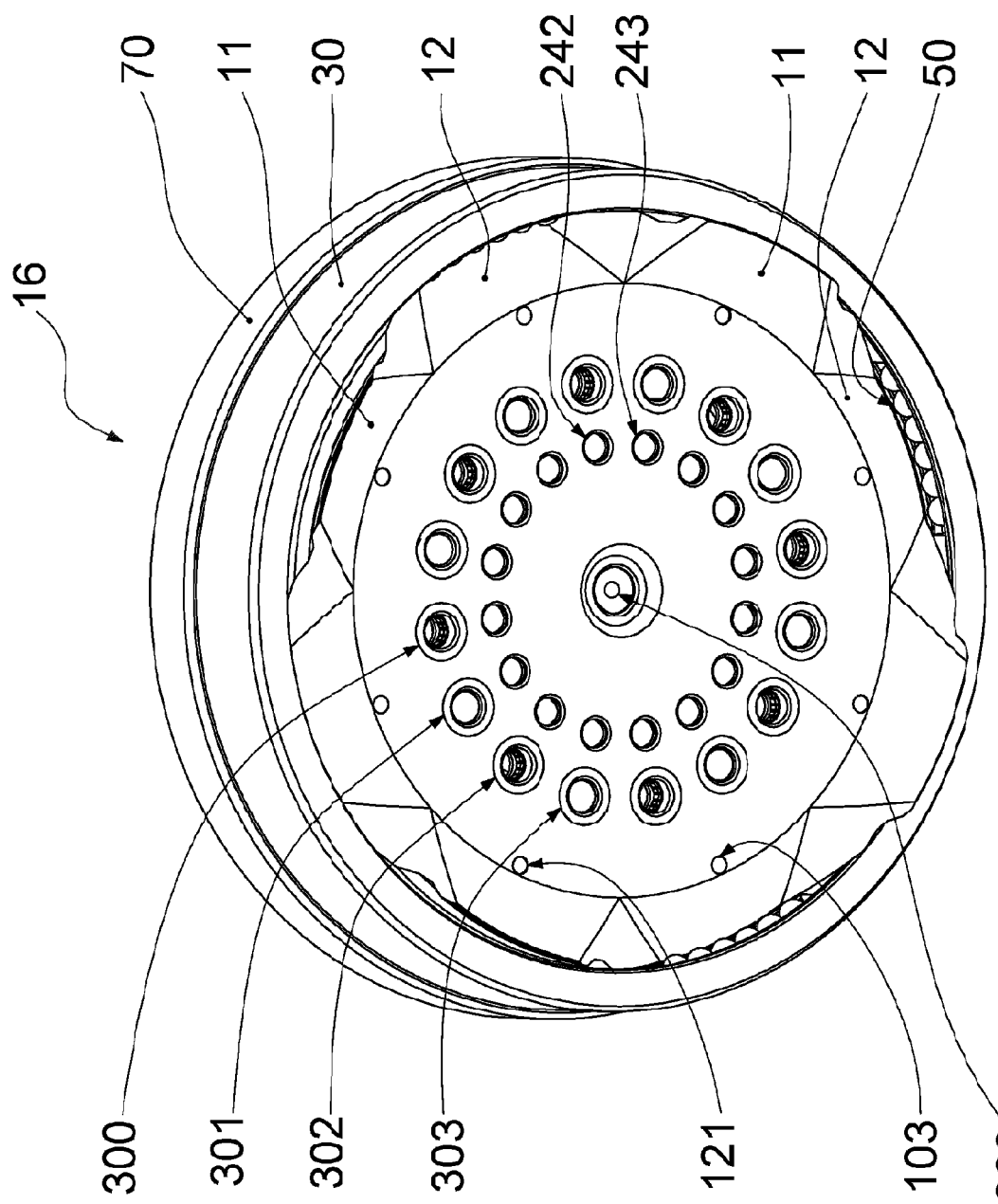

FIG. 6B shows, in a perspective view onto the upper side resp. onto the front side, in detail the electrical power inlet (first pole) 300 and electrical power outlet (first pole) 301, as well as electrical power inlet (second pole) 302 and electrical power outlet (second pole) 303. Elements 300, 301, 302, 303 allow for marking inlet or outlet openings at the front side of the respective coupling means, especially by an extended position or by an inserted position.

Figure 6C:
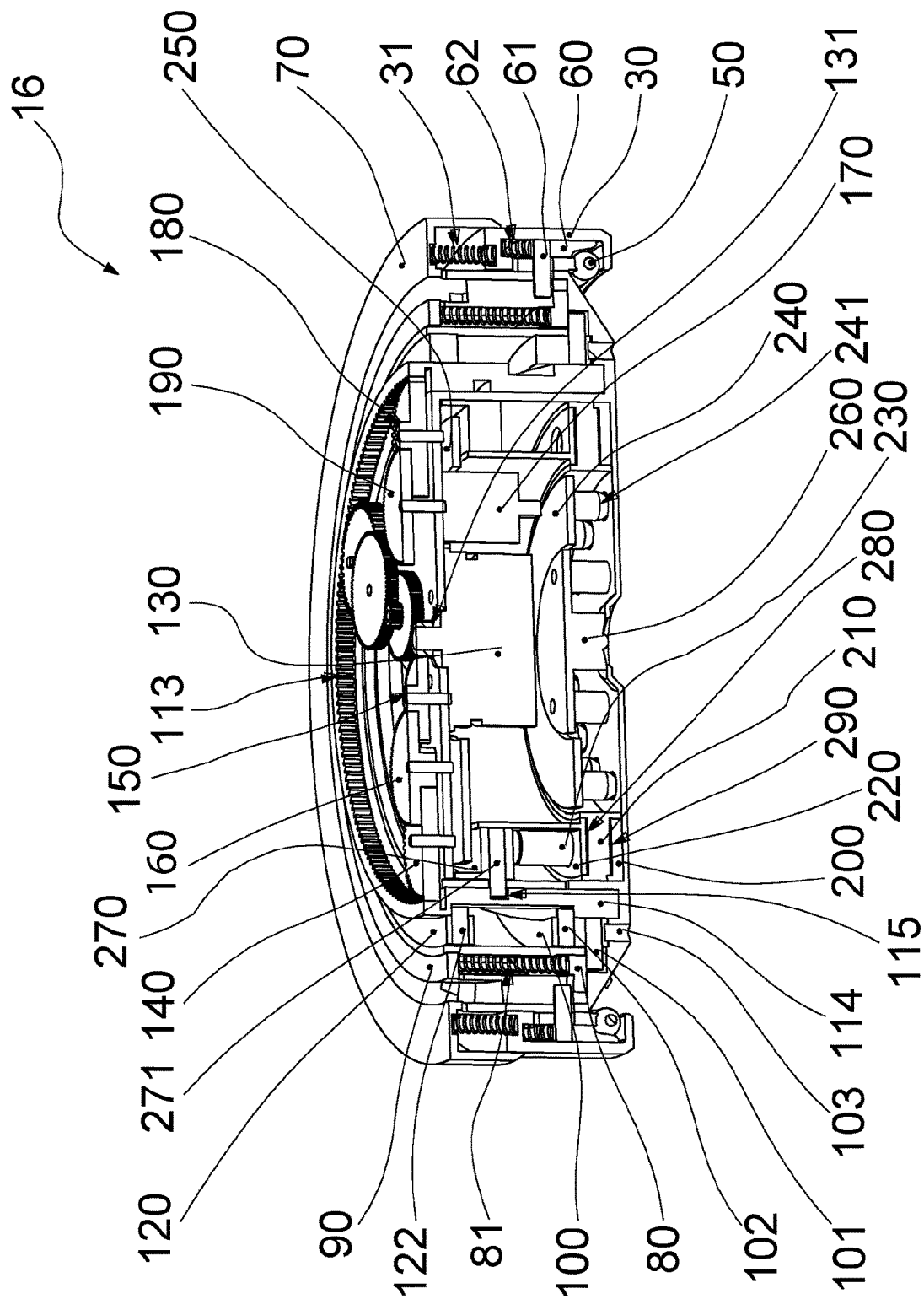

FIG. 6C shows, in a perspective view according to FIG. 5D, the configuration and arrangement of parts of the coupling within the central cavity.

FIG. 6D shows in detail in a sectional side view as well as in a detailed view a cross section 2 of a pair of corresponding coupling means 16, 16, in an interlocking state (coupled state, especially situation D), both axially and radially engaged. In particular, FIG. 6D illustrates electric connection by means of corresponding optocoupler elements 241 which are shown in contact with each other. Both outer rings are in the extended position (fully coupled). But, pins 230 for transfer of electrical power are not yet deployed.

At least the following components are arranged within the cavity 75 defined by the base body or by the slotted link element of the respective coupling element: 200, 210, 220, 230, 240, 241, 250, 270, 271, 280, 290.

FIG. 6E shows, in a perspective view according to FIG. 6D, a state in which electrical pins are axially extended such that electrical connection is ensured. The pins 230 are now deployed. In this coupling state (especially situation E), transfer of power and/or data can be carried out via optocoupler elements 241 contacting corresponding optocoupler elements 241.

FIGS. 7A, 7B, 7C, 7D, 7E, 7F show an androgynous coupling means according to a further one of the embodiments of the invention, where reference sign 17 signalizes an embodiment with power and data interface of a second type. For reference signs not explicitly described in the following, it is referred to FIGS. 5A-5I.

Figure 7A:
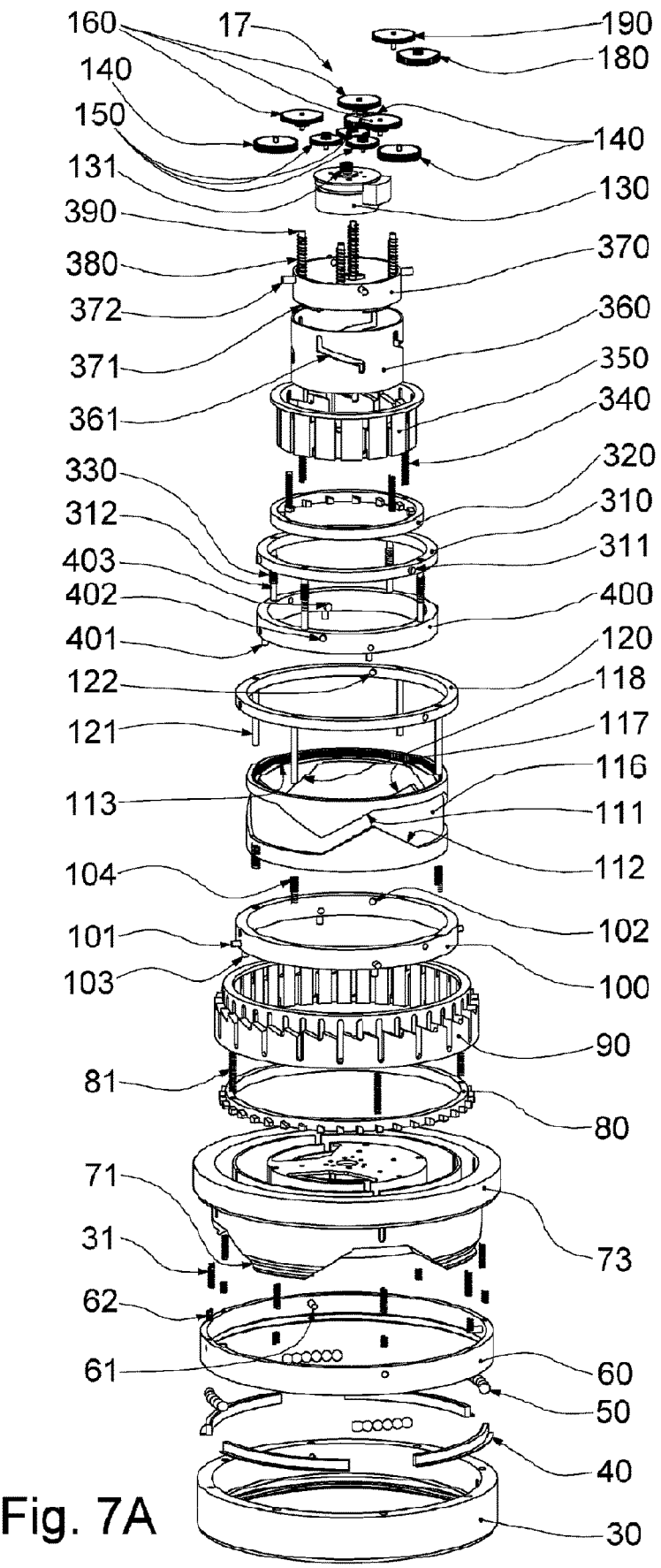

FIG. 7A shows a base body 73 for a power and data interface of a second type, where a slotted link element 116, especially a cam disc, is further provided with a (further, forth) cam contour 117, especially cam disc contour (inner, bottom), and further with a (further, fifth) cam contour 118, especially cam disc contour (inner, top). This configuration allows for a plurality of coupling functions within one single coupling, especially based on the same axial actuation kinematics for each function (especially mechanical and electrical).

FIG. 7A further shows the power and data interface of a second type, namely an inner forcing ring 310 with form fit elements 311, 312 (sliding pins and forcing pins), an activation ring 320, preload springs 330, force-loading means 340 (preload springs), indexing ring 350, ring 360 with shutter elements and form fit elements 361 (especially guide slots), ring 370 with ring pedal 371 and form fit elements 372 (especially guide pins), force-loading means 380 (especially electrical preload springs), form fit elements 390 (especially guide pins), adapter ring 400 with form fit elements 401, 402, 403, especially interaction pins and sliding pins. The ring 360 shuts opening/cavity. Slots 361 provide a guiding contour for pins 372. The ring 370 supports pedals 371 for arranging contact elements for energy, data and fluids. Force-loading means 380 (especially preload spring) allow(s) for preload of element 370, especially in a direction towards the corresponding coupling means. Guiding pin 390 allows for guiding the element 380.

Elements 370, . . . , 390 may be replaced by elements 200, . . . , 270 described above (especially also in view of optical interfaces, especially in view of elements 70, 72, 73).

As can be seen in FIG. 7A, the push-push-mechanism or push-pull-mechanism for predefining at least two axial relative positions may be implemented both for the mechanical coupling components as well as for the electrical coupling components (cf. reference signs 310, 320, 350, 360). In this embodiment, relative rotation of slotted link elements (relative rotation of cam contours) allows for axial positioning for both: mechanical and electrical coupling.

Figure 7B:
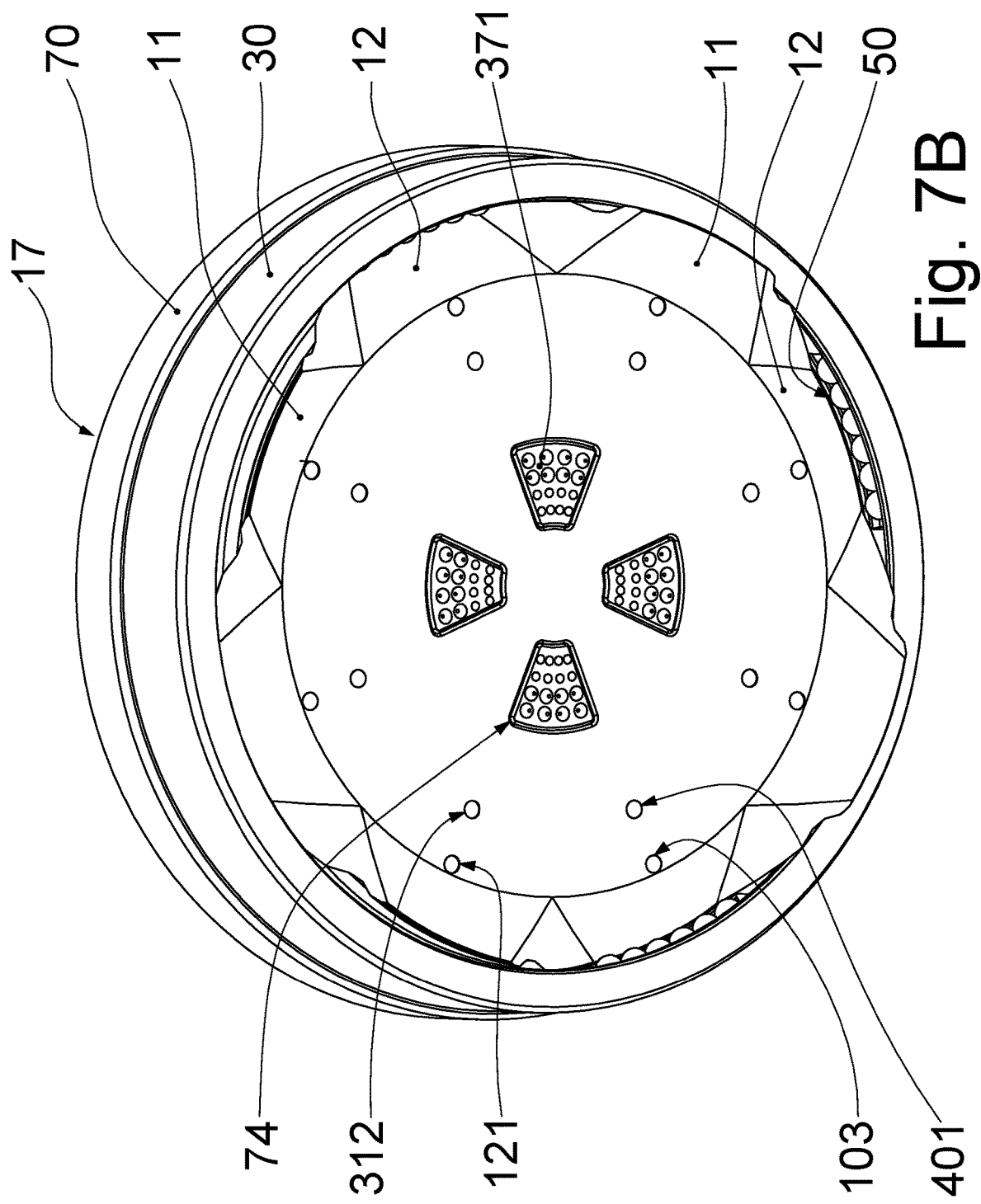

FIG. 7B shows, in a perspective view according to FIG. 5C, the central docking area of the coupling means, where openings 74 provide for contact areas 371 for transmitting power and/or data. In this embodiment, the form fit elements (especially pins) 103, 121, 312, 401 are arranged in groups resp. in pairs 121, 312 and 103, 401 in radial distance to each other. This design allows for combining both functionalities (mechanical and electrical coupling) in a practical manner, especially also in a robust manner, and also on little installation space.

Figure 7C:
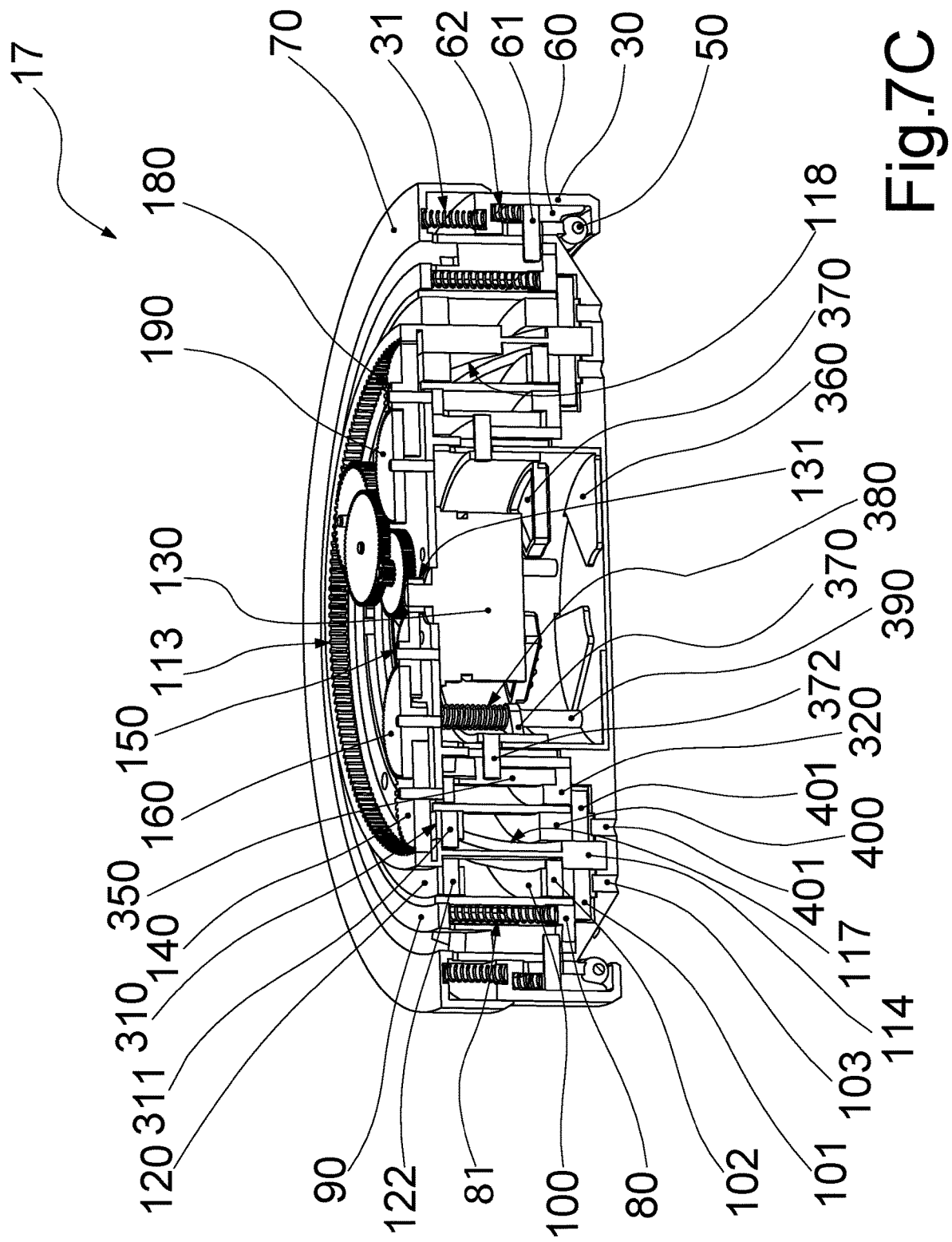

FIG. 7C shows, in a perspective view according to FIG. 5D, the central cavity defined by the respective coupling means, for arranging all electrical components within the same construction height. In this embodiment, both internal coupling kinematics for mechanical and electrical coupling are arranged within an inner cavity of the ring-in-ring-arrangement.

FIG. 7D shows in detail in a sectional side view as well as in a detailed view a cross section 3 of a pair of corresponding coupling means 17, 17, in an interlocking state (coupled state, especially situation D), both axially and radially engaged. In particular, FIG. 7D illustrates a fully engaged coupled state with both coupling means in a fully coupled position. Both outer rings are in the extended position (fully coupled) and contact each other. The preload spring 380 is pre-stressed; there is not yet any electric contact between the corresponding coupling means.

At least the following components are arranged within a cavity 75 defined by the base body or by the slotted link element of the respective coupling element: 310, 311, 312, 320, 330, 340, 350, 360, 361, 370, 371, 372, 380, 390, 400, 401, 402, 403.

FIG. 7E shows, in a perspective view according to FIG. 7D, a state in which electric connection is not yet established. The preload spring 380 is extended, and shutter elements 60 are extended. There is still axial engagement by forcing pins (situation D, E).

FIG. 7F shows, in a perspective view according to FIG. 7D, a coupled state with electric connection providing for transfer of power and/or data. Corresponding electrical contacts 371 are in contact with each other. No forcing pin is in axial engagement any more. In particular, FIG. 7F illustrates a state after situation E. It can be seen that at least four different assembly groups are arranged in radial sequence, namely the drive unit 130, 140, further the components for electric connection (310, . . . , 403), further the internal push-push-mechanism or push-pull-mechanism (internal state machine), and further the relative positioning kinematics (especially with ring-in-ring-arrangement).

The embodiment shown in FIGS. 7A-7F allows for a plurality of advantages, especially in view of a plurality of requirements. The embodiment shown in FIGS. 7A-7F provides for broad functionality.

Any force-loading means described in the figures may be provided, e.g., as metal springs resp. as coil springs. Such springs also may ensure long lifetime and a robust and secure functionality. Further, these springs do not implicate any risk of overload (no unexpected excessive forces).

It has to be noted that embodiments shown in FIGS. 6A-6E and FIGS. 7A-7F may be combined. In particular, embodiments shown in FIGS. 6A-6E may exhibit plates or discs or bushings instead of pins, and embodiments shown in FIGS. 7A-7F may exhibit pins instead of plates or discs or bushings. Also, all electrical connections may vary in form and function. In particular, punctiform or 2D contacts may be varied (especially contact pins).

It has to be noted that elements 300, . . . , 403 and 200, . . . , 290 described above may be combined with the configuration shown in FIGS. 5A-5I.

Figure 8:
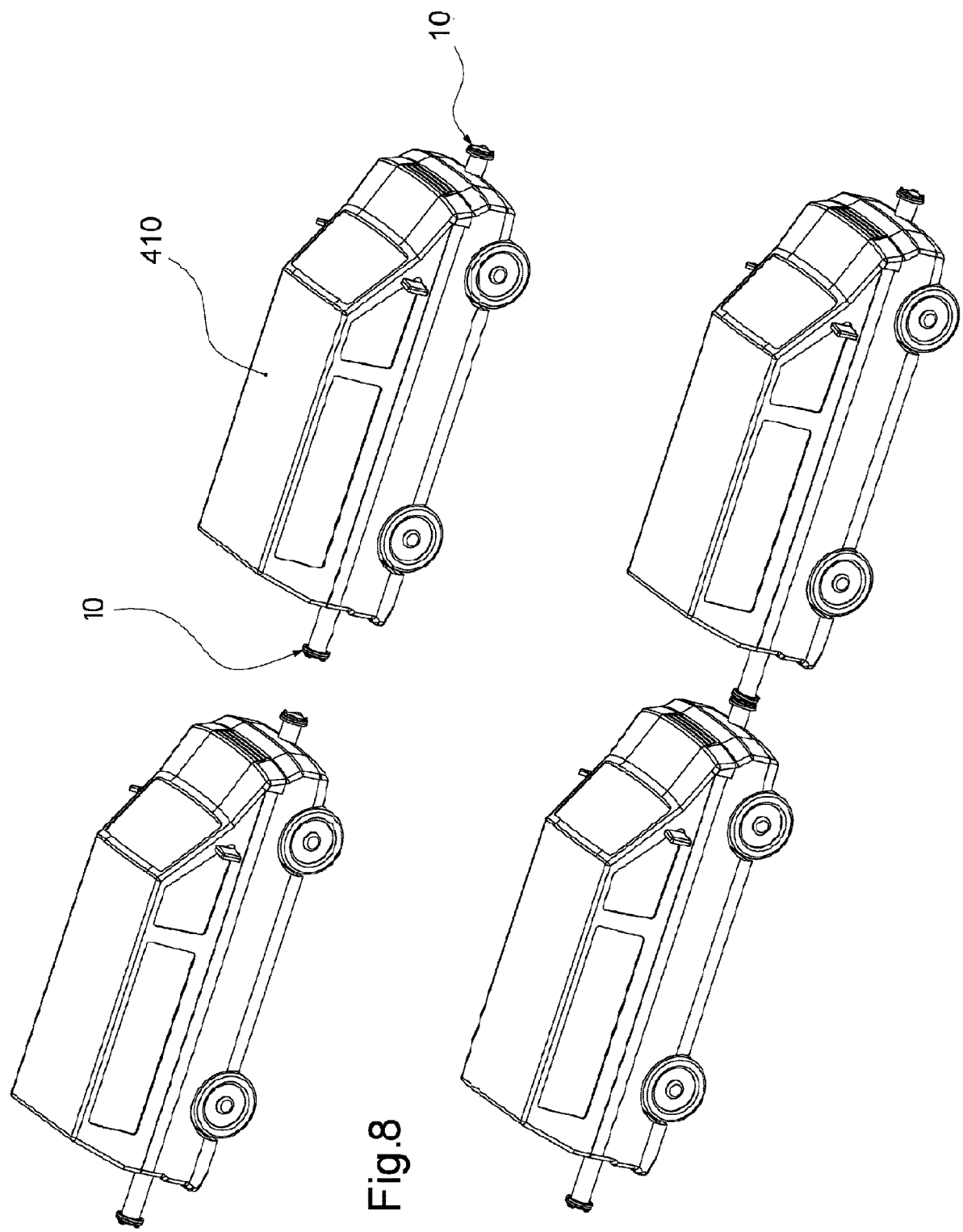
FIG. 8 shows in two perspective views an application resp. a use of an androgynous coupling according to the invention.
Figure 9A:
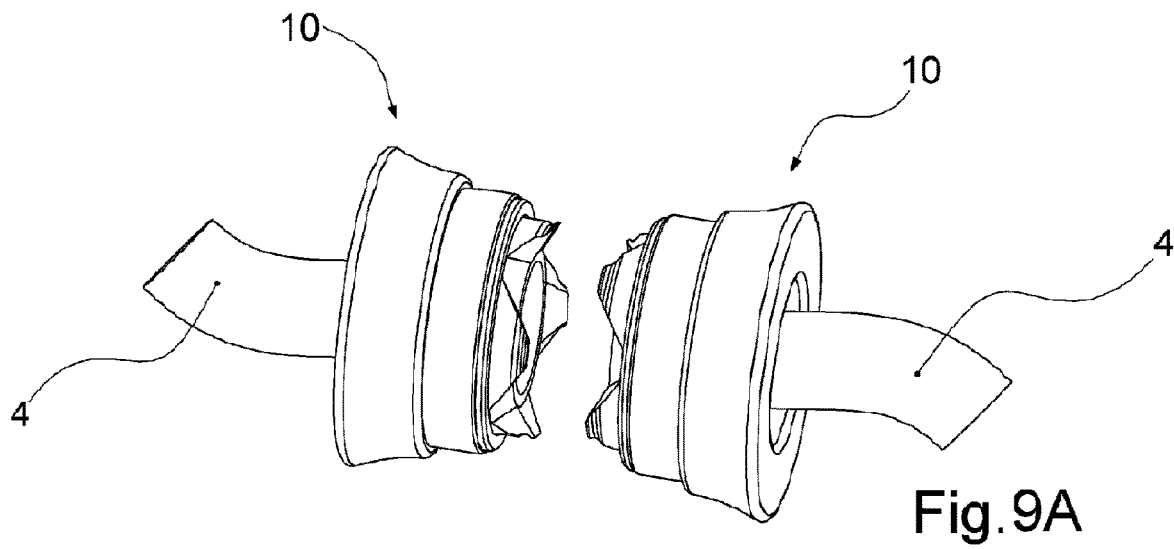
FIGS. 9A, 9B, 9C, 9D, 9E, 9F show in several perspective views use of an androgynous coupling according to the invention.
Figure 9B:
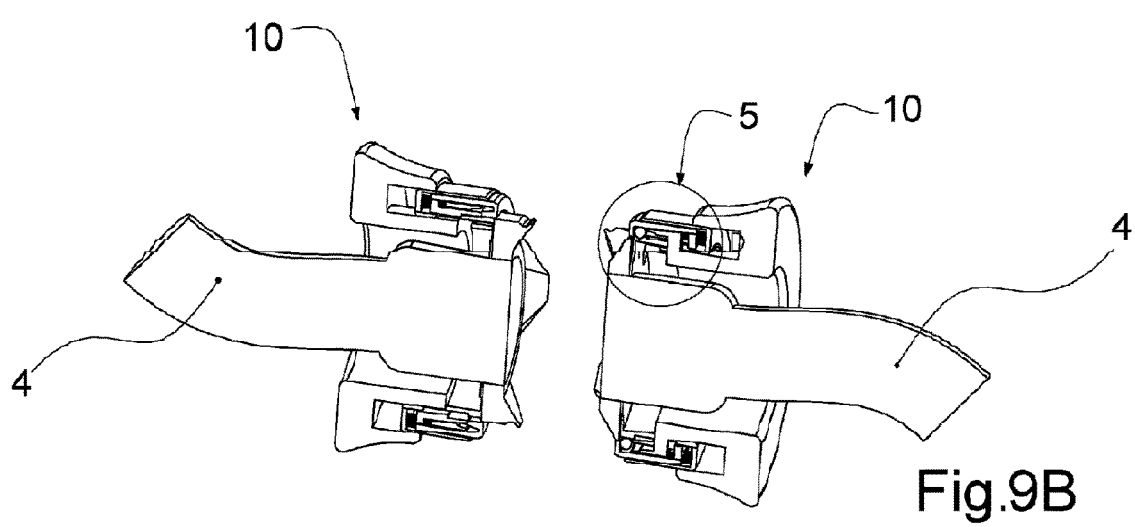

FIG. 8 illustrates two vehicles 410 arranged in series, respectively exhibiting two androgynous coupling means 10 mounted in the front and at the stern (rear end). Each pair of androgynous coupling means 10 provides for an androgynous coupling which couples the vehicles. The process of coupling the vehicles or any other devices is illustrated in FIGS. 9A, 9B.

Figure 9C:
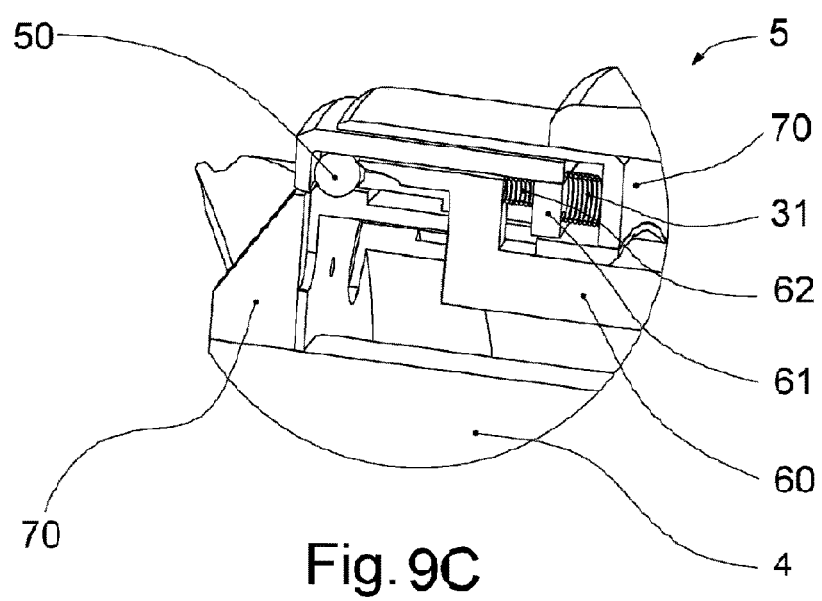
Figure 9D:
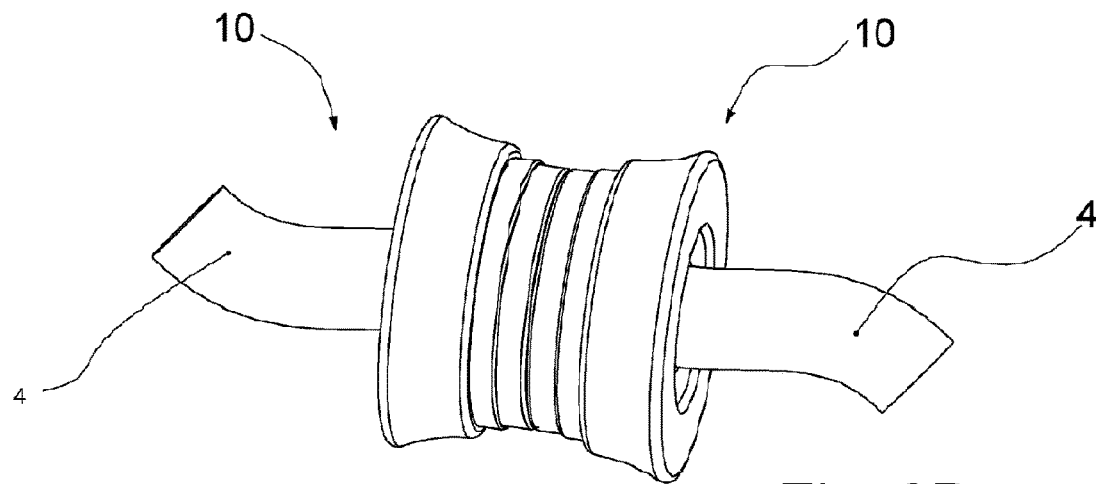
Figure 9E:
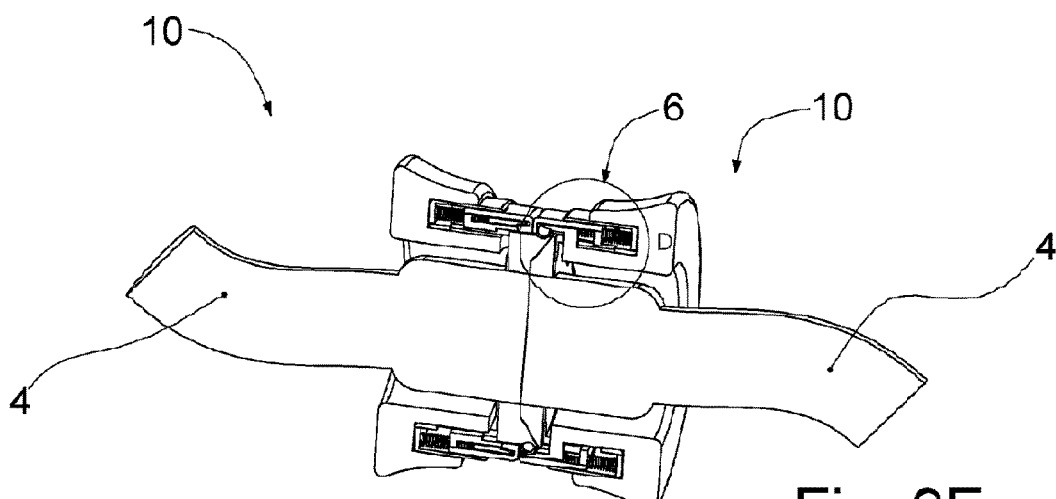
Figure 9F:
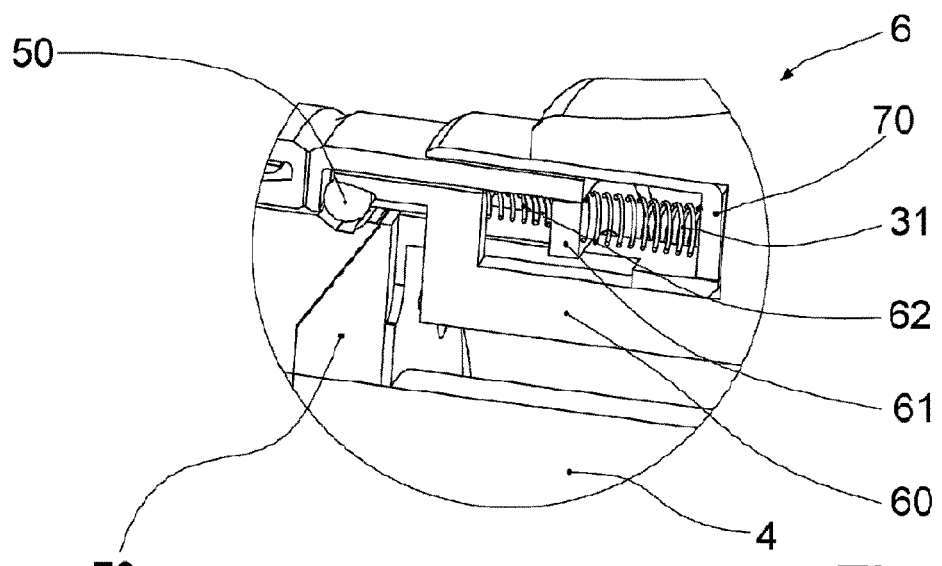

FIGS. 9A, 9B, 9C, 9D, 9E, 9F illustrate two corresponding coupling means each being mounted on a cable, tube, spindle or axle 4, in a decoupled and in a coupled state. FIGS. 9C, 9F show in detail (detailed cross sections 5, 6) the arrangement of the involved components (especially 30, 31, 50, 51, 60, 61, 62, 70) in a decoupled and in a coupled state, same as e.g. FIGS. 5F, 5H. FIGS. 9A-9F illustrate the advantage of minor axial actuation and little axial installation space requirements of the inventive coupling kinematics. This embodiment especially refers to a configuration which is favorable for coupling of cables or lines for energy/fluids/data, of tubes, linkages, rods, or the like.

Figure 10B:
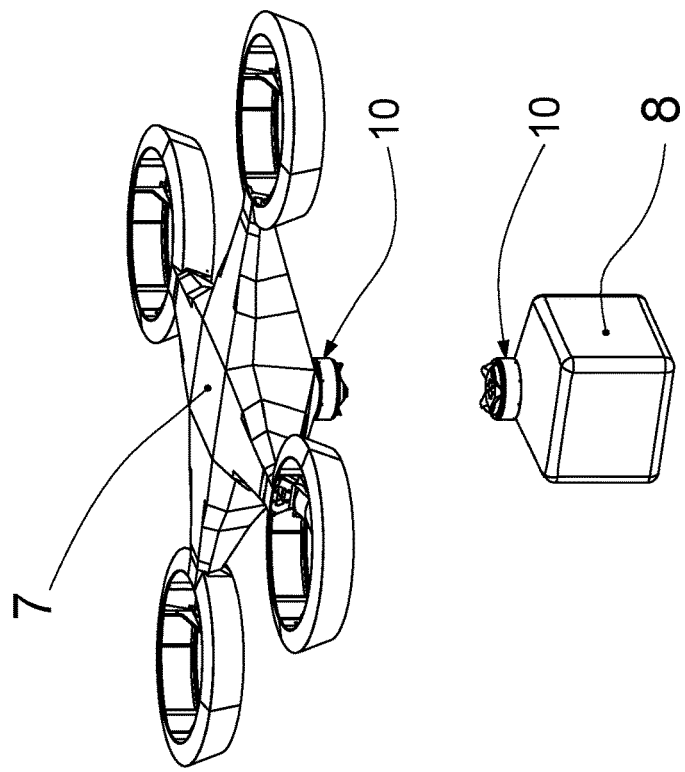
FIGS. 10A, 10B show in perspective views use of an androgynous coupling according to the invention.
Figure 10A:
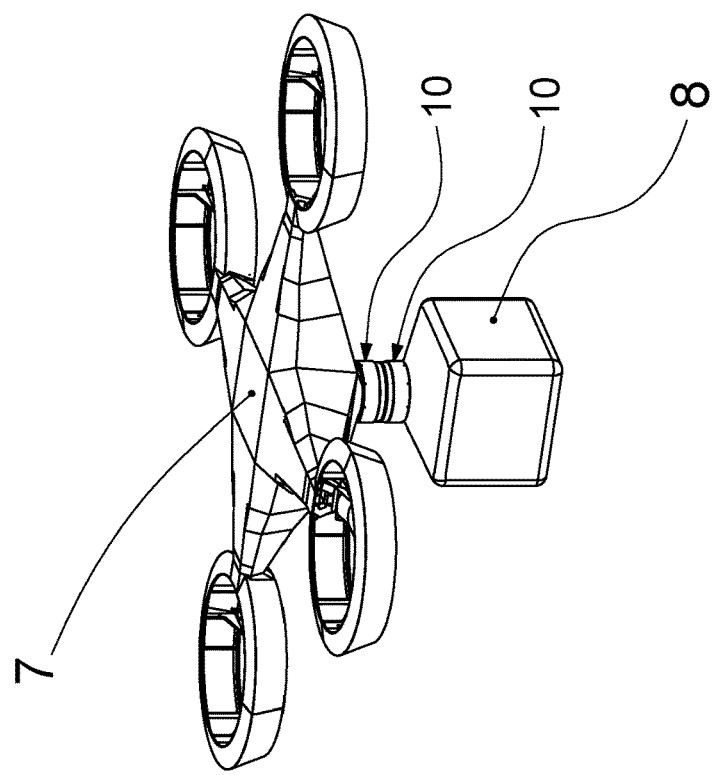

FIGS. 10A, 10B illustrate the use of the inventive coupling for coupling a copter 7, e.g. quadcopter or multicopter. Corresponding coupling means are mounted on the copter 7 and on a docking station 8.

FIGS. 11A, 11B illustrate the use of the inventive coupling for coupling a robot 9. Corresponding coupling means are mounted on any arm of the robot 9 and on a free end of the robot, especially on a tool 9.1 like a mechanical hand or gripper.

Figure 12A:
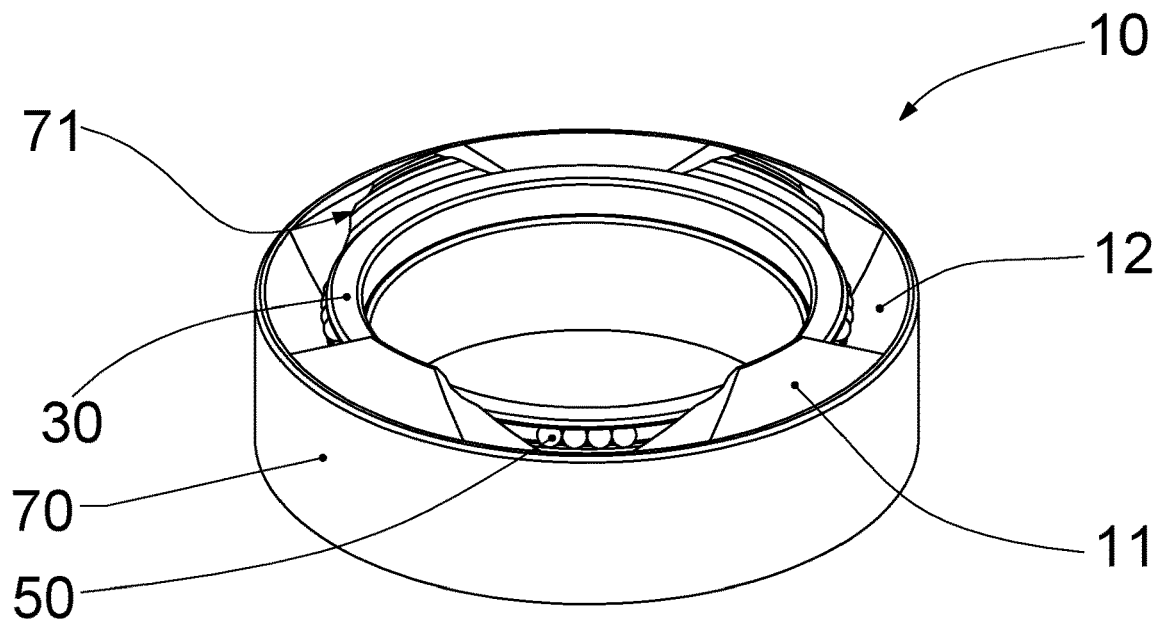
FIGS. 12A, 12B, 12C, 12D show in several perspective views resp. sectional views components of an androgynous coupling according to the invention.
Figure 12B:
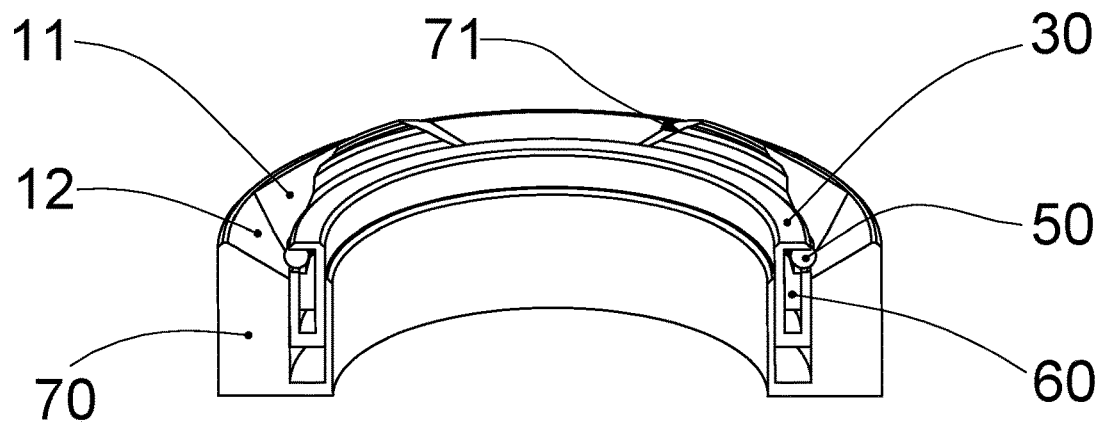
Figure 12C:
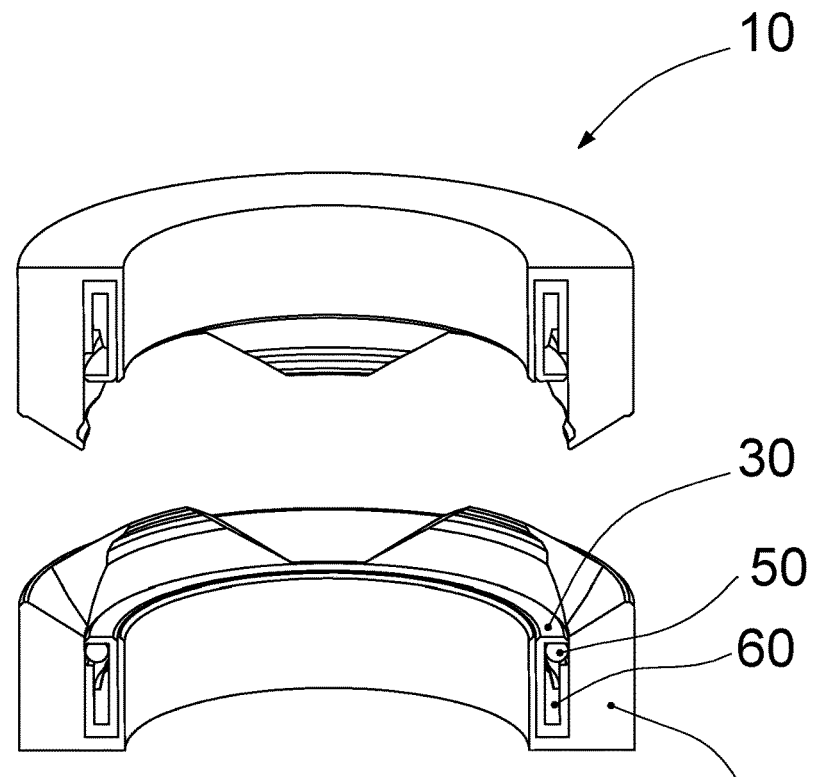
Figure 12D:
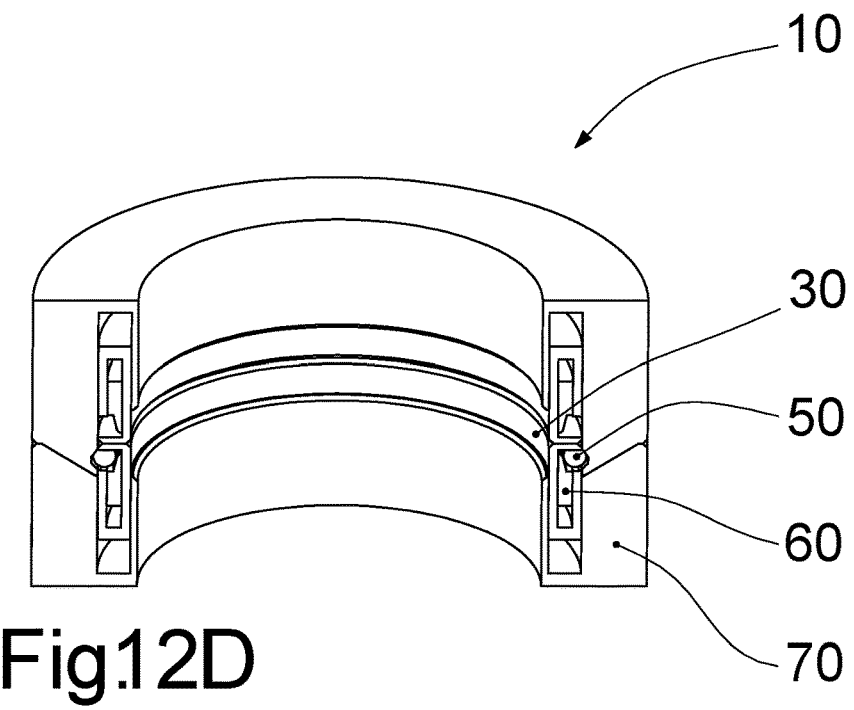

FIGS. 12A, 12B, 12C, 12D illustrate a further embodiment for an androgynous coupling means, especially in an inverted arrangement, as compared to previous embodiments. In view of embodiments described above, this embodiment differs e.g. as far as the orientation of male coupling sections resp. of radial recesses is concerned: the radial recesses of the male coupling sections are oriented radially inwards (not outwards); the radial recesses are accessible radially inwards only. The lateral locking contour provides for axial and radial interlocking with blocking elements which are arranged inside of the male coupling sections (further inwards). The male coupling sections extend axially, but they are not oriented radially outwards. In particular, the male coupling sections are arranged within a ring cavity having a diameter (resp. width) smaller than the diameter (resp. width) of the base body. Nonetheless, there is no need for radial overlap, neither outwards (cf. FIG. 1, 5A) nor inwards. Rather, the radial recesses may be provided in axial prolongation of the respective coupling section. As can be seen in FIGS. 12C, 12D, radial recesses are arranged within the axial prolongation of the ring geometry of the base body 70. This arrangement also favors a ring-in-ring-arrangement, i.e., an accommodation and axial guidance of rings within other rings, especially positioning ring within outer ring, and outer ring within base body, as already explained above in conjunction with FIGS. 5A-5I.

FIGS. 12A-12D especially illustrate a triple-ring-arrangement. In particular, the base body 70 provides for a ring cavity for accommodating the outer ring 30, and the outer ring 30 provides for a ring cavity for accommodating the positioning element 60. Between each pair of rings, there is axial tolerance for axial relative motion. This kind of double or triple axial bearing, especially sliding bearing, also provides for high stability, robustness and accuracy. Further, constructive advantages like little installation space may be realized. Preferably, the outer ring 30 exhibits a radial land or protrusion for axially limiting the axial position of the blocking elements 50, 51. In particular, the outer ring's cross-section geometry may describe a "u"-letter with roof, or a kind of "G"-letter, or an "O"-letter opened at one corner. This allows for favorable relative arrangement and guidance of the involved kinematic elements.

Figure 13A:
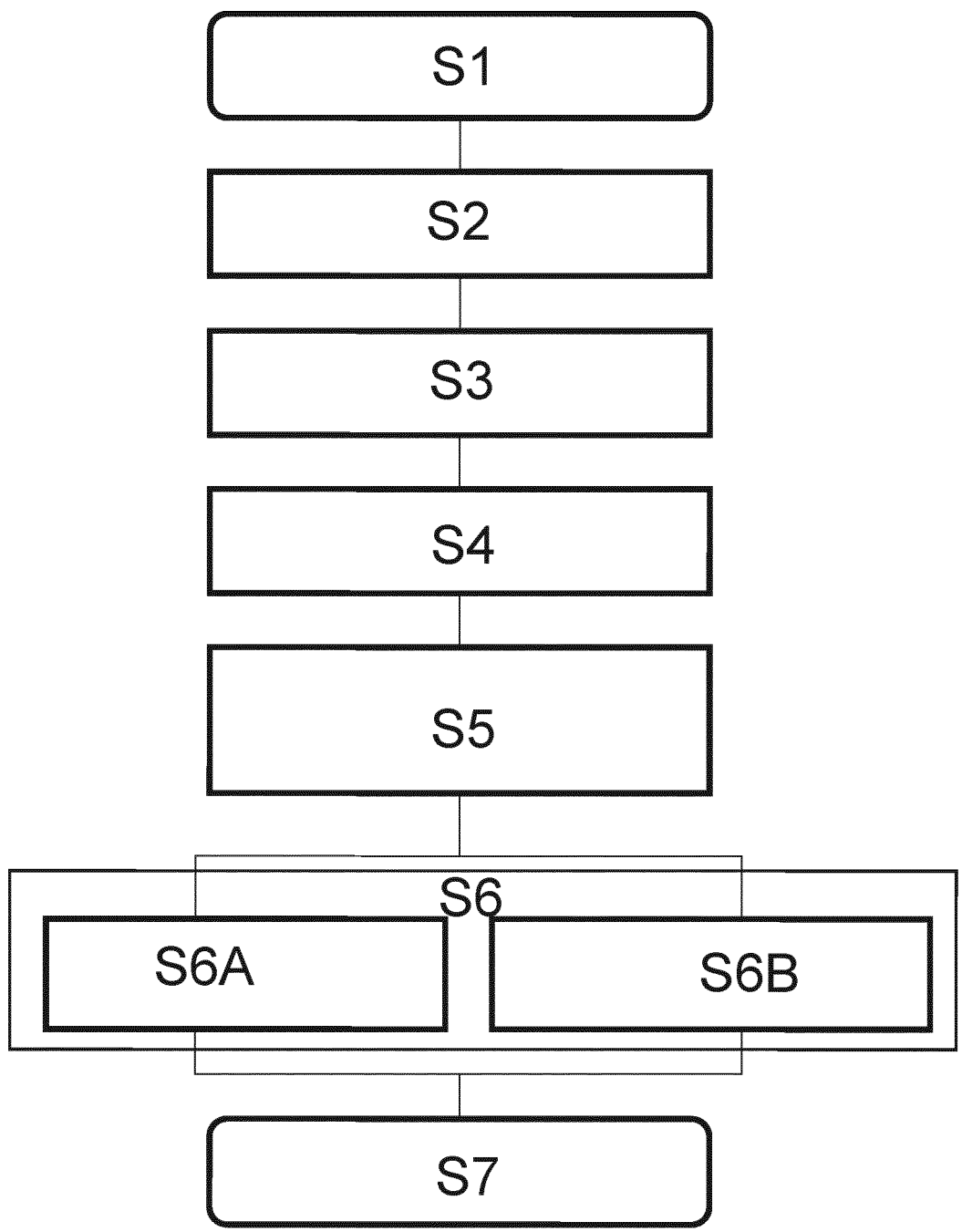
FIGS. 13A, 13B show flow diagrams for a de-/coupling sequence according to the invention.
Figure 13B:
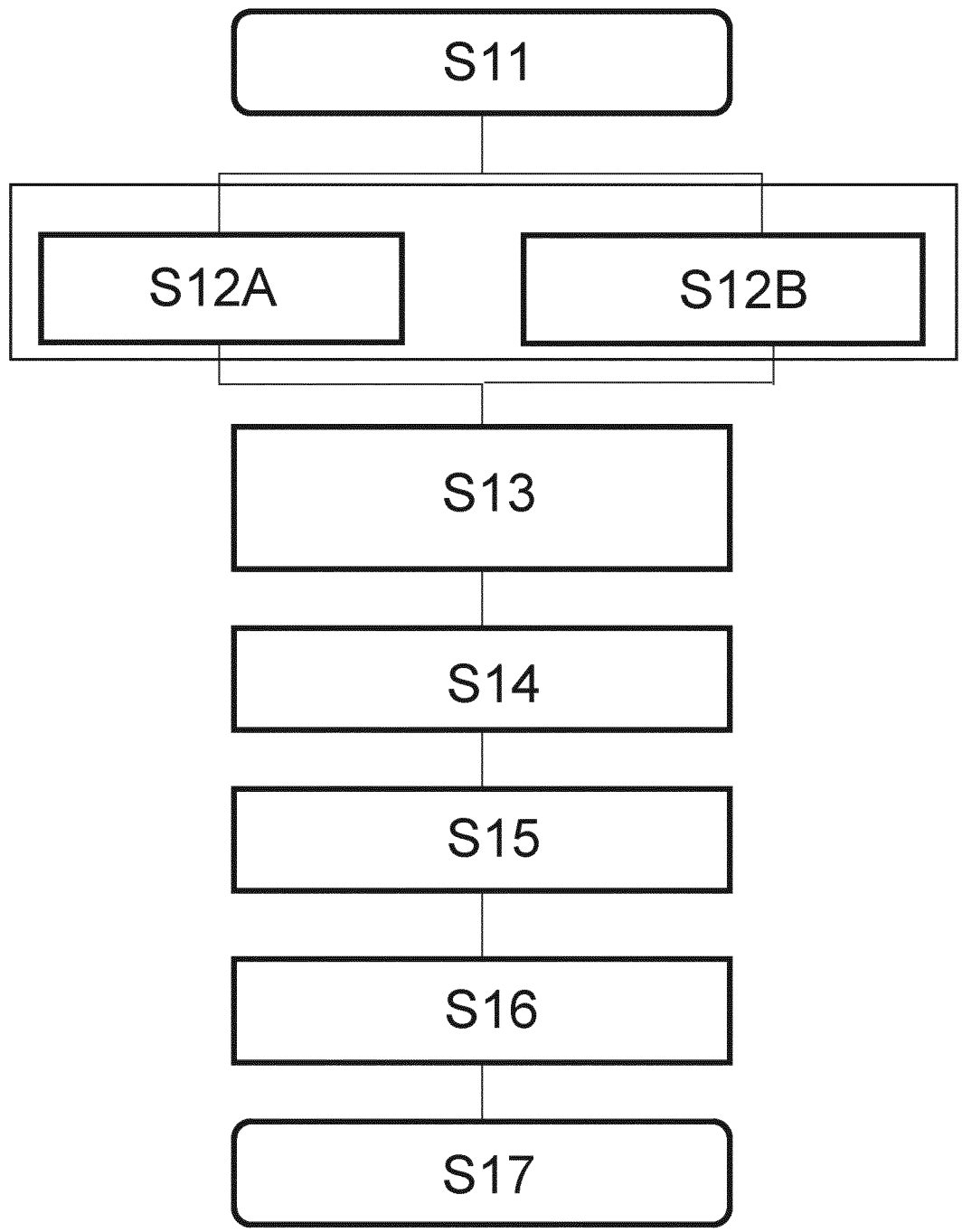

FIGS. 13A, 13B illustrate a preferred embodiment of the inventive coupling and decoupling procedures in an exemplified explanatory manner.

FIG. 13A illustrates steps S1, S2, S3, S4, S5, S6, S6A, S6B, S7 of a coupling procedure.

S1 Start of docking/coupling sequence;
S2 state with docking/coupling means detached from each other (situation A);
S3 state in which coupling means are aligned by external guide motion (situation B);
S4 the active coupling means deploys engagement mechanism (axial interlocking; situation C);
S5 the active coupling means forces the passive coupling means to deploy its engagement mechanism (situation D);
S6 procedure for transferring power/data/fluids (situation E);
S6A the active coupling means deploys its power and data connectors;
S6B the active coupling means forces the passive coupling means to deploy its power and data connectors;
S7 end of docking/coupling sequence.

FIG. 13B illustrates steps S11, S12, S12A, S12B, S13, S14, S15, S16, S17 of an undocking/decoupling procedure.

S11 start of undocking sequence;
S12 procedure for transferring power/data/fluids (situation E);
S12A the active coupling means retracts its power and data connectors;
S12B the active coupling means forces the passive coupling means to retract its power and data connectors;
S13 the active coupling means forces the passive coupling means to retract its engagement mechanism (situation D);
S14 the active coupling means retracts its engagement mechanism (situation C);
S15 state in which both coupling means are free to be detached by external guide motion (situation B);
S16 the coupling means are detached from each other (situation A);
S17 end of undocking/decoupling sequence.

In the figures: When designating an element according to one of the inventive embodiments, for example when designating coupling means 10 or base body 70, simultaneously, the analog element according to further inventive embodiments may be designated, e.g. coupling means 16, 17 or base body 72, 73.

LIST OF REFERENCE SIGNS

1 Cross-section pair of coupling means (detailed)
2 Cross-section pair of coupling means (detailed, electrical interface type 1)
3 Cross-section pair of coupling means (detailed, electrical interface type 2)
4 cable, tube, spindle or axle
5 Cross-section coupling means (detailed)
6 Cross-section coupling means (detailed)
7 multicopter
8 docking station
9 robot, especially arm of robot
9.1 tool, especially claw or hand or gripper of robot
10 androgynous coupling element
11 male coupling section, especially with lateral locking contour (convex, outer)
12 female coupling section (concave, inner)
13 pair of coupling means
14 cross-section of pair of coupling means
15 openings (especially cable feedthrough)
16 coupling means with power and data interface type 1
17 coupling means with power and data interface type 2
20 device, especially modular device, especially cube, especially satellite cube
30 outer ring
31 outer ring preload spring
40 separator elements, especially ring segments
50 blocking element, especially ball
51 blocking element, especially pin
60 positioning element, especially ball wedge ring
61 form fit element (fixing element), especially guide pin for ball wedge ring
62 force-loading means, especially ball wedge ring preload spring
70 base body, especially structure element of coupling means (structural body or skeletal structure)
71 radial recess (providing for lateral locking contour, especially for ball engagement contour)
72 base body, especially structure element, for power and data interface of first type
73 base body, especially structure element, for power and data interface of second type
74 power and data interface of second type, especially interface opening
75 cavity
80 activation ring, especially outer pen mechanism activation ring
81 force-loading means, especially outer pen mechanism activation ring preload spring
90 indexing ring, especially outer pen mechanism indexing ring
100 adapter ring, especially outer pen mechanism adapter ring
101 form fit element, especially outer pen mechanism adapter ring outer pin
102 form fit element, especially outer pen mechanism adapter ring sliding pin
103 form fit element, especially outer pen mechanism adapter ring interaction pin
104 force-loading means, especially mechanical connection guide rings preload spring
110 slotted link element, especially first cam disc
111 (first) cam contour, especially cam disc contour (outer, top)
112 (further, second) cam contour, especially cam disc contour (outer, bottom)
113 gear means, especially hollow gear or internal gearing
114 slotted link element, especially second cam disc
115 (further, third) cam contour, especially cam disc contour (inner, closed)
116 slotted link element, especially third cam disc
117 (further, fourth) cam contour, especially cam disc contour (inner, bottom)
118 (further, fifth) cam contour, especially cam disc contour (inner, top)
120 form fit element, especially outer forcing ring
121 form fit element, especially outer forcing pin
122 form fit element, especially outer forcing ring sliding pin
130 motor
131 gearing, especially sun gear
140 first gearing means, especially satellite gear
150 third gearing means, especially satellite gear
160 second gearing means, especially satellite gear 170 position sensor
180 first position sensor spur gear
190 second position sensor spur gear
200 electrical isolation ring (lower)
210 (further) electrical isolation ring (middle)
220 (further) electrical isolation ring (top)
230 form fit element, especially electrical power transfer pin
231 mounting isolation
240 (first) optical data interface
241 optocoupler element
242 optocoupler element receiver
243 optocoupler element transmitter
250 control PCB
260 (second) optical data interface
270 drive ring, especially electrical power transfer pin drive ring
271 form fit element, especially guide pin for drive ring
280 electrical power distribution ring top
281 contact ring, especially electrical power distribution ring top contact ring
290 electrical power distribution ring bottom
291 contact ring, especially electrical power distribution ring bottom contact ring
300 electrical power inlet (pole 1)
301 electrical power outlet (pole 1)
302 electrical power inlet (pole 2)
303 electrical power outlet (pole 2)
310 form fit element, especially inner forcing ring
311 form fit element, especially inner forcing ring sliding pin
312 form fit element, especially inner forcing pin
320 activation ring, especially inner pen mechanism activation ring
330 force-loading means, especially electrical interface guide rings preload spring
340 force-loading means, especially inner pen mechanism activation ring preload spring
350 indexing ring, especially inner pen mechanism indexing ring
360 ring with shutter elements
361 form fit element, especially guide slot for ring with shutter elements
370 electrical connectors support ring
371 electrical connectors support ring pedal
372 form fit element, especially electrical connector's support ring guide pin
380 force-loading means, especially electrical connectors support ring preload spring
390 form fit element, especially electrical connector's support ring preload spring guide pin
400 adapter ring, especially inner pen mechanism adapter ring
401 form fit element, especially inner pen mechanism adapter ring interaction pin
402 form fit element, especially inner pen mechanism adapter ring outer pin
403 form fit element, especially inner pen mechanism adapter ring sliding pin
410 vehicle
S1, S2, S3, S4, S5, S6, S6A, S6B, S7 steps of a docking/coupling procedure
S11, S12, S12A, S12B, S13, S14, S15, S16, S17 steps of an undocking/decoupling procedure

The invention claimed is:

1. A coupling system comprising:
a first androgynous coupler comprising a first male coupling section having a first recess extending radially and a first female coupling section comprising a first blocking element and a first positioning element; and
a second androgynous coupler comprising a second male coupling section having a second recess extending radially, wherein the second male coupling section is configured to form-fit with the first female coupling section;
wherein when the second male coupling section is form-fit with the first female coupling section, axial movement of the first positioning element causes the first blocking element to move radially into the second recess to couple the first androgynous coupler to the second androgynous coupler.

2. The coupling system according to claim 1, wherein the second androgynous coupler comprises a second female coupling section having a second blocking element and a second positioning element, wherein the second female coupling section is configured to form-fit with the first male coupling section, and wherein when the second female coupling section is form-fit with the first male coupling section, axial movement of the second positioning element causes the second blocking element to move radially into the first recess to couple the first androgynous coupler to the second androgynous coupler.

3. The coupling system according to claim 1, wherein the second male coupling section diagonally interlocks with the first female coupling section.

4. The coupling system according to claim 1, wherein the first positioning element comprises a ring having a conical or wedge-shaped geometry, and the first positioning element is arranged within an outer ring.

5. The coupling system according to claim 1, wherein the second radial recess is configured for form fit with the first blocking element based on radial interlocking.

6. The coupling system according to claim 1, wherein the first androgynous coupler further comprises a first connector radially inwards with respect to the first radial recess and the second androgynous coupler further comprises a second connector radially inwards with respect to the second radial recess, wherein the first connector is adapted to connect with the second connector to transmit power or data between the first androgynous coupler and the second androgynous coupler.

7. The coupling system according to claim 1, wherein the first androgynous coupler is mounted on a planetary gear, a Power Take-Off (PTO), a locking system, a robot, a vehicle, a spacecraft, a satellite, an active tool, a pipe, a drone, a quadcopter, a multicopter, a logistics system, an aerodyne or an aircraft.

8. The coupling system according to claim 1, wherein the first blocking element comprises a sphere or a pin.

9. The coupling system according to claim 1, wherein the first recess extends radially outwards.

* * * * *